(12) United States Patent
Takahashi

(10) Patent No.: US 10,186,379 B2
(45) Date of Patent: Jan. 22, 2019

(54) DIELECTRIC COMPOSITION AND ELECTRONIC COMPONENT

(71) Applicant: TDK CORPORATION, Tokyo (JP)

(72) Inventor: Tetsuhiro Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/632,955

(22) Filed: Jun. 26, 2017

(65) Prior Publication Data

US 2017/0372840 A1 Dec. 28, 2017

(30) Foreign Application Priority Data

Jun. 28, 2016 (JP) .................. 2016-127384
Jun. 28, 2016 (JP) .................. 2016-127385
Jun. 28, 2016 (JP) .................. 2016-127386
Jun. 28, 2016 (JP) .................. 2016-127387

(51) Int. Cl.
*C04B 35/64* (2006.01)
*H01G 4/12* (2006.01)
(Continued)

(52) U.S. Cl.
CPC ........... *H01G 4/1263* (2013.01); *B32B 18/00* (2013.01); *C04B 35/495* (2013.01); *C04B 35/499* (2013.01); *C04B 35/6261* (2013.01); *C04B 35/6264* (2013.01); *C04B 35/62675* (2013.01); *C04B 35/62685* (2013.01); *C04B 35/638* (2013.01); *C04B 35/6365* (2013.01); *C04B 35/63416* (2013.01); *C04B 35/63424* (2013.01); *C04B 35/64* (2013.01); *H01G 4/012* (2013.01);
(Continued)

(58) Field of Classification Search
CPC ..... C04B 35/4682; C04B 35/495; H01B 3/12; H01G 4/1227
See application file for complete search history.

(56) References Cited

U.S. PATENT DOCUMENTS 5,037,784 A * 8/1991 Raveau ............... C04B 35/4682
501/134
6,118,648 A 9/2000 Kojima et al.
(Continued)

FOREIGN PATENT DOCUMENTS

JP  H10-335169 A  12/1998
JP  H11-273989 A  10/1999
(Continued)

*Primary Examiner* — Noah S Wiese
(74) *Attorney, Agent, or Firm* — Oliff PLC

(57) ABSTRACT

A dielectric composition is provided. The dielectric composition includes: a main component made of: a first complex oxide expressed by a chemical formula $\{K(Ba_{1-x}Sr_x)_2Nb_5O_{15}\}$; and a second complex oxide expressed by a chemical formula that differs the chemical formula of the first complex oxide. The second complex oxide is a complex oxide expressed by one of chemical formulae: $\{(Ca_{1-y}Sr_y)(Zr_{1-z}Ti_z)O_3\}$; $\{Ba(Ti_{1-u}Zr_u)O_3\}$; $\{(Ca_{1-v}Sr_v)TiSiO_5\}$; and $\{(Ba_{1-w}Re_{2w/3})Nb_2O_6\}$, x satisfies $0.35 \leq x \leq 0.75$, and a satisfies $0.25 \leq a \leq 0.75$ when a molar ratio between the first and second complex oxides is defined by a:b in an order and a+b=1.00.

16 Claims, 1 Drawing Sheet

(51) Int. Cl.
*H01G 4/012* (2006.01)
*H01G 4/30* (2006.01)
*C04B 35/495* (2006.01)
*C04B 35/626* (2006.01)
*B32B 18/00* (2006.01)
*C04B 35/499* (2006.01)
*C04B 35/634* (2006.01)
*C04B 35/636* (2006.01)
*C04B 35/638* (2006.01)
*H01G 4/248* (2006.01)

(52) U.S. Cl.
CPC ....... *H01G 4/30* (2013.01); *C04B 2235/3201* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3234* (2013.01); *C04B 2235/3244* (2013.01); *C04B 2235/3249* (2013.01); *C04B 2235/3255* (2013.01); *C04B 2235/3454* (2013.01); *C04B 2235/442* (2013.01); *C04B 2235/5436* (2013.01); *C04B 2235/5445* (2013.01); *C04B 2235/6562* (2013.01); *C04B 2235/6567* (2013.01); *C04B 2235/6582* (2013.01); *C04B 2235/6585* (2013.01); *C04B 2235/785* (2013.01); *C04B 2235/786* (2013.01); *C04B 2235/96* (2013.01); *C04B 2237/34* (2013.01); *C04B 2237/68* (2013.01); *H01G 4/1218* (2013.01); *H01G 4/1236* (2013.01); *H01G 4/248* (2013.01)

(56) References Cited

U.S. PATENT DOCUMENTS

| 6,797,413 | B2* | 9/2004 | Takeishi | H05B 33/02 313/503 |
| 7,742,278 | B2* | 6/2010 | Takeda | C04B 35/4682 361/301.4 |
| 2010/0085681 | A1 | 4/2010 | Takeda | |
| 2011/0009679 | A1* | 1/2011 | Rappe | B01J 23/628 585/16 |
| 2013/0342958 | A1 | 12/2013 | Suzuki et al. | |

FOREIGN PATENT DOCUMENTS

| JP | 2015-180588 A | 10/2015 |
| WO | 2008/155945 A1 | 12/2008 |
| WO | 2012/128175 A1 | 9/2012 |

* cited by examiner

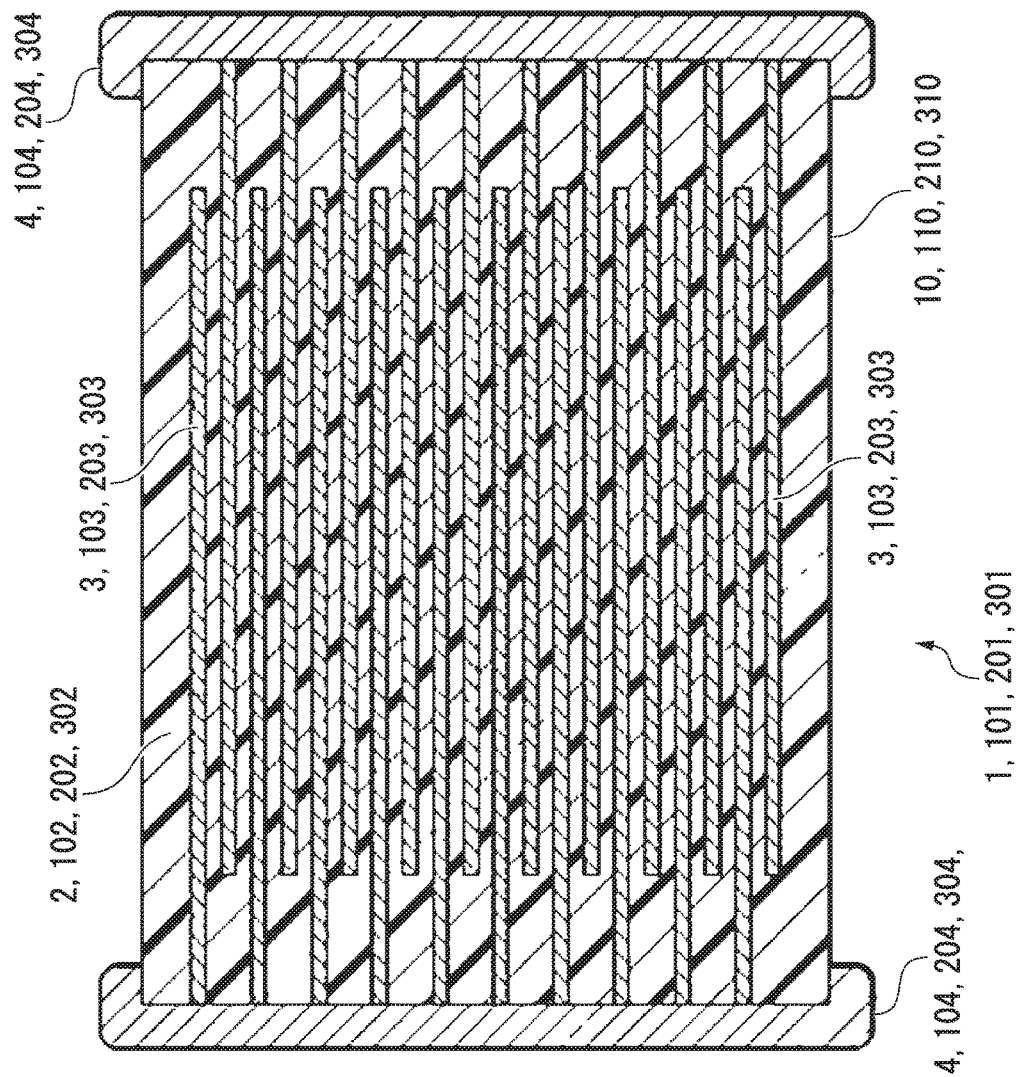

DIELECTRIC COMPOSITION AND ELECTRONIC COMPONENT

BACKGROUND OF THE INVENTION

Field of the Invention

The present invention relates to a dielectric composition, which is particularly suitable for being used in a high-temperature condition such as one for automotive use; and an electronic component in which the dielectric composition is used as a dielectric layer.

Priority is claimed on: Japanese Patent Application No. 2016-127387; Japanese Patent Application No. 2016-127385; Japanese Patent Application No. 2016-127386; and Japanese Patent Application No. 2016-127384, all of which were filed on Jun. 28, 2016, the contents of which are incorporated herein by reference.

Description of Related Art

The laminated ceramic capacitors are mounted on many electronic devices because of their high reliability and low cost. Specific examples of electronic devices include information terminals such as cellular phones, home appliances, and automobile electrical components. Among them, in laminated ceramic capacitors used for automotive use, guarantee is required to a higher-temperature range occasionally compared to the laminated ceramic capacitor used for home appliances, information terminals, or the like. Thus, a higher reliability with difficulty for the function as the capacitor to be deteriorated is needed. In order not to deteriorate the functions of the capacitor, it is necessary to prevent breakdown by the applied voltage, that is, a high DC withstand voltage (which is the value obtained by dividing the DC voltage value when the leakage current value reaches 10 mA by the thickness of the dielectric layer after application of DC voltage). In addition, it is needed that the insulation resistance is difficult to be deteriorated even when a DC voltage is applied for a long time under high temperature atmosphere for continuous use, that is, a high high-temperature load lifetime (which is time until the insulation resistance value decreases by an order of magnitude with reference of the initial insulation resistance value after applying heat and voltage).

Particularly, in laminated ceramic capacitors for surge voltage removal, which are expected to be used in the high temperature range at 150° C. or more and mounted on the inverter circuit using the power semiconductors of SiC, GaN or the like, high reliability is required in the wide range of temperature of −55° C. to about 250° C.

WO 2008/155945 discloses a laminated ceramic capacitor using a dielectric composition, which includes a mixed crystal system of a tungsten bronze structure compound and perovskite structure compound as the main component. The tungsten bronze structure compound is a dielectric ceramic composition that shows a sufficient relative dielectric constant; and stable capacitance-temperature characteristics and high resistivity ρ can be obtained even at high temperature about 175° C. by using this tungsten bronze structure compound. The tungsten bronze structure compound is expressed by the compositional formula $(1-a)(K_{1-x}Na_x)(Sr_{1-y-z}Ba_yCa_z)_2Nb_5O_{15}$-$a(Ba_{1-b}Ca_b)TiO_3$. The dielectric ceramic composition includes the accessory component in 0.1 to 40 mol part per 100 mol part of the above-described main component.

Japanese Patent Application No. H10-90751 (Japanese Unexamined Patent Application, First Publication No. H10-335169) discloses an electric porcelain material, the main component of which is $[(Ca_xSr_{1-x})O]m[(Ti_yZr_{1-y})O_2]$ with excellent temperature and characteristics and high-temperature load lifetime, x, y and m satisfying $0 \leq x \leq 1$, $0 \leq y \leq 0.10$, and $0.75 \leq m \leq 1.04$, respectively. Also, the electric porcelain material includes Mn oxide; Al oxide; and $[(Ba_zCa_{1-z})O]_vSiO_2$ as the accessory components, z and v satisfying $0 \leq z \leq 1$ and $0.5 \leq v \leq 4.0$, respectively.

WO2012/128175 discloses an dielectric ceramic, the main component of which is a perovskite-type compound including Ba and Ti, which can be fired at sufficiently low temperature and an dielectric ceramic having a high resistivity at high temperature (150° C.) (a part of Ba may be substituted by Ca and a part of Ti may be substituted by Zr). Also, the dielectric ceramic includes 3 mol % or more of the minor component such as Cu, Bi and the like.

Japanese Unexamined Patent Application, First Publication No. 2015-180588 discloses titanite-type complex oxide having a low capacity change rate and high relative dielectric constant and resistivity even in a high temperature range of 200° C. or more. The main component of the titanite-type oxide is expressed by the general formula $(Ca_{1-a}Sr_a)_xTi_{1-b}Zr_b)_y(Si_{1-c}Ge_c)_zO_5$ In addition, Japanese Unexamined Patent Application, First Publication No. H11-273989 discloses a dielectric film made of tungsten bronze-type crystal phase with the film thickness of 2 μm or less including K, Sr, and Nb as metal elements having a high relative dielectric constant, low loss and excellent temperature characteristics. The compositional formula of the dielectric films is $(1-y)K(Sr_{1-x}Ba_x)_2Nb_5O_{15}$·$5y/2(Sr_{1-x}Ba_x)Nb_2O_6$, x and w satisfying formulae y=0 and $0 \leq x \leq 0.20$, or the formulae $0 \leq y \leq 0.10$ and $0.05 \leq x \leq 0.25$.

SUMMARY OF THE INVENTION

Problems to be Solved

WO 2008/155945 discloses that excellent insulation properties are obtained in the high temperature range (175° C.) speaking of the resistivity obtained by measurement for about 1 minute. However, it is not mentioned if the high-temperature load lifetime could be improved at the same time when direct voltage is applied for a long time continuously. Japanese Patent Application No. H10-90751 discloses that excellent high-temperature load lifetime is obtained at 200° C. However, it is difficult to obtain an intended capacitance since the obtained relative dielectric constant is low.

In addition, WO 2008/155945 and WO2012/128175 disclose that excellent insulation properties are obtained in the high temperature range (175° C. or 150° C.) speaking of the resistivity obtained by measurement for about 1 minute. However, they do not mention about if the high-temperature load lifetime could be improved at the same time when direct voltage is applied for a long time continuously.

WO 2008/155945 and Japanese Unexamined Patent Application, First Publication No. 2015-180588 disclose that excellent insulation properties are obtained in the high temperature range (175° C. or 250° C.) speaking of the resistivity obtained by measurement for about 1 minute. However, they do not mention about if the high-temperature load lifetime could be improved at the same time when direct voltage is applied for a long time continuously.

In addition, WO 2008/155945 discloses that excellent properties are obtained in the high temperature range speaking of the resistivity obtained by measurement for about 1 minute. However, it does not mention about obtainability of the high-temperature load lifetime at the same time when direct voltage is applied for a long time continuously. In addition, Japanese Unexamined Patent Application, First Publication No. H11-273989 discloses that the relative dielectric constant and the temperature properties at the room temperature in the dielectric film; and the DC-Bias characteristics are improved. However, it does not mention about the high-temperature characteristics at 150° C. or more for automobile use or the like.

The present invention is made under the circumstances described above. The purpose of the present invention is to provide a dielectric composition having: high excellent high-temperature load lifetime in high-temperature atmosphere at 250° C. for the automobile use and the power device using a SiC-based or GaN-based semiconductor. In addition, an electronic component using the dielectric composition is provided.

Means to Solve the Problem

In order to achieve the above-described purpose, the dielectric composition, which is an aspect of the present invention, (hereinafter, referred as "the dielectric composition of the present invention") is configured as described below.

(1) A dielectric composition including a main component made of:

a first complex oxide expressed by a chemical formula $\{K(Ba_{1-x}Sr_x)_2Nb_5O_{15}\}$; and a second complex oxide expressed by a chemical formula that differs the chemical formula of the first complex oxide, wherein the second complex oxide is a complex oxide expressed by one of chemical formulae: $\{(Ca_{1-y}Sr_y)(Zr_{1-z}Ti_z)O_3\}$; $\{Ba(Ti_{1-u}Zr_u)O_3\}$; $\{(Ca_{1-v}Sr_v)TiSiO_5\}$; and $\{(Ba_{1-w}Re_{2w/3})Nb_2O_6\}$, x satisfies 0.35≤x≤0.75, and a satisfies 0.25≤a≤0.75 when a molar ratio between the first and second complex oxides is defined by a:b in an order and a+b=1.00.

By the dielectric composition having the above-described features, a dielectric composition, which is suitable for use in the temperature range about 250° C. and has excellent high-temperature load lifetime, can be provided.

(2) The dielectric composition according to the above-described (1), wherein the second complex oxide is expressed by the chemical formula $\{(Ca_{1-y}Sr_y)(Zr_{1-z}Ti_z)O_3\}$, y and z satisfy 0.01≤y≤0.25 and 0.01≤z≤0.25, respectively, and a satisfies 0.32≤a≤0.66.

By the dielectric composition having the above-described features, a dielectric composition, which is suitable for use in the temperature range about 250° C.; has excellent high-temperature load lifetime and relatively high relative dielectric constant, can be provided more reliably.

In addition, by using the dielectric layer made of the dielectric composition, capacitors and the like used for: automobile use required to be used from a low-temperature range about −55° C. to a temperature range about 150° C.; snubber capacitors for the power devices using the SiC-based or GaN-based semiconductor required to be used at even higher temperature range about 250° C.; and capacitors used for noise removal in the engine room of automobiles, can be provided.

(3) The dielectric composition according to the above-described (2), wherein a relationship between α and β satisfies 0.50≤α/β≤1.90 and 80%≤α+β when α is an area ratio of crystal grains of $K(Ba_{1-x}Sr_x)_2Nb_5O_{15}$ in percentage; and β is an area ratio of crystal grains of $(Ca_{1-y}Sr_y)(Zr_{1-z}Ti_z)O_3$ in percentage, in a case where the dielectric composition is made of plurality of crystal grains and a total area ratio of all of the plurality of crystal grains constituting the dielectric composition is defined as 100%.

(4) The dielectric composition according to the above-described (3), wherein x, y, α, and β satisfy: 0.35≤x≤0.50; 0.02≤y≤0.10; 0.02≤z≤0.10; 0.60≤α/β≤1.50; and 90%≤α+β.

(5) The dielectric composition according to the above-described (1), wherein the second complex oxide is expressed by the chemical formula $\{Ba(Ti_{1-u}Zr_u)O_3\}$, u satisfies 0.02≤u≤0.25, and a satisfies 0.35≤a≤0.65.

By the dielectric composition having the above-described features, a dielectric composition, which is suitable for use in the temperature range about 250° C.; has excellent high-temperature load lifetime, can be provided more reliably.

In addition, by using the dielectric layer made of the dielectric composition, capacitors and the like used for: automobile use required to be used from a low-temperature range about −55° C. to a temperature range about 150° C.; snubber capacitors for the power devices using the SiC-based or GaN-based semiconductor required to be used at even higher temperature range about 250° C.; and capacitors used for noise removal in the engine room of automobiles, can be provided.

(6) The dielectric composition according to the above-described (5), wherein a relationship between α and β satisfies 0.55≤α/β≤1.85 and 80%≤α+β when α is an area ratio of crystal grains of $K(Ba_{1-x}Sr_x)_2Nb_5O_{15}$ in percentage; and β is an area ratio of crystal grains of $Ba(Ti_{1-u}Zr_u)O_3$ in percentage, in a case where the dielectric composition is made of plurality of crystal grains and a total area ratio of all of the plurality of crystal grains constituting the dielectric composition is defined as 100%.

(7) The dielectric composition according to the above-described (6), wherein x, u, α, and β satisfy: 0.35≤x≤0.50; 0.04≤u≤0.15; 0.70≤α/β≤1.50; and 90%≤α+β.

(8) The dielectric composition according to the above-described (1), wherein the second complex oxide is expressed by the chemical formula $\{(Ca_{1-v}Sr_v)TiSiO_5\}$, v satisfies 0.40≤v≤0.85, and a satisfies 0.37≤a≤0.62.

By the dielectric composition having the above-described features, a dielectric composition, which is suitable for use in the temperature range about 250° C.; has excellent high-temperature load lifetime, can be provided more reliably.

In addition, by using the dielectric layer made of the dielectric composition, capacitors and the like used for: automobile use required to be used from a low-temperature range about −55° C. to a temperature range about 150° C.; snubber capacitors for the power devices using the SiC-based or GaN-based semiconductor required to be used at even higher temperature range about 250° C.; and capacitors used for noise removal in the engine room of automobiles, can be provided.

(9) The dielectric composition according to the above-described (8), wherein a relationship between α and β satisfies $0.60 \leq \alpha/\beta \leq 1.60$ and $80\% \leq \alpha+\beta$ when α is an area ratio of crystal grains of $K(Ba_{1-x}Sr_x)_2Nb_5O_{15}$ in percentage; and β is an area ratio of crystal grains of $(Ca_{1-v}Sr_v)TiSiO_5$ in percentage, in a case where the dielectric composition is made of plurality of crystal grains and a total area ratio of all of the plurality of crystal grains constituting the dielectric composition is defined as 100%.

(10) The dielectric composition according to the above-described (9), wherein x, v, α, and β satisfy: $0.35 \leq x \leq 0.50$; $0.55 \leq v \leq 0.75$; $0.60 \leq \alpha/\beta \leq 1.10$; and $90\% \leq \alpha+\beta$.

(11) The dielectric composition according to the above-described (1), wherein the second complex oxide is expressed by the chemical formula $\{(Ba_{1-w}Re_{2w/3})Nb_2O_6\}$, Re is at least one selected from a group consisting of: La; Pr; Nd; Sm; Y; Gd; Yb; and Dy, and w satisfies $0.20 \leq w \leq 0.85$.

By the dielectric composition having the above-described features, a dielectric composition, which is suitable for use in the temperature range about 250° C.; has excellent high-temperature load lifetime, can be provided more reliably.

In addition, by using the dielectric layer made of the dielectric composition, capacitors and the like used for: automobile use required to be used from a low-temperature range about −55° C. to a temperature range about 150° C.; snubber capacitors for the power devices using the SiC-based or GaN-based semiconductor required to be used at even higher temperature range about 250° C.; and capacitors used for noise removal in the engine room of automobiles, can be provided.

(12) The dielectric composition according to the above-described (11), wherein a relationship between α and β satisfies $0.35 \leq \alpha/\beta \leq 3.00$ and $80\% \leq \alpha+\beta$ when α is an area ratio of crystal grains of $K(Ba_{1-x}Sr_x)_2Nb_5O_{15}$ in percentage; and β is an area ratio of crystal grains of $(Ba_{1-w}Re_{2w/3})Nb_2O_6$ in percentage, in a case where the dielectric composition is made of plurality of crystal grains and a total area ratio of all of the plurality of crystal grains constituting the dielectric composition is defined as 100%.

(13) The dielectric composition according to the above-described (12), wherein

Re is La, Pr, and Nd, and x, w, α, and β satisfy: $0.35 \leq x \leq 0.50$; $0.40 \leq w \leq 0.60$; $0.60 \leq \alpha/\beta \leq 1.50$; and $90\% \leq \alpha+\beta$.

(14) An electronic component including a dielectric layer and an inner electrode layer, wherein the dielectric layer is made of the dielectric composition according to the above-described (1).

Advantageous Effect of the Invention

According to the present invention, a dielectric composition having excellent high-temperature load lifetime in high temperature atmosphere at 250° C. for automobiles and power devices using the SiC-based or GaN-based semiconductor; and an electronic component using the dielectric composition can be provided.

BRIEF DESCRIPTION OF THE DRAWINGS

FIG. 1 shows a cross section of the laminated ceramic capacitor of the first to fourth embodiment of the present invention.

DETAILED DESCRIPTION OF THE INVENTION

Embodiments

First, the multilayer ceramic capacitor, which is the main application of the dielectric composition of the present invention, will be described. The following description is a description of the same common configuration in the first to fourth embodiments described later. FIG. 1 is a cross-sectional view of a general multilayer ceramic capacitor.

The multilayer ceramic capacitors 1, 101, 201, 301 are composed of the capacitor element main bodies 10, 110, 210, 310 in which the dielectric layers 2, 102, 202, 302 and the inner electrode layers 3, 103, 203, 303 are alternately laminated. At both ends of the capacitor element main bodies 10, 110, 210, 310, a pair of the external electrodes 4, 104, 204, 304, each of which is electrically connected to the inner electrode layers 3, 103, 203, 303 alternately arranged inside the capacitor element main bodies 10, 110, 210, 310, is formed. The shapes of the capacitor element main bodies 10, 110, 210, and 310 are not particularly limited, but are usually rectangular parallelepiped. In addition, the size is not particularly limited, and it may be set to an appropriate size according to the application.

The inner electrode layers 3, 103, 203, and 303 are stacked so that the respective end faces thereof are alternately exposed on the surfaces of the opposing two end portions of the capacitor element main bodies 10, 110, 210, 310. The pairs of external electrodes 4, 104, 204, 304 are formed at both ends of the capacitor element main bodies 10, 110, 210, 310 and connected to the exposed end faces of the alternately arranged inner electrode layers 3, 103, 203, 303 to form the capacitor circuit.

The thickness of the dielectric layers 2, 102, 202, and 302 is not particularly limited, but is preferably 100 μm or less per layer, more preferably 30 μm or less. The lower limit of the thickness is not particularly limited but is, for example, about 0.5 μm. According to the dielectric composition of the present invention, even when the interlayer thickness is 0.5 μm to 30 μm, the multilayer ceramic capacitor 1, 101, 201 and 301, which has the dielectric layer with a high DC withstand voltage and a long high-temperature load lifetime, can be formed.

The number of stacked layers of the dielectric layers 2, 102, 202, and 302 is not particularly limited, but it is preferably 20 or more, and more preferably 50 or more.

The conductive material contained in the inner electrode layers 3, 103, 203, and 303 is not particularly limited, but Ni, a Ni alloy, Cu or a Cu alloy is preferable. Various trace components such as P may be contained in an amount of about 0.1 mass % or less in the Ni, Ni based alloy, Cu or Cu based alloy. In addition, the inner electrode layers 3, 103, 203, and 303 may be formed using commercially available electrode paste. The thicknesses of the inner electrode layers 3, 103, 203, and 303 may be appropriately determined according to the application and the like.

More preferably, the conductive material contained in the inner electrode layer 3 is Ni or a Ni-based alloy because the constituent material of the dielectric layer 2 has reduction resistance. It is more preferable that this Ni or Ni-based alloy is a main component and contains one or more accessory components selected from Al, Si, Li, Cr and Fe.

By including one or more kinds of accessory components selected from Al, Si, Li, Cr and Fe in the Ni or Ni based alloy which is the main component of the inner electrode layers 3, 103, 203, 303, the accessory component reacts with oxygen to form an oxide film of a accessory component on the surface of Ni before it reacts with the oxygen contained therein to become NiO. As a result, oxygen in the outside air cannot react with Ni unless it passes through the oxide film of the accessory component, so that Ni is hardly oxidized. As a result, even when continuously used at a high temperature of 250° C., it becomes hard for deterioration of continuity and conductivity due to oxidation of the inner electrode layer containing Ni as the main component becomes difficult to occur.

The conductive material contained in the external electrodes 4, 104, 204, and 304 is not particularly limited, but in the present invention, inexpensive Ni, Cu and Au, Ag, Pd having high heat resistance; or alloys thereof can be used. The thickness of the external electrodes 4, 104, 204, and 304 may be appropriately determined according to the application and the like, but is usually preferably about 10 to 50 μm.

Next, the dielectric composition according to the present embodiment will be described in detail from the first to fourth embodiments.

First Embodiment

The dielectric composition according to the first embodiment is a dielectric composition having a main component represented by the chemical formula $a\{K(Ba_{1-x}Sr_x)_2Nb_5O_{15}\}+b\{(Ca_{1-y}Sr_y)(Zr_{1-z}Ti_z)O_3\}$, x, y and z satisfying $0.35 \leq x \leq 0.75$, $0.01 \leq y \leq 0.25$, $0.01 \leq z \leq 0.25$, and the relationship between a and b in molar ratio satisfying $a+b=1.00$, and $0.32 \leq a \leq 0.66$.

By the dielectric composition having the above-described features, a dielectric composition, which is suitable for use in the temperature range about 250° C.; has excellent high-temperature load lifetime and relatively high relative dielectric constant, can be provided. Reasons for being able to obtain these effects are explained below.

The inventors found that the effect of suppressing migration of oxygen defects, which are believed to be the reason for deterioration of the high-temperature load lifetime, can be obtained by including: a perovskite-type complex oxide represented by the chemical formula $(Ca_{1-y}Sr_y)(Zr_{1-z}Ti_z)O_3$; and a tungsten bronze-type complex oxide represented by the chemical formula $K(Ba_{1-x}Sr_x)_2Nb_5O_{15}$. Accordingly, it is interpreted that improvement of the high-temperature load lifetime at 250° C., which has been difficult to achieve by using the dielectric compound having $K(Ba_{1-x}Sr_x)_2Nb_5O_{15}$ alone as the main component; or $(Ca_{1-y}Sr_y)(Zr_{1-z}Ti_z)O_3$ alone as the main component, becomes possible. Furthermore, by including $K(Ba_{1-x}Sr_x)_2Nb_5O_{15}$ in $(Ca_{1-y}Sr_y)(Zr_{1-z}Ti_z)O_3$ having the relative dielectric constant of less than 100, the relative dielectric constant is also improved.

In the present embodiment, the tungsten bronze-type complex oxide represented by $K(Ba_{1-x}Sr_x)_2Nb_5O_{15}$ and the perovskite-type complex oxide represented by $(Ca_{1-y}Sr_y)(Zr_{1-z}Ti_z)O_3$ may exist as crystal grains in which $K(Ba_{1-x}Sr_x)_2Nb_5O_{15}$ and $K(Ba_{1-x}Sr_x)_2Nb_5O_{15}$ are solid soluted. Alternatively, each of them may exist as a different single crystal grain separately. In any case, excellent high-temperature load lifetime can be obtained.

Ba in the chemical formula $K(Ba_{1-x}Sr_x)_2Nb_5O_{15}$ is substituted by Sr. The substitution amount x is $0.35 \leq x \leq 0.75$. When the substitution amount x is less than 0.35, it is difficult to obtain sufficient insulation properties, and as a result, it tends to be difficult to obtain the favorable high-temperature load life. On the other hand, if the substitution amount x exceeds 0.75, the leakage current is liable to abruptly increase at the temperature of 250° C. when the DC voltage is applied. As a result, it tends to be difficult to obtain a sufficient high-temperature load lifetime.

Ca in the chemical formula $(Ca_{1-y}Sr_y)(Zr_{1-z}Ti_z)O_3$ is substituted by Sr. The substitution amount y is $0.01 \leq y \leq 0.25$. When the substitution amount y is less than 0.01, the effect of suppressing migration of oxygen defects, which are believed to be the reason of deterioration of the high-temperature load lifetime, cannot be obtained and it is difficult to obtain a sufficiently high high-temperature load lifetime. On the other hand, if the substitution amount y exceeds 0.25, the insulating property tends to be lowered as the temperature rises, resulting in a low high temperature load lifetime.

Zr in the chemical formula $(Ca_{1-y}Sr_y)(Zr_{1-z}Ti_z)O_3$ is replaced by Ti. The substitution amount y is $0.01 \leq z \leq 0.25$. When the substitution amount z is less than 0.01, the effect of suppressing the migration of oxygen defects, which are believed to be the reason of deterioration of the high-temperature load lifetime, cannot be obtained and it is difficult to obtain a sufficiently high high-temperature load lifetime. On the other hand, if the substitution amount z exceeds 0.25, the insulating property tends to decrease as the temperature becomes high, resulting in a low high-temperature load lifetime.

The relationship between a and b in the chemical formula is $a+b=1.00$, $0.32 \leq a \leq 0.66$. If "a" were less than 0.32 or "a" exceeded 0.66, it would be difficult to obtain an effect of suppressing the migration of oxygen defects, which are believed to be the reason of deterioration of the high-temperature load lifetime, and it tends to be difficult to obtain a sufficient high-temperature load lifetime.

As a preferred embodiment of the present invention, it is preferable that a relationship between α and β satisfies $0.50 \leq \alpha/\beta \leq 1.90$ and $80\% \leq \alpha+\beta$ when α is an area ratio of crystal grains of $K(Ba_{1-x}Sr_x)_2Nb_5O_{15}$ in percentage; and β is an area ratio of crystal grains of $(Ca_{1-y}Sr_y)(Zr_{1-z}Ti_z)O_3$ in percentage, in a case where the dielectric composition is made of plurality of crystal grains and a total area ratio of all of the plurality of crystal grains constituting the dielectric composition is defined as 100%.

The inventors found that generation of electron avalanche at high temperature can be further suppressed by controlling the dielectric composition to the above-described contents. Therefore, it becomes possible to obtain a high DC withstand voltage at 250° C., which was difficult to obtain with the conventional dielectric composition. Accordingly, it is believed that providing the dielectric composition having a high DC withstand voltage and excellent high-temperature load lifetime concurrently at 250° C.; and the electronic component using the dielectric composition, becomes possible.

The above-described area ratio can be obtained by: performing micro-sampling using FIB (Focused Ion Beam); preparing TEM samples of the dielectric layer; and performing SETM-EDS (Scanning Transmission Electron Microscopy-Energy Dispersive X-ray Spectrometry) mapping by using a scanning transmission electron microscope in the laminated ceramic capacitor which is an example of the present embodiment. The field of view of the mapping is 7 μm×7 μm, and it is preferable to perform mapping of 10 fields or more for each sample. The area ratio can also be obtained by performing element mapping with EPMA (Electron Probe Micro Analyzer) for the cross section of the polished dielectric layer. In this case, the field of view of the mapping is 10 μm×10 μm, mapping more than 5 fields of view for each sample may be performed, and the area ratio may be calculated from the obtained element map.

Further, in a preferred embodiment of the present invention, x, y, z, $\alpha$ and $\beta$ satisfy $0.35 \leq x \leq 0.50$, $0.02 \leq y \leq 0.10$, and $0.02 \leq z \leq 0.10$, $0.60 \leq \alpha/\beta \leq 1.50$, and $90\% \leq \alpha+\beta$. This makes it possible to further suppress generation of electron avalanche at a high temperature and to further enhance the effect of suppressing an increase in leakage current in a high temperature load test. As a result, a higher DC withstand voltage and a longer high-temperature load lifetime can be easily obtained.

As described above, the dielectric composition according to the present embodiment exhibits favorable characteristics in a high-temperature range, so that it can be used suitably in the use temperature range (−55° C. to 250° C.) of SiC or GaN-based power devices. In addition, it can be suitably used as an electronic component for noise removal under harsh environments such as an automobile engine room.

In the above-described chemical formula $K(Ba_{1-x}Sr_x)_2Nb_5O_{15}$, the molar ratio for each K site, Ba site, Nb site, and O site is basically 1:2:5:15. However, as long as it retains the tungsten bronze structure, it may be increased or decreased in a certain degree. Similarly, in $(Ca_{1-y}Sr_y)(Zr_{1-z}Ti_z)O_3$, the molar ratio of each Ca site, Zr site, and O site is basically 1:1:3. However, as long as it can retain the perovskite structure, it may be increased or decreased at a certain degree.

In addition, the dielectric composition according to the present embodiment may contain minute impurities or accessory components as long as it does not greatly degrade the DC withstand voltage at high temperature and the high-temperature load lifetime, which is an effect of the present invention. For example, it is Mg, Mn, Si, V. Cr or the like. Therefore, the content of the main component is not particularly limited, but is, for example, 70 mol % or more and 100 mol % or less with respect to the entire dielectric composition containing the main component.

Next, a method of manufacturing the dielectric composition according to this embodiment will be described. As a method for producing the dielectric composition, a known method may be adopted. For example, a solid phase method or the like, in which starting materials such as oxide powder and carbonate are mixed, and the resultant mixed powder is heat-treated and synthesized may, be adopted. Here, two manufacturing methods are described. The first manufacturing method (manufacturing method 1 of the dielectric composition) is a method, in which the dielectric composition of a $\{K(Ba_{1-x}Sr_x)_2Nb_5O_{15}\}+N(Ca_{1-y}Sr_y)(Zr_{1-z}Ti_z)O_3\}$ is solid solution crystal grains; or crystal grains constituted from the solid solution crystal grains and $K(Ba_{1-x}Sr_x)_2Nb_5O_{15}$ or $(Ca_{1-y}Sr_y)(Zr_{1-z}Ti_z)O_3$ are mixed. The second production method (production method 2 of the dielectric composition) is a method, in which the area ratio of crystal grains constituted by $K(Ba_{1-x}Sr_x)_2Nb_5O_{15}$ or $(Ca_{1-y}Sr_y)(Zr_{1-z}Ti_z)O_3$ is increased. In other words, this is a manufacturing method in the case where the area ratio of the crystal grains composed of the solid solution is reduced.

Manufacturing Method of Dielectric Composition 1

For $K(Ba_{1-x}Sr_x)_2Nb_5O_{15}$, $K_2CO_3$, $BaCO_3$, $SrCO_3$, $Nb_2O_5$ powders having the average particle size of 1.0 μm or less are prepared as starting materials. In addition, for $(Ca_{1-y}Sr_y)(Zr_{1-z}Ti_z)O_3$, $CaCO_3$, $SrCO_3$, $TiO_2$, $ZrO_2$ powders having the average particle size of 1.0 μm or less are prepared as starting materials. After weighing these starting materials at a predetermined ratio, wet mixing is carried out for a predetermined time by using a ball mill or the like. Calcined powder of $a\{K(Ba_{1-x}Sr_x)_2Nb_5O_{15}\}+b\{(Ca_{1-y}Sr_y)(Zr_{1-z}Ti_z)O_3\}$ having the average particle diameter of 0.5 μm to 2.0 μm may be obtained by performing heat treatment in the air at 1000° C. or less after drying the mixed powder. Alternatively, the calcined powder of $a\{K(Ba_{1-x}Sr_x)_2Nb_5O_{15}\}+b\{(Ca_{1-y}Sr_y)(Zr_{1-z}Ti_z)O_3\}$ having the average particle diameter of 0.5 μm to 2.0 μm may be obtained: by performing heat treatment at 1000° C. or less by using the above-described starting materials; by preparing the calcined powder of $K(Ba_{1-x}Sr_x)_2Nb_5O_{15}$ and the calcined powder of $(Ca_{1-y}Sr_y)(Zr_{1-z}Ti_z)O_3$ separately; and then by mixing them.

Production Method 2 of Dielectric Composition

When raising the area ratio of the crystal grains constituting the $K(Ba_{1-x}Sr_x)_2Nb_5O_{15}$ or $(Ca_{1-y}Sr_y)(Zr_{1-z}Ti_z)O_3$, the dielectric composition is manufactured as follows.

First, as a starting material for the $K(Ba_{1-x}Sr_x)_2Nb_5O_{15}$ calcined powder, $K_2CO_3$, $BaCO_3$, $SrCO_3$, and $Nb_2O_5$ powders having the average particle size of 1.0 μm or less are prepared. After weighing to a predetermined ratio, wet blending is performed for a predetermined time by using a ball mill or the like. After drying the mixed powder, heat treatment in two stages of heat treatment (formation of a single phase) at 1000° C. or less and heat treatment at 850° C. or less (homogenization of the element distribution inside the particle) is performed in the air, and the calcined powder is obtained. Since the resultant calcined powder is subjected to the two-stage heat treatment, almost no heterogeneous phase is formed and the distribution of the elemental part distribution inside the grain is small, so that abnormal grain growth and reaction with $(Ca_{1-y}Sr_y)(Zr_{1-z}Ti_z)O_3$ can be suppressed.

Next, $CaCO_3$, $SrCO_3$, $TiO_2$, and $ZrO_2$ powders having the average particle size of 1.0 μm or less are prepared as starting raw materials for the calcined powder of $(Ca_{1-y}Sr_y)(Zr_{1-z}Ti_z)O_3$. Thereafter, similarly to the above-mentioned method of manufacturing the calcined powder of $K(Ba_{1-x}Sr_x)_2Nb_5O_{15}$, after weighing to a predetermined ratio, wet mixing is performed using a ball mill or the like, and heat treatment at 1000° C. or less in air and 850° C. or less, to obtain the calcined powder. Since the resultant calcined powder is subjected to the two-stage heat treatment, almost no heterogeneous phase is formed and the distribution of the elemental part distribution inside the grain is small, so that abnormal grain growth and reaction with $K(Ba_{1-x}Sr_x)_2Nb_5O_{15}$ can be suppressed.

Thereafter, the obtained calcined powder of $K(Ba_{1-x}Sr_x)_2Nb_5O_{15}$ and the calcined powder of $(Ca_{1-y}Sr_y)(Zr_{1-z}Ti_z)O_3$ were mixed and crushed to obtain the average particle diameter of 0.5 μm to 2.0 μm By weight based on the total weight of the mixture.

Next, an example of a method for manufacturing the multilayer ceramic capacitor shown in FIG. 1 will be described.

The laminated ceramic capacitor 1 of the present embodiment is manufactured by producing the green chip by an ordinary printing method or a sheet method using a paste and calcining the applied outer electrode after calcining it as in the conventional laminated capacitors.

The mixed powder obtained as described above is turned into a paint to prepare a dielectric layer paste. The dielectric layer paste may be an organic paint obtained by kneading a dielectric mixed powder and an organic vehicle or may be an aqueous paint.

The organic vehicle is a binder dissolved in an organic solvent. The binder used for the organic vehicle is not particularly limited, and may be appropriately selected from various ordinary binders such as ethyl cellulose and polyvinyl butyral. The organic solvent to be used is also not particularly limited, and it may be appropriately selected from various organic solvents such as terpineol, butyl carbitol, acetone and the like depending on the method of use such as printing method and sheet method.

When the dielectric layer paste is used as a water-based coating material, an aqueous vehicle obtained by dissolving a water-soluble binder or a dispersant in water may be kneaded with a dielectric material. The water-soluble binder used for the aqueous vehicle is not particularly limited, and for example, polyvinyl alcohol, cellulose, water-soluble acrylic resin, or the like may be used.

The inner electrode layer paste is prepared by kneading the above conductive material composed of various conductive metals or alloys or various oxides, organometallic compounds, resinates or the like to be the above-mentioned conductive materials after calcining; and the above-mentioned organic vehicle.

The external electrode paste may be prepared in the same manner as the inner electrode layer paste described above.

There is no particular limitation on the content of the organic vehicle in each of the above-mentioned pastes, and it is sufficient to set the usual content, for example, the binder to about 1 mass % to 5 mass % and the solvent to about 10 mass % to 50 mass %. In addition, additives selected from various dispersants, plasticizers, dielectrics, insulators, and the like may be contained in each paste as necessary. The total content of these is preferably 10% by mass or less.

When a printing method is used, the dielectric layer paste and the inner electrode layer paste are printed and laminated on a substrate such as PET, cut into a predetermined shape, and peeled from the substrate to form a green chip.

In the case of using the sheet method, the green sheet is formed using the dielectric layer paste, the inner electrode layer paste is printed on the green sheet, and these are laminated to form a green chip.

Before calcining, de-binder treatment is applied to the green chip. As the binder removal condition, the heating rate is preferably 5° C./hour to 300° C./hour, the holding temperature is preferably 180° C. to 500° C., and the temperature holding time is preferably 0.5 hour to 24 hours. Further, the firing atmosphere is air or a reducing atmosphere. In the above binder removal treatment, a wetter or the like may be used to humidify the $N_2$ gas, the mixed gas, or the like. In this case, the water temperature is preferably about 5° C. to 75° C.

The holding temperature at the time of calcining is preferably 1000° C. to 1400° C., more preferably 1100° C. to 1350° C. When the holding temperature is lower than the above range, the densification becomes insufficient. When the holding temperature is beyond the above range, it is likely that discontinuity of the electrode due to abnormal sintering of the inner electrode layer; and deterioration of capacity change ratio due to diffusion of the inner electrode layer constituting material, occur. On the other hand, if it exceeds the above range, the crystal grains become coarse and it is possible that the DC withstand voltage is lowered.

Furthermore, when increasing the area ratio of the crystal grains composed of $K(Ba_{1-x}Sr_x)_2Nb_5O_{15}$ and the crystal grains composed of $(Ca_{1-y}Sr_y)(Zr_{1-z}Ti_z)O_3$, it is important to strictly control the condition as described below. In order to make each individual crystal particles independent of solid solution, it is preferable to set the temperature rise rate to 100° C./hour to 5000° C./hour, more preferably 1000° C./hour to 5000° C. In order to control the particle size distribution after sintering within the range of 0.5 µm to 5.0 µm, it is preferable: to set the temperature holding time to 0.5 hour to 2.0 hours, more preferably 0.5 hour to 1.0 hour; and to set the cooling rate to 100 C/hour to 500° C./hour, more preferably 200° C./hour to 300° C./hour, in order to suppress the volume diffusion between the crystal grains.

Further, as the atmosphere for calcining, it is preferable to use a mixed gas of humidified $N_2$ and $H_2$ and to bake at an oxygen partial pressure of $10^{-2}$ to $10^{-9}$ Pa. In the case of increasing the area ratio of the crystal particles composed of $K(Ba_{1-x}Sr_x)_2Nb_5O_{15}$ and the crystal particles composed of $(Ca_{1-y}Sr_y)(Zr_{1-z}Ti_z)O_3$, it is more preferable to set the oxygen partial pressure to $10^{-2}$ to $10^{-5}$ Pa. By performing calcining in an atmosphere having a high oxygen partial pressure, volume diffusion between crystal particles can be suppressed, so that an effect of hardly forming a solid solution can be obtained. However, when sintering is performed in a state where the oxygen partial pressure is high, Ni is oxidized in the case of the inner electrode layer made of Ni, and the conductivity as an electrode is lowered. In this case, by including one or more kinds of accessory components selected from Al, Si, Li, Cr and Fe in the conductive material containing Ni as the main component, which is a more preferred form of the present embodiment, the oxidation resistance of Ni is improved, and even in an atmosphere having a high oxygen partial pressure, it is possible to ensure conductivity as the inner electrode layer.

After calcining, an annealing treatment is performed on the obtained capacitor element main body as necessary. The annealing treatment condition may be a known condition. For example, it is preferable that the oxygen partial pressure at the time of annealing is higher than the oxygen partial pressure at the time of baking and the holding temperature is 1000° C. or lower.

In the above description, the manufacturing method, in which the binder removal processing and the firing and the annealing treatment are carried out independently, is described, but it may be carried out continuously.

The capacitor element main body obtained as described above is subjected to end face polishing by, for example, barrel polishing or sand blasting, and the external electrode paste is applied and calcined to form the external electrode 4. Then, if necessary, a coating layer is formed on the surface of the external electrode 4 by plating or the like.

Second Embodiment

Next, the dielectric composition of the second embodiment is explained in detail.

The dielectric composition according to the second embodiment is a dielectric composition having a main component represented by the chemical formula $a\{K(Ba_{1-x}Sr_x)_2Nb_5O_{15}\}+b\{Ba(Ti_{1-u}Zr_u)O_3\}$, x and u satisfying $0.35 \leq x \leq 0.75$, $0.02 \leq u \leq 0.25$, and the relationship between a and b in molar ratio satisfying $a+b=1.00$, and $0.35 \leq a \leq 0.65$.

By the dielectric composition having the above-described features, a dielectric composition, which is suitable for use in the temperature range about 250° C. and has excellent high-temperature load lifetime, can be provided. Reasons for being able to obtain these effects are explained below.

The inventors found that the effect of suppressing migration of oxygen defects, which are believed to be the reason for deterioration of the high-temperature load lifetime, can be obtained by including: a perovskite-type complex oxide represented by the chemical formula $Ba(Ti_{1-u}Zr_u)O_3$; and a tungsten bronze-type complex oxide represented by the chemical formula $K(Ba_{1-x}Sr_x)_2Nb_5O_{15}$. Accordingly, it is interpreted that improvement of the high-temperature load lifetime at 250° C., which has been difficult to achieve by using the dielectric compound having $K(Ba_{1-x}Sr_x)_2Nb_5O_{15}$ alone as the main component; or $Ba(Ti_{1-u}Zr_u)O_3$ alone as the main component, becomes possible.

In the present embodiment, the tungsten bronze-type complex oxide represented by $K(Ba_{1-x}Sr_x)_2Nb_5O_{15}$ and the perovskite-type complex oxide represented by $Ba(Ti_{1-u}Zr_u)O_3$ may exist as crystal grains in which $K(Ba_{1-x}Sr_x)_2Nb_5O_{15}$ and $K(Ba_{1-x}Sr_x)_2Nb_5O_{15}$ are solid soluted. Alternatively, each of them may exist as a different single crystal grain separately. In any case, excellent high-temperature load lifetime can be obtained.

Ba in the chemical formula of $K(Ba_{1-x}Sr_x)_2Nb_5O_{15}$ is substituted by Sr. The substitution amount x is $0.35 \leq x \leq 0.75$. The reasons for setting the upper and lower limits of the substitution amount x is the same as in the first embodiment.

Ti in the chemical formula $Ba(Ti_{1-u}Zr_u)O_3$ is substituted by Zr. The substitution amount u is $0.02 \leq u \leq 0.25$. When the substitution amount u is less than 0.02, the effect of suppressing migration of oxygen defects, which are believed to be the reason of deterioration of the high-temperature load lifetime, cannot be obtained and it is difficult to obtain a sufficiently high high-temperature load lifetime. On the other hand, if the substitution amount u exceeds 0.25, excessive Zr tends to form a heterophase at the grain boundary and the dispersion of the diameter of the crystal grains in the dielectric composition tends to become large. As a result, the high-temperature load lifetime is reduced.

The relationship between a and b in the chemical formula is a+b=1.00, $0.35 \leq a \leq 0.65$. If "a" were less than 0.35 or "a" exceeded 0.65, it would be difficult to obtain an effect of suppressing the migration of oxygen defects, which are believed to be the reason of deterioration of the high-temperature load lifetime, and it tends to be difficult to obtain a sufficient high-temperature load lifetime.

As a preferred embodiment of the present invention, it is preferable that a relationship between α and β satisfies $0.55 \leq \alpha/\beta \leq 1.85$ and $80\% \leq \alpha+\beta$ when α is an area ratio of crystal grains of $K(Ba_{1-x}Sr_x)_2Nb_5O_{15}$ in percentage; and β is an area ratio of crystal grains of $Ba(Ti_{1-u}Zr_u)O_3$ in percentage, in a case where the dielectric composition is made of plurality of crystal grains and a total area ratio of all of the plurality of crystal grains constituting the dielectric composition is defined as 100%.

The inventors found that generation of electron avalanche at high temperature can be further suppressed by controlling the dielectric composition to the above-described contents. Therefore, it becomes possible to obtain a high DC withstand voltage at 250° C., which was difficult to obtain with the conventional dielectric composition. Accordingly, it is believed that providing the dielectric composition having a high DC withstand voltage and excellent high-temperature load lifetime concurrently at 250° C.; and the electronic component using the dielectric composition, becomes possible.

The above-described area ratio can be measured by the same method as explained in the first embodiment.

Further, in a preferred embodiment of the present invention, x, u, α and β satisfy $0.35 \leq x \leq 0.50$, $0.04 \leq u \leq 0.15$, $0.70 \leq \alpha/\beta \leq 1.50$, and $90\% \leq \alpha+\beta$. This makes it possible to further suppress generation of electron avalanche at a high temperature and to further enhance the effect of suppressing an increase in leakage current in a high temperature load test. As a result, a higher DC withstand voltage and a longer high-temperature load lifetime can be easily obtained.

As described above, the dielectric composition according to the present embodiment exhibits favorable characteristics in a high-temperature range, so that it can be used suitably in the use temperature range (−55° C. to 250° C.) of SiC or GaN-based power devices. In addition, it can be suitably used as an electronic component for noise removal under harsh environments such as an automobile engine room.

In the above-described chemical formula $K(Ba_{1-x}Sr_x)_2Nb_5O_{15}$, the molar ratio for each K site, Ba site, Nb site, and O site is basically 1:2:5:15. However, as long as it retains the tungsten bronze structure, it may be increased or decreased in a certain degree. Similarly, in $Ba(Ti_{1-u}Zr_u)O_3$, the molar ratio of each Ba site, Ti site, and O site is basically 1:1:3. However, as long as it can retain the perovskite structure, it may be increased or decreased at a certain degree.

In addition, the dielectric composition according to the present embodiment may contain minute impurities or accessory components as long as it does not greatly degrade the DC withstand voltage at high temperature and the high-temperature load lifetime, which is an effect of the present invention. For example, it is Mg, Mn, Si, V, Cr or the like. Therefore, the content of the main component is not particularly limited, but is, for example, 70 mol % or more and 100 mol % or less with respect to the entire dielectric composition containing the main component.

Next, a method of manufacturing the dielectric composition according to this embodiment will be described. As a method for producing the dielectric composition, a known method may be adopted. For example, a solid phase method or the like, in which starting materials such as oxide powder and carbonate are mixed, and the resultant mixed powder is heat-treated and synthesized may, be adopted. Here, two manufacturing methods are described. The first manufacturing method (manufacturing method A1 of the dielectric composition) is a method, in which the dielectric composition of a $\{K(Ba_{1-x}Sr_x)_2Nb_5O_{15}\}+b\{Ba(Ti_{1-u}Zr_u)O_3\}$ is solid solution crystal grains; or crystal grains constituted from the solid solution crystal grains and $K(Ba_{1-x}Sr_x)_2Nb_5O_{15}$ or $Ba(Ti_{1-u}Zr_u)O_3$ are mixed. The second production method (production method A2 of the dielectric composition) is a method, in which the area ratio of crystal grains constituted by $K(Ba_{1-x}Sr_x)_2Nb_5O_{15}$ or $Ba(Ti_{1-u}Zr_u)O_3$ is increased. In other words, this is a manufacturing method in the case where the area ratio of the crystal grains composed of the solid solution is reduced.

Manufacturing Method of Dielectric Composition A1

For $K(Ba_{1-x}Sr_x)_2Nb_5O_{15}$, $K_2CO_3$, $BaCO_3$, $SrCO_3$, $Nb_2O_5$ powders having the average particle size of 1.0 μm or less are prepared as starting materials. In addition, for $Ba(Ti_{1-u}Zr_u)O_3$, $BaCO_3$, $TiO_2$, and $ZrO_2$ powders having the average particle size of 1.0 μm or less are prepared as starting materials. After weighing these starting materials at a predetermined ratio, wet mixing is carried out for a predetermined time by using a ball mill or the like. Calcined powder of a $\{K(Ba_{1-x}Sr_x)_2Nb_5O_{15}\}+b\{Ba(Ti_{1-u}Zr_u)O_3\}$ having the average particle diameter of 0.5 μm to 2.0 μm may be obtained by performing heat treatment in the air at 1100° C. or less after drying the mixed powder. Alternatively, the calcined powder of a $\{K(Ba_{1-x}Sr_x)_2Nb_5O_{15}\}+b\{Ba(Ti_{1-u}Zr_u)O_3\}$ having the average particle diameter of 0.5 μm to 2.0 μm may be obtained by: using the above-described stating materials; preparing the calcined powder of $K(Ba_{1-x}Sr_x)_2Nb_5O_{15}$ by performing heat treatment at 1000° C. or less and the calcined powder of $Ba(Ti_{1-u}Zr_u)O_3$ by performing heat treatment at 1100° C. or less, separately; and then by mixing the obtained calcined powders.

Production Method A2 of Dielectric Composition

When raising the area ratio of the crystal grains constituting the $K(Ba_{1-x}Sr_x)_2Nb_5O_{15}$ or $Ba(Ti_{1-u}Zr_u)O_3$, the dielectric composition is manufactured as follows.

First, as a starting material for $K(Ba_{1-x}Sr_x)_2Nb_5O_{15}$ calcined powder, $K_2CO_3$, $BaCO_3$, $SrCO_3$, and $Nb_2O_5$ powders having the average particle size of 1.0 μm or less are prepared. After weighing to a predetermined ratio, wet blending is performed for a predetermined time by using a ball mill or the like. After drying the mixed powder, heat treatment in two stages of heat treatment (formation of a single phase) at 1000° C. or less and heat treatment at 850° C. or less (homogenization of the element distribution inside the particle) is performed in the air, and the calcined powder is obtained. Since the resultant calcined powder is subjected to the two-stage heat treatment, almost no heterogeneous phase is formed and the distribution of the elemental part distribution inside the grain is small, so that abnormal grain growth and reaction with $Ba(Ti_{1-u}Zr_u)O_3$ can be suppressed.

Next, $BaCO_3$, $TiO_2$, and $ZrO_2$ powders having the average particle size of 1.0 μm or less are prepared as starting raw materials for the calcined powder of $Ba(Ti_{1-u}Zr_u)O_3$. Thereafter, similarly to the above-mentioned method of manufacturing the calcined powder of $K(Ba_{1-x}Sr_x)_2Nb_5O_{15}$, after weighing to a predetermined ratio, wet mixing is performed using a ball mill or the like, and heat treatment at 1100° C. or less in air and 850° C. or less, to obtain the calcined powder. Since the resultant calcined powder is subjected to the two-stage heat treatment, almost no heterogeneous phase is formed and the distribution of the elemental part distribution inside the grain is small, so that abnormal grain growth and reaction with $K(Ba_{1-x}Sr_x)_2Nb_5O_{15}$ can be suppressed.

Thereafter, the obtained calcined powder of $K(Ba_{1-x}Sr_x)_2Nb_5O_{15}$ and the calcined powder of $Ba(Ti_{1-u}Zr_u)O_3$ were mixed and crushed to obtain the average particle diameter of 0.5 μm to 2.0 μm By weight based on the total weight of the mixture.

Next, an example of a method for manufacturing the multilayer ceramic capacitor shown in FIG. 1 will be described.

The laminated ceramic capacitor 101 of the present embodiment is manufactured by producing the green chip by an ordinary printing method or a sheet method using a paste and calcining the applied outer electrode after calcining it as in the conventional laminated capacitors.

Preparation of: the paste for the dielectric layer; the paste for the inner electrode layer; the paste for the outer electrode layer; and the green chip, and de-binder treatment are performed by the same methods as in the first embodiment.

Furthermore, when increasing the area ratio of the crystal grains composed of $K(Ba_{1-x}Sr_x)_2Nb_5O_{15}$ and the crystal grains composed of $Ba(Ti_{1-u}Zr_u)O_3$, it is important to strictly control the condition as described below. In order to make each individual crystal particles independent of solid solution, it is preferable to set the temperature rise rate to 100° C./hour to 5000° C./hour, more preferably 1000° C./hour to 5000° C. In order to control the particle size distribution after sintering within the range of 0.5 μm to 5.0 μm, it is preferable: to set the temperature holding time to 0.5 hour to 2.0 hours, more preferably 0.5 hour to 1.0 hour; and to set the cooling rate to 100 C/hour to 500° C./hour, more preferably 200° C./hour to 300° C./hour, in order to suppress the volume diffusion between the crystal grains.

Further, as the atmosphere for calcining, it is preferable to use a mixed gas of humidified $N_2$ and $H_2$ and to bake at an oxygen partial pressure of $10^{-2}$ to $10^{-9}$ Pa. In the case of increasing the area ratio of the crystal particles composed of $K(Ba_{1-x}Sr_x)_2Nb_5O_{15}$ and the crystal particles composed of $Ba(Ti_{1-u}Zr_u)O_3$, it is more preferable to set the oxygen partial pressure to $10^{-2}$ to $10^{-5}$ Pa. By performing calcining in an atmosphere having a high oxygen partial pressure, volume diffusion between crystal particles can be suppressed, so that an effect of hardly forming a solid solution can be obtained. However, when sintering is performed in a state where the oxygen partial pressure is high, Ni is oxidized in the case of the inner electrode layer made of Ni, and the conductivity as an electrode is lowered. In this case, by including one or more kinds of accessory components selected from Al, Si, Li, Cr and Fe in the conductive material containing Ni as the main component, which is a more preferred form of the present embodiment, the oxidation resistance of Ni is improved, and even in an atmosphere having a high oxygen partial pressure, it is possible to ensure conductivity as the inner electrode layer.

The annealing treatment and the end face polishing of the obtained capacitor element main body 110; and formation of the outer electrode by using the capacitor element main body 110, are performed in the same manner as in the first embodiment.

Third Embodiment

Next, the dielectric composition of the third embodiment is explained in detail.

The dielectric composition according to the third embodiment is a dielectric composition having a main component represented by the chemical formula $a\{K(Ba_{1-x}Sr_x)_2Nb_5O_{15}\}+b\{(Ca_{1-v}Sr_v)TiSiO_5\}$, x and v satisfying $0.35 \le x \le 0.75$, $0.40 \le v \le 0.85$, and the relationship between a and b in molar ratio satisfying $a+b=1.00$, and $0.37 \le a \le 0.62$.

By the dielectric composition having the above-described features, a dielectric composition, which is suitable for use in the temperature range about 250° C. and has excellent high-temperature load lifetime, can be provided. Reasons for being able to obtain these effects are explained below.

The inventors found that the effect of suppressing migration of oxygen defects, which are believed to be the reason for deterioration of the high-temperature load lifetime, can be obtained by including: a titanite-type complex oxide represented by the chemical formula $(Ca_{1-v}Sr_v)TiSiO_5$; and a tungsten bronze-type complex oxide represented by the chemical formula $K(Ba_{1-x}Sr_x)_2Nb_5O_{15}$. Accordingly, it is interpreted that improvement of the high-temperature load lifetime at 250° C., which has been difficult to achieve by using the dielectric compound having $K(Ba_{1-x}Sr_x)_2Nb_5O_{15}$ alone as the main component; or $(Ca_{1-v}Sr_v)TiSiO_5$ alone as the main component, becomes possible.

In the present embodiment, the tungsten bronze-type complex oxide represented by $K(Ba_{1-x}Sr_x)_2Nb_5O_{15}$ and the titanite-type complex oxide represented by $(Ca_{1-v}Sr_v)TiSiO_5$ may exist as crystal grains in which $K(Ba_{1-x}Sr_x)_2Nb_5O_{15}$ and $K(Ba_{1-x}Sr_x)_2Nb_5O_{15}$ are solid soluted. Alternatively, each of them may exist as a different single crystal grain separately. In any case, excellent high-temperature load lifetime can be obtained.

Ba of $K(Ba_{1-x}Sr_x)_2Nb_5O_{15}$ in the chemical formula is substituted by Sr. The substitution amount x is $0.35 \leq x \leq 0.75$. The reasons for setting the upper and lower limits of the substitution amount x is the same as in the first embodiment.

Ca in the chemical formula $(Ca_{1-v}Sr_v)TiSiO_5$ is substituted by Sr. The substitution amount v is $0.40 \leq v \leq 0.85$. When the substitution amount v is less than 0.40, the effect of suppressing migration of oxygen defects, which are believed to be the reason of deterioration of the high-temperature load lifetime, cannot be obtained and it is difficult to obtain a sufficiently high high-temperature load lifetime. On the other hand, if the substitution amount v exceeded 0.85, the insulating property would decrease easily as the temperature rises, resulting in a low high-temperature load lifetime.

The relationship between a and b in the chemical formula is $a+b=1.00$, $0.37 \leq a \leq 0.62$. If "a" were less than 0.7 or "a" exceeded 0.62, it would be difficult to obtain an effect of suppressing the migration of oxygen defects, which are believed to be the reason of deterioration of the high-temperature load lifetime, and it tends to be difficult to obtain a sufficient high-temperature load lifetime.

As a preferred embodiment of the present invention, it is preferable that a relationship between $\alpha$ and $\beta$ satisfies $0.60 \leq \alpha/\beta \leq 1.60$ and $80\% \leq \alpha+\beta$ when $\alpha$ is an area ratio of crystal grains of $K(Ba_{1-x}Sr_x)_2Nb_5O_{15}$ in percentage; and $\beta$ is an area ratio of crystal grains of $(Ca_{1-v}Sr_v)TiSiO_5$ in percentage, in a case where the dielectric composition is made of plurality of crystal grains and a total area ratio of all of the plurality of crystal grains constituting the dielectric composition is defined as 100%.

The inventors found that generation of electron avalanche at high temperature can be further suppressed by controlling the dielectric composition to the above-described contents. Therefore, it becomes possible to obtain a high DC withstand voltage at 250° C., which was difficult to obtain with the conventional dielectric composition. Accordingly, it is believed that providing the dielectric composition having a high DC withstand voltage and excellent high-temperature load lifetime concurrently at 250° C.; and the electronic component using the dielectric composition, becomes possible.

The above-described area ratio can be measured by the same method as explained in the first embodiment.

Further, in a preferred embodiment of the present invention, x, v, $\alpha$ and $\beta$ satisfy $0.35 \leq x \leq 0.50$, $0.55 \leq v \leq 0.75$, $0.60 \leq \alpha/\beta \leq 1.10$, and $90\% \leq \alpha+\beta$. This makes it possible to further suppress generation of electron avalanche at a high temperature and to further enhance the effect of suppressing an increase in leakage current in a high temperature load test. As a result, a higher DC withstand voltage and a longer high-temperature load lifetime can be easily obtained.

As described above, the dielectric composition according to the present embodiment exhibits favorable characteristics in a high-temperature range, so that it can be used suitably in the use temperature range (−55° C. to 250° C.) of SiC or GaN-based power devices. In addition, it can be suitably used as an electronic component for noise removal under harsh environments such as an automobile engine room.

In the above-described chemical formula $K(Ba_{1-x}Sr_x)_2Nb_5O_{15}$, the molar ratio for each K site, Ba site, Nb site, and O site is basically 1:2:5:15. However, as long as it retains the tungsten bronze structure, it may be increased or decreased in a certain degree. Similarly, in $(Ca_{1-v}Sr_v)TiSiO_5$, the molar ratio of each Ca site, Ti site, Si site and O site is basically 1:1:1:5. However, as long as it can retain the titanite structure, it may be increased or decreased at a certain degree.

In addition, the dielectric composition according to the present embodiment may contain minute impurities or accessory components as long as it does not greatly degrade the DC withstand voltage at high temperature and the high-temperature load lifetime, which is an effect of the present invention. For example, it is Mg, Mn, Si, V, Cr or the like. Therefore, the content of the main component is not particularly limited, but is, for example, 70 mol % or more and 100 mol % or less with respect to the entire dielectric composition containing the main component.

Next, a method of manufacturing the dielectric composition according to this embodiment will be described. As a method for producing the dielectric composition, a known method may be adopted. For example, a solid phase method or the like, in which starting materials such as oxide powder and carbonate are mixed, and the resultant mixed powder is heat-treated and synthesized may, be adopted. Here, two manufacturing methods are described. The first manufacturing method (manufacturing method B1 of the dielectric composition) is a method, in which the dielectric composition of $a\{K(Ba_{1-x}Sr_x)_2Nb_5O_{15}\}+b\{(Ca_{1-v}Sr_v)TiSiO_5\}$ is solid solution crystal grains; or crystal grains constituted from the solid solution crystal grains and $K(Ba_{1-x}Sr_x)_2Nb_5O_{15}$ or $(Ca_{1-v}Sr_v)TiSiO_5$ are mixed. The second production method (production method B2 of the dielectric composition) is a method, in which the area ratio of crystal grains constituted by $K(Ba_{1-x}Sr_x)_2Nb_5O_{15}$ or $(Ca_{1-v}Sr_v)TiSiO_5$ is increased. In other words, this is a manufacturing method in the case where the area ratio of the crystal grains composed of the solid solution is reduced.

Manufacturing Method of Dielectric Composition B1

For $K(Ba_{1-x}Sr_x)_2Nb_5O_{15}$, $K_2CO_3$, $BaCO_3$, $SrCO_3$, $Nb_2O_5$ powders having the average particle size of 1.0 µm or less are prepared as starting materials. In addition, for $(Ca_{1-v}Sr_v)TiSiO_5$, $CaCO_3$, $SrCO_3$, $TiO_2$, and $SiO_2$ powders having the average particle size of 1.0 µm or less are prepared as starting materials. After weighing these starting materials at a predetermined ratio, wet mixing is carried out for a predetermined time by using a ball mill or the like. Calcined powder of $a\{K(Ba_{1-x}Sr_x)_2Nb_5O_{15}\}+b\{(Ca_{1-v}Sr_v)TiSiO_5\}$ having the average particle diameter of 0.5 µm to 2.0 µm may be obtained by performing heat treatment in the air at 1000° C. or less after drying the mixed powder. Alternatively, the calcined powder of $a\{K(Ba_{1-x}Sr_x)_2Nb_5O_{15}\}+b\{(Ca_{1-v}Sr_v)TiSiO_5\}$ having the average particle diameter of 0.5 µm to 2.0 µm may be obtained: by performing heat treatment at 1000° C. or less by using the above-described starting materials; by preparing the calcined powder of $K(Ba_{1-x}Sr_x)_2Nb_5O_{15}$ and the calcined powder of $(Ca_{1-v}Sr_v)TiSiO_5$ separately; and then by mixing them.

Production Method B2 of Dielectric Composition

When raising the area ratio of the crystal grains constituting the $K(Ba_{1-x}Sr_x)_2Nb_5O_{15}$ or $(Ca_{1-v}Sr_v)TiSiO_5$, the dielectric composition is manufactured as follows.

First, as a starting material for $K(Ba_{1-x}Sr_x)_2Nb_5O_{15}$ calcined powder, $K_2CO_3$, $BaCO_3$, $SrCO_3$, and $Nb_2O_5$ powders having the average particle size of 1.0 µm or less are prepared. After weighing to a predetermined ratio, wet blending is performed for a predetermined time by using a ball mill or the like. After drying the mixed powder, heat treatment in two stages of heat treatment (formation of a single phase) at 1000° C. or less and heat treatment at 850° C. or less (homogenization of the element distribution inside the particle) is performed in the air, and the calcined powder is obtained. Since the resultant calcined powder is subjected to the two-stage heat treatment, almost no heterogeneous phase is formed and the distribution of the elemental part distribution inside the grain is small, so that abnormal grain growth and reaction with $(Ca_{1-v}Sr_v)TiSiO_5$ can be suppressed.

Next, $CaCO_3$, $SrCO_3$, $TiO_2$, and $SiO_2$ powders having the average particle size of 1.0 μm or less are prepared as starting raw materials for the calcined powder of $(Ca_{1-v}Sr_v)TiSiO_5$. Thereafter, similarly to the above-mentioned method of manufacturing the calcined powder of $K(Ba_{1-x}Sr_x)_2Nb_5O_{15}$, after weighing to a predetermined ratio, wet mixing is performed using a ball mill or the like, and heat treatment at 1000° C. or less in air and 850° C. or less, to obtain the calcined powder. Since the resultant calcined powder is subjected to the two-stage heat treatment, almost no heterogeneous phase is formed and the distribution of the elemental part distribution inside the grain is small, so that abnormal grain growth and reaction with $K(Ba_{1-x}Sr_x)_2Nb_5O_{15}$ can be suppressed.

Thereafter, the obtained calcined powder of $K(Ba_{1-x}Sr_x)_2Nb_5O_{15}$ and the calcined powder of $(Ca_{1-v}Sr_v)TiSiO_5$ were mixed and crushed to obtain the average particle diameter of 0.5 μm to 2.0 μm By weight based on the total weight of the mixture.

Next, an example of a method for manufacturing the multilayer ceramic capacitor shown in FIG. 1 will be described.

The laminated ceramic capacitor 201 of the present embodiment is manufactured by producing the green chip by an ordinary printing method or a sheet method using a paste and calcining the applied outer electrode after calcining it as in the conventional laminated capacitors.

Preparation of: the paste for the dielectric layer; the paste for the inner electrode layer; the paste for the outer electrode layer; and the green chip, and de-binder treatment are performed by the same methods as in the first embodiment.

Furthermore, when increasing the area ratio of the crystal grains composed of $K(Ba_{1-x}Sr_x)_2Nb_5O_{15}$ and the crystal grains composed of $(Ca_{1-v}Sr_v)TiSiO_5$, it is important to strictly control the condition as described below. In order to make each individual crystal particles independent of solid solution, it is preferable to set the temperature rise rate to 100° C./hour to 5000° C./hour, more preferably 1000° C./hour to 5000° C. In order to control the particle size distribution after sintering within the range of 0.5 μm to 5.0 μm, it is preferable: to set the temperature holding time to 0.5 hour to 2.0 hours, more preferably 0.5 hour to 1.0 hour; and to set the cooling rate to 100 C/hour to 500° C./hour, more preferably 200° C./hour to 300° C./hour, in order to suppress the volume diffusion between the crystal grains.

Further, as the atmosphere for calcining, it is preferable to use a mixed gas of humidified $N_2$ and $H_2$ and to bake at an oxygen partial pressure of $10^{-2}$ to $10^{-9}$ Pa. In the case of increasing the area ratio of the crystal particles composed of $K(Ba_{1-x}Sr_x)_2Nb_5O_{15}$ and the crystal particles composed of $(Ca_{1-v}Sr_v)TiSiO_5$, it is more preferable to set the oxygen partial pressure to $10^{-2}$ to $10^{-5}$ Pa. By performing calcining in an atmosphere having a high oxygen partial pressure, volume diffusion between crystal particles can be suppressed, so that an effect of hardly forming a solid solution can be obtained. However, when sintering is performed in a state where the oxygen partial pressure is high, Ni is oxidized in the case of the inner electrode layer made of Ni, and the conductivity as an electrode is lowered. In this case, by including one or more kinds of accessory components selected from Al, Si, Li, Cr and Fe in the conductive material containing Ni as the main component, which is a more preferred form of the present embodiment, the oxidation resistance of Ni is improved, and even in an atmosphere having a high oxygen partial pressure, it is possible to ensure conductivity as the inner electrode layer.

The annealing treatment and the end face polishing of the obtained capacitor element main body 210; and formation of the outer electrode by using the capacitor element main body 210, are performed in the same manner as in the first embodiment.

Fourth Embodiment

Next, the dielectric composition of the fourth embodiment is explained in detail.

The dielectric composition according to the fourth embodiment is a dielectric composition having a main component represented by the chemical formula $a\{K(Ba_{1-x}Sr_x)_2Nb_5O_{15}\}+b\{(Ba_{1-w}Re_{2w/3})Nb_2O_6\}$, Re being at least one selected from a group consisting of: La; Pr; Nd; Sm; Y; Gd; Yb; and Dy, x and w satisfying 0.35≤x≤0.75, 0.20≤w≤0.85, and the relationship between a and b in molar ratio satisfying a+b=1.00, and 0.25≤a≤0.75.

By the dielectric composition having the above-described features, a dielectric composition, which is suitable for use in the temperature range about 250° C. and has excellent high-temperature load lifetime, can be provided. Reasons for being able to obtain these effects are explained below.

The inventors found that the effect of suppressing migration of oxygen defects, which are believed to be the reason for deterioration of the high-temperature load lifetime, can be obtained by including: a tungsten bronze type complex oxide represented by the chemical formula $(Ba_{1-w}Re_{2w/3})Nb_2O_6$; and a tungsten bronze-type complex oxide represented by the chemical formula $K(Ba_{1-x}Sr_x)_2Nb_5O_{15}$, having different unit lattice volumes each other. Accordingly, it is interpreted that improvement of the high-temperature load lifetime at 250° C., which has been difficult to achieve by using the dielectric compound having $K(Ba_{1-x}Sr_x)_2Nb_5O_{15}$ alone as the main component; or $(Ba_{1-w}Re_{2w/3})Nb_2O_6$ alone as the main component, becomes possible.

In the present embodiment, the tungsten bronze-type complex oxide represented by $K(Ba_{1-x}Sr_x)_2Nb_5O_{15}$ and the tungsten bronze-type complex oxide represented by $(Ba_{1-w}Re_{2w/3})Nb_2O_6$ may exist as crystal grains in which $K(Ba_{1-x}Sr_x)_2Nb_5O_{15}$ and $K(Ba_{1-x}Sr_x)_2Nb_5O_{15}$ are solid soluted. Alternatively, each of them may exist as a different single crystal grain separately. In any case, excellent high-temperature load lifetime can be obtained.

Ba of $K(Ba_{1-x}Sr_x)_2Nb_5O_{15}$ in the chemical formula is substituted by Sr. The substitution amount x is 0.35≤x≤0.75. The reasons for setting the upper and lower limits of the substitution amount x is the same as in the first embodiment.

Ba in the chemical formula $(Ba_{1-w}Re_{2w/3})Nb_2O_6$ is substituted by Re (any one selected from the group consisting of La, Pr, Nd, Sm, Y, Gd, Yb and Dy). The substitution amount w is 0.20≤w≤0.85. When the substitution amount w is less than 0.20, a leakage current tends to occur when a DC voltage is applied, and it is difficult to obtain a sufficiently high high-temperature load lifetime at high temperatures. On the other hand, if the substitution amount w exceeded 0.85, an excessive Re would form a hetero-phase easily and a low high-temperature load lifetime would be obtained.

In addition, Re is at least one selected from the group consisting of La, Pr, Nd, Sm, Y, Gd, Yb and Dy. When Re is an element other than the above-described group, for example, in the case of Ho or Er, the high-temperature load lifetime tends to be reduced.

The relationship between a and b in the chemical formula is a+b=1.00, 0.25≤a≤0.75. If "a" were less than 0.25 or "a"

exceeded 0.75, it would be difficult to obtain an effect of suppressing the migration of oxygen defects, which are believed to be the reason of deterioration of the high-temperature load lifetime, and it tends to be difficult to obtain a sufficient high-temperature load lifetime.

As a preferred embodiment of the present invention, it is preferable that a relationship between $\alpha$ and $\beta$ satisfies $0.35 \leq \alpha/\beta \leq 3.00$ and $80\% \leq \alpha+\beta$ when $\alpha$ is an area ratio of crystal grains of $K(Ba_{1-x}Sr_x)_2Nb_5O_{15}$ in percentage; and $\beta$ is an area ratio of crystal grains of $(Ba_{1-w}Re_{2w/3})Nb_2O_6$ in percentage, in a case where the dielectric composition is made of plurality of crystal grains and a total area ratio of all of the plurality of crystal grains constituting the dielectric composition is defined as 100%.

The inventors found that generation of electron avalanche at high temperature can be further suppressed by controlling the dielectric composition to the above-described contents. Therefore, it becomes possible to obtain a high DC withstand voltage at 250° C., which was difficult to obtain with the conventional dielectric composition. Accordingly, it is believed that providing the dielectric composition having a high DC withstand voltage and excellent high-temperature load lifetime concurrently at 250° C.; and the electronic component using the dielectric composition, becomes possible.

The above-described area ratio can be measured by the same method as explained in the first embodiment.

Further, in a preferred embodiment of the present invention, Re is one selected from the group consisting of La, Pr and Nd; x, w, $\alpha$ and $\beta$ satisfy $0.35 \leq x \leq 0.50$, $0.40 \leq w \leq 0.60$, $0.60 \leq \alpha/\beta \leq 1.50$, and $90\% \leq \alpha+\beta$. This makes it possible to further suppress generation of electron avalanche at a high temperature and to further enhance the effect of suppressing an increase in leakage current in a high temperature load test. As a result, a higher DC withstand voltage and a longer high-temperature load lifetime can be easily obtained.

As described above, the dielectric composition according to the present embodiment exhibits favorable characteristics in a high-temperature range, so that it can be used suitably in the use temperature range (−55° C. to 250° C.) of SiC or GaN-based power devices. In addition, it can be suitably used as an electronic component for noise removal under harsh environments such as an automobile engine room.

In the above-described chemical formula $K(Ba_{1-x}Sr_x)_2Nb_5O_{15}$, the molar ratio for each K site, Ba site, Nb site, and O site is basically 1:2:5:15. However, as long as it retains the tungsten bronze structure, it may be increased or decreased in a certain degree. Similarly, in $(Ba_{1-w}Re_{2w/3})Nb_2O_6$, the molar ratio of each Ba site, Nb site, and O site is basically 1:2:6. However, as long as it can retain the tungsten bronze structure, it may be increased or decreased at a certain degree.

In addition, the dielectric composition according to the present embodiment may contain minute impurities or accessory components as long as it does not greatly degrade the DC withstand voltage at high temperature and the high-temperature load lifetime, which is an effect of the present invention. For example, it is Mg, Mn, Si, V, Cr or the like. Therefore, the content of the main component is not particularly limited, but is, for example, 70 mol % or more and 100 mol % or less with respect to the entire dielectric composition containing the main component.

Next, a method of manufacturing the dielectric composition according to this embodiment will be described. As a method for producing the dielectric composition, a known method may be adopted. For example, a solid phase method or the like, in which starting materials such as oxide powder and carbonate are mixed, and the resultant mixed powder is heat-treated and synthesized may, be adopted. Here, two manufacturing methods are described. The first manufacturing method (manufacturing method C1 of the dielectric composition) is a method, in which the dielectric composition of $a\{K(Ba_{1-x}Sr_x)_2Nb_5O_{15}\}+b\{(Ba_{1-w}Re_{2w/3})Nb_2O_6\}$ is solid solution crystal grains; or crystal grains constituted from the solid solution crystal grains and $K(Ba_{1-x}Sr_x)_2Nb_5O_{15}$ or $(Ba_{1-w}Re_{2w/3})Nb_2O_6$ are mixed. The second production method (production method C2 of the dielectric composition) is a method, in which the area ratio of crystal grains constituted by $K(Ba_{1-x}Sr_x)_2Nb_5O_{15}$ or $(Ba_{1-w}Re_{2w/3})Nb_2O_6$ is increased. In other words, this is a manufacturing method in the case where the area ratio of the crystal grains composed of the solid solution is reduced.

Manufacturing Method of Dielectric Composition C1

For $K(Ba_{1-x}Sr_x)_2Nb_5O_{15}$, $K_2CO_3$, $BaCO_3$, $SrCO_3$, $Nb_2O_5$ powders having the average particle size of 1.0 μm or less are prepared as starting materials. In addition, for $(Ba_{1-w}Re_{2w/3})Nb_2O_6$, $BaCO_3$ and $Nb_2O_5$ powders; and oxide powders of La, Pr, Nd, Sm, Y, Gd, Yb and Dy having the average particle size of 1.0 μm or less are prepared as starting materials. After weighing these starting materials at a predetermined ratio, wet mixing is carried out for a predetermined time by using a ball mill or the like. Calcined powder of $a\{K(Ba_{1-x}Sr_x)_2Nb_5O_{15}\}+b\{(Ba_{1-w}Re_{2w/3})Nb_2O_6\}$ having the average particle diameter of 0.5 μm to 2.0 μm may be obtained by performing heat treatment in the air at 1000° C. or less after drying the mixed powder. Alternatively, the calcined powder of $a\{K(Ba_{1-x}Sr_x)_2Nb_5O_{15}\}+b\{(Ba_{1-w}Re_{2w/3})Nb_2O_6\}$ having the average particle diameter of 0.5 μm to 2.0 μm may be obtained: by performing heat treatment at 1000° C. or less by using the above-described starting materials; by preparing the calcined powder of $K(Ba_{1-x}Sr_x)_2Nb_5O_{15}$ and the calcined powder of $(Ba_{1-w}Re_{2w/3})Nb_2O_6$ separately; and then by mixing them.

Production Method C2 of Dielectric Composition

When raising the area ratio of the crystal grains constituting the $K(Ba_{1-x}Sr_x)_2Nb_5O_{15}$ or $(Ba_{1-w}Re_{2w/3})Nb_2O_6$, the dielectric composition is manufactured as follows.

First, as a starting material for $K(Ba_{1-x}Sr_x)_2Nb_5O_{15}$ calcined powder, $K_2CO_3$, $BaCO_3$, $SrCO_3$, and $Nb_2O_5$ powders having the average particle size of 1.0 μm or less are prepared. After weighing to a predetermined ratio, wet blending is performed for a predetermined time by using a ball mill or the like. After drying the mixed powder, heat treatment in two stages of heat treatment (formation of a single phase) at 1000° C. or less and heat treatment at 850° C. or less (homogenization of the element distribution inside the particle) is performed in the air, and the calcined powder is obtained. Since the resultant calcined powder is subjected to the two-stage heat treatment, almost no heterogeneous phase is formed and the distribution of the elemental part distribution inside the grain is small, so that abnormal grain growth and reaction with $(Ba_{1-w}Re_{2w/3})Nb_2O_6$ can be suppressed.

Next, $BaCO_3$ and $Nb_2O_5$ powders; and oxide powders of La, Pr, Nd, Sm, Y, Gd, Yb and Dy having the average particle size of 1.0 μm or less are prepared as starting raw materials for the calcined powder of $(Ba_{1-w}Re_{2w/3})Nb_2O_6$. Thereafter, similarly to the above-mentioned method of manufacturing the calcined powder of $K(Ba_{1-x}Sr_x)_2Nb_5O_{15}$, after weighing to a predetermined ratio, wet mixing is performed using a ball mill or the like, and heat treatment at 1000° C. or less in air and 850° C. or less, to obtain the calcined powder. Since the resultant calcined powder is subjected to the two-stage heat treatment, almost no heterogeneous phase is formed and the distribution of the elemental part distribution inside the grain is small, so that abnormal grain growth and reaction with $K(Ba_{1-x}Sr_x)_2Nb_5O_{15}$ can be suppressed.

Thereafter, the obtained calcined powder of $K(Ba_{1-x}Sr_x)_2Nb_5O_{15}$ and the calcined powder of $(Ba_{1-w}Re_{2w/3})Nb_2O_6$ were mixed and crushed to obtain the average particle diameter of 0.5 μm to 2.0 μm By weight based on the total weight of the mixture.

Next, an example of a method for manufacturing the multilayer ceramic capacitor shown in FIG. 1 will be described.

Preparation of: the paste for the dielectric layer; the paste for the inner electrode layer; the paste for the outer electrode layer; and the green chip, and de-binder treatment are performed by the same methods as in the first embodiment.

Furthermore, when increasing the area ratio of the crystal grains composed of $K(Ba_{1-x}Sr_x)_2Nb_5O_{15}$ and the crystal grains composed of $(Ba_{1-w}Re_{2w/3})Nb_2O_6$, it is important to strictly control the condition as described below. In order to make each individual crystal particles independent of solid solution, it is preferable to set the temperature rise rate to 100° C./hour to 5000° C./hour, more preferably 1000° C./hour to 5000° C. In order to control the particle size distribution after sintering within the range of 0.5 μm to 5.0 μm, it is preferable: to set the temperature holding time to 0.5 hour to 2.0 hours, more preferably 0.5 hour to 1.0 hour; and to set the cooling rate to 100 C/hour to 500° C./hour, more preferably 200° C./hour to 300° C./hour, in order to suppress the volume diffusion between the crystal grains.

Further, as the atmosphere for calcining, it is preferable to use a mixed gas of humidified $N_2$ and $H_2$ and to bake at an oxygen partial pressure of $10^{-2}$ to $10^{-9}$ Pa. In the case of increasing the area ratio of the crystal particles composed of $K(Ba_{1-x}Sr_x)_2Nb_5O_{15}$ and the crystal particles composed of $(Ba_{1-w}Re_{2w/3})Nb_2O_6$, it is more preferable to set the oxygen partial pressure to $10^{-2}$ to $10^{-5}$ Pa. By performing calcining in an atmosphere having a high oxygen partial pressure, volume diffusion between crystal particles can be suppressed, so that an effect of hardly forming a solid solution can be obtained. However, when sintering is performed in a state where the oxygen partial pressure is high, Ni is oxidized in the case of the inner electrode layer made of Ni, and the conductivity as an electrode is lowered. In this case, by including one or more kinds of accessory components selected from Al, Si, Li, Cr and Fe in the conductive material containing Ni as the main component, which is a more preferred form of the present embodiment, the oxidation resistance of Ni is improved, and even in an atmosphere having a high oxygen partial pressure, it is possible to ensure conductivity as the inner electrode layer.

The annealing treatment and the end face polishing of the obtained capacitor element main body 310; and formation of the outer electrode by using the capacitor element main body 310, are performed in the same manner as in the first embodiment.

The first to fourth embodiments of the present invention are explained above. However, the present invention is not limited by the description of the embodiment. Additions, omissions, substitutions, and other modifications can be made without departing from the scope of the present invention.

EXAMPLES

The present invention will be described in more detail with reference to specific examples of the present invention below. However, the present invention is not limited to these examples. In the table, the sample marked with an asterisk (*) is outside the scope of this embodiment.

First Example

Example 1-1

In Example 1-1, the case where a calcined powder of a dielectric composition was produced according to the above-mentioned method 1 for manufacturing a dielectric composition was described.

First, $K_2CO_3$, $BaCO_3$, $SrCO_3$, $CaCO_3$, $Nb_2O_5$, $TiO_2$, and $ZrO_2$ powders having the average particle size of 1.0 μm or less were prepared as starting materials; and these powders were weighted so as to satisfy x, y, z, a, b described in each sample number in Table 1 in the chemical formula $a\{K(Ba_{1-x}Sr_x)_2Nb_5O_{15}\}+b\{(Ca_{1-y}Sr_y)(Zr_{1-z}Ti_z)O_3\}$. Thereafter, wet mixing was carried out for 17 hours by a ball mill using ethanol as a dispersion medium. Thereafter, the obtained mixture was dried to obtain a mixed raw material powder. Thereafter, heat treatment was performed in air at a holding temperature of 950° C. and a holding time of 24 hours to obtain raw material powder of the dielectric composition.

TABLE 1

| Sample No. | Substitution amount x in $K(Ba_{1-x}Sr_x)_2Nb_5O_{15}$ | $(Ca_{1-y}Sr_y)(Zr_{1-z}Ti_z)O_3$ Substitution amount y | Substitution amount z | a [—] | b [—] |
|---|---|---|---|---|---|
| *1 | 0.30 | 0.15 | 0.15 | 0.60 | 0.40 |
| 2 | 0.35 | 0.15 | 0.15 | 0.60 | 0.40 |
| 3 | 0.45 | 0.15 | 0.15 | 0.60 | 0.40 |
| 4 | 0.50 | 0.15 | 0.15 | 0.60 | 0.40 |
| 5 | 0.60 | 0.15 | 0.15 | 0.60 | 0.40 |
| 6 | 0.75 | 0.15 | 0.15 | 0.60 | 0.40 |
| *7 | 0.80 | 0.15 | 0.15 | 0.60 | 0.40 |
| *8 | 0.60 | 0.00 | 0.00 | 0.60 | 0.40 |
| *9 | 0.60 | 0.00 | 0.15 | 0.60 | 0.40 |
| 10 | 0.60 | 0.01 | 0.15 | 0.60 | 0.40 |
| 11 | 0.60 | 0.10 | 0.15 | 0.60 | 0.40 |
| 12 | 0.60 | 0.20 | 0.15 | 0.60 | 0.40 |
| 13 | 0.60 | 0.25 | 0.15 | 0.60 | 0.40 |
| *14 | 0.60 | 0.30 | 0.15 | 0.60 | 0.40 |
| *15 | 0.60 | 0.15 | 0.00 | 0.60 | 0.40 |
| 16 | 0.60 | 0.15 | 0.01 | 0.60 | 0.40 |
| 17 | 0.60 | 0.15 | 0.10 | 0.60 | 0.40 |
| 18 | 0.60 | 0.15 | 0.20 | 0.60 | 0.40 |
| 19 | 0.60 | 0.15 | 0.25 | 0.60 | 0.40 |
| *20 | 0.60 | 0.15 | 0.30 | 0.60 | 0.40 |
| *21 | 0.60 | 0.30 | 0.30 | 0.60 | 0.40 |
| *22 | 0.60 | 0.15 | 0.15 | 0.30 | 0.70 |
| 23 | 0.60 | 0.15 | 0.15 | 0.32 | 0.68 |
| 24 | 0.60 | 0.15 | 0.15 | 0.40 | 0.60 |
| 25 | 0.60 | 0.15 | 0.15 | 0.50 | 0.50 |
| 26 | 0.60 | 0.15 | 0.15 | 0.60 | 0.40 |
| 27 | 0.60 | 0.15 | 0.15 | 0.66 | 0.34 |
| *28 | 0.60 | 0.15 | 0.15 | 0.70 | 0.30 |
| 29 | 0.35 | 0.01 | 0.01 | 0.66 | 0.34 |
| 30 | 0.35 | 0.25 | 0.25 | 0.32 | 0.68 |
| 31 | 0.75 | 0.01 | 0.01 | 0.66 | 0.34 |
| 32 | 0.75 | 0.25 | 0.25 | 0.66 | 0.34 |

Seven hundred grams of the solvent, which was obtained by mixing: the toluene+ethanol solution; the plasticizer; and the dispersant, at a ratio of 90:6:4, was added to 1000 g of the raw material powder of the dielectric composition obtained as described above. Then, the mixture was kneaded by a usual well-known dispersion method and dispersed for 2 hours using a basket mill to prepare the dielectric layer paste. The viscosity of these pastes was adjusted to about 200 cps.

As the raw material of the inner electrode layer, Ni having an average grain diameter of 0.2 μm and oxides of Al and Si having the thickness of 0.1 μm or less were prepared. These powders were weighted so that the total amount of Al and Si as accessory components became 5% by mass relative to Ni. Thereafter, heat treatment was performed in a mixed gas of $N_2$ and $H_2$ humidified at 1200° C. or more; and the obtained materials was crushed using a ball mill or the like to prepare raw material powders having the average grain diameter of 0.20 μm.

The paste for the inner electrode layer was obtained by kneading 100 mass % of the above-described raw material powder, 30 mass % of an organic vehicle (8 mass % of ethyl cellulose resin dissolved in 92 mass % of butyl carbitol), and 8 mass % of butyl carbitol to turn the mixture into a paste form.

Using the prepared dielectric layer paste, a green sheet was formed on the PET film so that the thickness after drying was 12 μm. Subsequently, the inner electrode layer was printed on the inner electrode layer paste in a prescribed pattern, and then the sheet was peeled off from the PET film to prepare a green sheet having an inner electrode layer. Subsequently, a plurality of green sheets having inner electrode layers were laminated and pressed and bonded to form a green laminate. The green laminate was cut into a predetermined size to obtain a green chip.

Next, the obtained green chip was subjected to de-binder treatment, calcining, and annealing treatment to obtain a laminated ceramic sintered body. Conditions for the de-binder treatment, calcining and annealing are as follows. Wetter was used for humidifying each atmospheric gas.
(De-Binder Treatment)
  Heating rate: 100° C./hour
  Holding temperature: 400° C.
  Temperature holding time: 8.0 hours
  Ambient gas: Humidified mixed gas of $N_2$ and $H_2$
(Calcining)
  Heating rate: 500° C./hour
  Holding temperature: 1100° C. to 1350° C.
  Temperature holding time: 2.0 hours
  Cooling rate: 100° C./hour
  Ambient gas: Humidified mixed gas of $N_2$ and $H_2$
  Oxygen partial pressure: $10^{-5}$ to $10^{-9}$ Pa
(Annealing Treatment)
  Holding temperature: 800° C. to 1000° C.
  Temperature holding time: 2.0 hours
  Raising temperature, cooling rate: 200° C./hour
  Ambient gas: Humidified $N_2$ gas Composition analysis of each sample was conducted using ICP emission spectroscopy for each of the laminated ceramic sintered bodies. It was confirmed that the each of the obtained laminated ceramic sintered bodies had almost the same value as the dielectric composition described in Table 1.

After grinding the end face of the obtained laminated ceramic sintered body by sandblasting, an In—Ga eutectic alloy was applied as an external electrode, and sample Nos. 1 to 32 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 μm. The thickness of the inner electrode layer was 2 μm. The number of the dielectric layers sandwiched between the inner electrode layers was 50.

The relative dielectric constant; the DC withstand voltage; the high-temperature load lifetime; and the area ratio of crystal grains consisted of $K(Ba_{1-x}Sr_x)_2Nb_5O_{15}$ and crystal grains consisted of $(Ca_{1-y}Sr_y)(Zr_{1-z}Ti_z)O_3$ based on the image analysis were measured and evaluated in the laminated ceramic capacitor sample Nos. 1 to 32 by the methods described below. Results are shown in Table 2.

[Relative Dielectric Constant]

The capacitance of the laminated ceramic capacitor was measured by inputting a signal having frequency of 1 kHz and 1 Vrm of the signal level (measured voltage) at 250° C. by using the digital LCR meter (4284A manufactured by YHP Co., Ltd.). The relative dielectric constant (no unit) was calculated based on the thickness of the dielectric layer, the effective electrode area, and the electrostatic capacitance C obtained as a result of the measurement. It is preferable that the relative dielectric constant is high, and 200 or more is regarded as excellent.

[DC Withstand Voltage]

A DC voltage was applied to the multilayer ceramic capacitor sample at 250° C. at a rate of 100 V/sec boosting rate. The DC withstand voltage was defined as the voltage where the leakage current exceeded 10 mA. The DC withstand voltage is preferably 50 V/μm or more, more preferably 100 V/μm or more. More preferably, the DC withstand voltage is 150 V/μm or more.

[High-Temperature Load Lifetime]

In the high-temperature load lifetime test, a change in insulation resistance over time was measured by applying a DC voltage to 200 samples of each sample number at a temperature of 250° C. so as to be 20 V/μm with respect to the thickness of the dielectric layer. A sample with insulation resistance degraded by one digit was regarded as failure, and a mean time to failure (MTTF) of 50% was obtained from Weibull analysis of fault time. In the present invention, the mean time to failure (MTTF) is defined as the high-temperature load lifetime. It is preferable that the high-temperature load lifetime is long, and 80 hours or more, more preferably 120 hours or more is regarded as excellent.

[Evaluation of α and β by Image Analysis]

Micro-sampling was performed on the multilayer ceramic capacitor sample obtained by calcining by using FIB (Focused Ion Beam) to prepare a TEM sample of the dielectric layer. A STEM-EDS (Scanning Transmission Electron Microscopy-Energy Dispersive) was performed on this TEM sample using JEM 2200 FS, a scanning transmission electron microscope manufactured by JEOL X-ray Spectrometry mapping. The field of view of the mapping was 7 μm×7 μm, and mapping was performed over 10 fields or more for each sample. By using the elemental mapping obtained by the above-described method, area of K, Ba, Sr, and Nb, which were the elements of $K(Ba_{1-x}Sr_x)_2Nb_5O_{15}$, and Ca, Ca and Ca, which were elements of $(Ca_{1-y}Sr_y)(Zr_{1-z}Ti_z)O_3$, were identified. Then, the area ratio α (%) of crystal grains constituted of $K(Ba_{1-x}Sr_x)_2Nb_5O_{15}$; and the area ratio β (%) of crystal grains constituted of $(Ca_{1-y}Sr_y)(Zr_{1-z}Ti_z)O_3$ were calculated by using the average area from results over 10 fields of view. In the present embodiment, in order to obtain a high DC withstand voltage and an excellent high-temperature load lifetime, preferably, α and β were set to satisfy $0.50 \leq \alpha/\beta \leq 1.90$ and $80\% \leq \alpha+\beta$.

TABLE 2

| Sample No. | α/β [—] | α + β [%] | Relative dielectric constant [—] | DC withstand voltage [V/μm] | High-temperature load lifetime [hour] |
|---|---|---|---|---|---|
| *1 | 1.55 | 52 | 259 | 45 | 55 |
| 2 | 1.50 | 54 | 270 | 55 | 90 |

TABLE 2-continued

| Sample No. | α/β [—] | α + β [%] | Relative dielectric constant [—] | DC withstand voltage [V/μm] | High-temperature load lifetime [hour] |
|---|---|---|---|---|---|
| 3 | 1.45 | 45 | 240 | 70 | 90 |
| 4 | 1.50 | 38 | 260 | 75 | 85 |
| 5 | 1.50 | 40 | 210 | 85 | 95 |
| 6 | 1.55 | 50 | 220 | 60 | 80 |
| *7 | 1.45 | 45 | 250 | 35 | 70 |
| *8 | 1.50 | 45 | 270 | 40 | 65 |
| *9 | 1.50 | 52 | 250 | 45 | 55 |
| 10 | 1.50 | 50 | 270 | 60 | 85 |
| 11 | 1.55 | 46 | 240 | 65 | 90 |
| 12 | 1.60 | 38 | 260 | 80 | 90 |
| 13 | 1.55 | 38 | 260 | 70 | 90 |
| *14 | 1.40 | 45 | 230 | 35 | 65 |
| *15 | 1.45 | 38 | 220 | 30 | 65 |
| 16 | 1.50 | 45 | 250 | 55 | 80 |
| 17 | 1.50 | 53 | 250 | 65 | 85 |
| 18 | 1.45 | 52 | 220 | 80 | 90 |
| 19 | 1.55 | 45 | 210 | 80 | 90 |
| *20 | 1.55 | 38 | 210 | 45 | 50 |
| *21 | 1.50 | 30 | 220 | 40 | 45 |
| *22 | 0.40 | 45 | 230 | 35 | 65 |
| 23 | 0.50 | 53 | 250 | 60 | 85 |
| 24 | 0.70 | 38 | 270 | 70 | 80 |
| 25 | 1.05 | 53 | 220 | 85 | 90 |
| 26 | 1.50 | 45 | 230 | 80 | 95 |
| 27 | 1.90 | 53 | 230 | 65 | 80 |
| *28 | 2.30 | 45 | 250 | 40 | 65 |
| 29 | 1.85 | 30 | 250 | 75 | 90 |
| 30 | 0.50 | 45 | 220 | 80 | 95 |
| 31 | 1.90 | 45 | 220 | 75 | 90 |
| 32 | 1.85 | 38 | 250 | 80 | 90 |

According to the results shown in Table 2, it was confirmed that among sample Nos. 1 to 32, laminated ceramic capacitor samples that had parameters within the ranges of the present embodiment had the relative dielectric constant of 200 or more at 250° C.; and the high-temperature load lifetimes were 80 hours or more when direct voltage was applied continuously so as to be 20 V/μm with respect to the thickness of the dielectric layer.

Contrary to that, a sufficient insulation property was difficult to obtain in the sample No. 1 since x in the chemical formula $(Ba_{1-x}Sr_x)_2Nb_5O_{15}$ was less than 0.35 being out of the range of the present embodiment. Accordingly, the sample No. 1 had a low high-temperature load lifetime of 55 hours. In addition, x exceeded 0.75 in the sample No. 7 being out of the range of the present embodiment. Accordingly, the sample No. 7 had a low high-temperature load lifetime of 70 hours.

In the sample Nos. 8 and 9, y in the chemical formula $(Ca_{1-y}Sr_y)(Zr_{1-z}Ti_z)O_3$ was less than 0.01 being out of the range of the present embodiment. Thus, the effect of suppressing the migration of oxygen defects, which were believed to be the reason of deterioration of the high-temperature load lifetime, could not be obtained. Accordingly, the sample Nos. 8 and 9 had a low the high-temperature load lifetime of less than 80 hours. On the other hand, in the sample Nos. 14 and 21, y exceeded 0.25 being out of the range of the present embodiment. Thus, it was confirmed that the sample Nos. 14 and 21 had a low insulation property at a high temperature and a low high-temperature load lifetime of less than 80 hours.

In the sample Nos. 8 and 15, z in the chemical formula $(Ca_{1-y}Sr_y)(Zr_{1-z}Ti_z)O_3$ was less than 0.01 being out of the range of the present embodiment. Thus, the effect of suppressing the migration of oxygen defects, which were believed to be the reason of deterioration of the high-temperature load lifetime, could not be obtained. Accordingly, the sample Nos. 8 and 15 had a low high-temperature load lifetime of less than 80 hours.

In addition, since a was less than 0.32 in the sample No. 22 and exceeded 0.66 in the sample No. 28 being out of the range of the present embodiment, they had a low high-temperature load lifetime of less than 80 hours.

Example 1-2

The area ratio of the crystal grains constituted of the $K(Ba_{1-x}Sr_x)_2Nb_5O_{15}$ or $(Ca_{1-y}Sr_y)(Zr_{1-z}Ti_z)O_3$ is calculated by using the dielectric composition manufacturing method 2 described above The results with the increased area ratios are shown.

First, for $K(Ba_{1-x}Sr_x)_2Nb_5O_{15}$, $K_2CO_3$, $BaCO_3$, $SrCO_3$, and $Nb_2O_5$ powders having the average particle size of 1.0 μm or less were prepared as starting materials. The above starting materials were weighed so as to be x shown in Table 3 and wet-mixed for 17 hours with a ball mill using ethanol as a dispersion medium. Thereafter, the obtained mixture was dried to obtain a mixed raw material powder. Thereafter, the first heat treatment is performed at a holding temperature of 900° C. to 1000° C. for a holding time of 10 hours to 24 hours. Then the second heat treatment at a holding temperature of 750° C. to 850° C. and a holding time of 10 hours to 24 hours was performed to obtain the calcined powder of $K(Ba_{1-x}Sr_x)_2Nb_5O_{15}$.

Next, for $(Ca_{1-y}Sr_y)(Zr_{1-z}Ti_z)O_3$, $CaCO_3$, $SrCO_3$, $TiO_2$, and $ZrO_2$ powders having the average grain diameter of 1.0 μm or less were prepared as starting materials. These starting materials were weighed so that y and z shown in Table 3 were obtained and wet mixed using a ball mill for 17 hours with ethanol as a dispersion medium. Thereafter, the obtained mixture was dried to obtain a mixed raw material powder. Thereafter, the first heat treatment was performed at a holding temperature of 950° C. to 1100° C. for a holding time of 10 hours to 24 hours. Then, the second heat treatment at a holding temperature of 750° C. to 850° C. and a holding time of 10 hours to 24 hours was performed to obtain the calcined powder of $(Ca_{1-y}Sr_y))(Zr_{1-z}Ti_z)O_3$.

After weighing the obtained calcined powder of $K(Ba_{1-x}Sr_x)_2Nb_5O_{15}$ and the calcined powder of $(Ca_{1-y}Sr_y))(Zr_{1-z}Ti_z)O_3$ so as to have the compounding ratio shown in Table 3, the material was wet mixed for 17 to 36 hours with a ball mill using ethanol as dispersion medium. Thereafter, the obtained mixture was dried to obtain raw material powder of the dielectric composition shown in Table 3.

TABLE 3

| Sample No. | Substitution amount x in $K(Ba_{1-x}Sr_x)_2Nb_5O_{15}$ | $(Ca_{1-y}Sr_y)(Zr_{1-z}Ti_z)O_3$ Substitution amount y | Substitution amount z | Mixing ratio of calcined powders $K(Ba_{1-x}Sr_x)_2Nb_5O_{15}$ [mol %] | $(Ca_{1-y}Sr_y)(Zr_{1-z}Ti_z)O_3$ [mol %] |
|---|---|---|---|---|---|
| *33 | 0.30 | 0.15 | 0.15 | 60 | 40 |
| 34 | 0.35 | 0.15 | 0.15 | 60 | 40 |

TABLE 3-continued

| Sample No. | Substitution amount x in $K(Ba_{1-x}Sr_x)_2Nb_5O_{15}$ | $(Ca_{1-y}Sr_y)(Zr_{1-z}Ti_z)O_3$ Substitution amount y | Substitution amount z | Mixing ratio of calcined powders $K(Ba_{1-x}Sr_x)_2Nb_5O_{15}$ [mol %] | $(Ca_{1-y}Sr_y)(Zr_{1-z}Ti_z)O_3$ [mol %] |
|---|---|---|---|---|---|
| 35 | 0.45 | 0.15 | 0.15 | 60 | 40 |
| 36 | 0.50 | 0.15 | 0.15 | 60 | 40 |
| 37 | 0.60 | 0.15 | 0.15 | 60 | 40 |
| 38 | 0.75 | 0.15 | 0.15 | 60 | 40 |
| *39 | 0.80 | 0.15 | 0.15 | 60 | 40 |
| *40 | 0.60 | 0.00 | 0.00 | 60 | 40 |
| *41 | 0.60 | 0.00 | 0.15 | 60 | 40 |
| 42 | 0.60 | 0.01 | 0.15 | 60 | 40 |
| 43 | 0.60 | 0.10 | 0.15 | 60 | 40 |
| 44 | 0.60 | 0.20 | 0.15 | 60 | 40 |
| 45 | 0.60 | 0.25 | 0.15 | 60 | 40 |
| *46 | 0.60 | 0.30 | 0.15 | 60 | 40 |
| *47 | 0.60 | 0.15 | 0.00 | 60 | 40 |
| 48 | 0.60 | 0.15 | 0.01 | 60 | 40 |
| 49 | 0.60 | 0.15 | 0.10 | 60 | 40 |
| 50 | 0.60 | 0.15 | 0.20 | 60 | 40 |
| 51 | 0.60 | 0.15 | 0.25 | 60 | 40 |
| *52 | 0.60 | 0.15 | 0.30 | 60 | 40 |
| *53 | 0.60 | 0.30 | 0.30 | 60 | 40 |
| *54 | 0.60 | 0.15 | 0.15 | 30 | 70 |
| 55 | 0.60 | 0.15 | 0.15 | 32 | 68 |
| 56 | 0.60 | 0.15 | 0.15 | 40 | 60 |
| 57 | 0.60 | 0.15 | 0.15 | 50 | 50 |
| 58 | 0.60 | 0.15 | 0.15 | 60 | 40 |
| 59 | 0.60 | 0.15 | 0.15 | 66 | 34 |
| *60 | 0.60 | 0.15 | 0.15 | 70 | 30 |
| 61 | 0.35 | 0.01 | 0.01 | 66 | 34 |
| 62 | 0.35 | 0.25 | 0.25 | 32 | 68 |
| 63 | 0.75 | 0.01 | 0.01 | 66 | 34 |
| 64 | 0.75 | 0.25 | 0.25 | 66 | 34 |

Thereafter, in the same manner as in Example 1-1, the dielectric layer paste and the inner electrode layer paste were prepared.

Then, the green chip was produced in the same manner as in Example 1-1.

Next, the obtained green chip was subjected to de-binder treatment, calcining, and annealing treatment to obtain a laminated ceramic sintered body. Conditions for the de-binder treatment, calcining and annealing are as follows. Wetter was used for humidifying each atmospheric gas.

(De-Binder Treatment)
 Heating rate: 100° C./hour
 Holding temperature: 400° C.
 Temperature holding time: 8.0 hours
 Ambient gas: Humidified mixed gas of $N_2$ and $H_2$
(Calcining)
 Heating rate: 2000° C./hour
 Holding temperature: 1100° C. to 1350° C.
 Temperature holding time: 1.0 hours
 Cooling rate: 200° C./hour
 Ambient gas: Humidified mixed gas of $N_2$ and $H_2$
 Oxygen partial pressure: $10^{-2}$ to $10^{-5}$ Pa
(Annealing Treatment)
 Holding temperature: 500° C. to 1000° C.
 Temperature holding time: 2.0 hours
 Raising temperature, cooling rate: 200° C./hour
 Ambient gas: Humidified $N_2$ gas The crystal structure of the dielectric layer was measured by X-ray diffraction (XRD) in the obtained laminated ceramic sintered body. As a result, it was confirmed that each of $K(Ba_{1-x}Sr_x)_2Nb_5O_{15}$ and $(Ca_{1-y}Sr_y)(Zr_{1-z}Ti_z)O_3$ existed independently in the laminated ceramic sintered body of the present embodiment.

In addition, composition analysis of each sample was conducted using ICP emission spectroscopy for each of the obtained laminated ceramic sintered body. As a result, it was confirmed that the obtained laminated ceramic sintered body had almost the same value as the dielectric composition described in Tables 3 and 4.

After grinding the end face of the obtained laminated ceramic sintered body by sandblasting, an In—Ga eutectic alloy was applied as an external electrode, and sample Nos. 33 to 64 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 μm. The thickness of the inner electrode layer was 2 μm. The number of the dielectric layers sandwiched between the inner electrode layers was 50.

The relative dielectric constant; the DC withstand voltage; the high-temperature load lifetime; and the area ratio of crystal grains consisted of $K(Ba_{1-x}Sr_x)_2Nb_5O_{15}$ and crystal grains consisted of $(Ca_{1-y}Sr_y)(Zr_{1-z}Ti_z)O_3$ based on the image analysis were measured and evaluated in the laminated ceramic capacitor sample Nos. 33 to 64 by using the same measurement methods as in the example 1-1. Results are shown in Table 4.

TABLE 4

| Sample No. | a [—] | b [—] | α/β [—] | α + β [%] | Relative dielectric constant [—] | DC withstand voltage [V/μm] | High-temperature load lifetime [hour] |
|---|---|---|---|---|---|---|---|
| *33 | 0.60 | 0.40 | 1.50 | 84 | 270 | 65 | 70 |
| 34 | 0.60 | 0.40 | 1.60 | 82 | 280 | 110 | 105 |
| 35 | 0.60 | 0.40 | 1.55 | 86 | 260 | 120 | 110 |
| 36 | 0.60 | 0.40 | 1.55 | 86 | 250 | 130 | 105 |
| 37 | 0.60 | 0.40 | 1.50 | 88 | 275 | 135 | 115 |
| 38 | 0.60 | 0.40 | 1.45 | 84 | 280 | 120 | 100 |
| *39 | 0.60 | 0.40 | 1.50 | 74 | 250 | 55 | 75 |
| *40 | 0.60 | 0.40 | 1.55 | 72 | 280 | 60 | 70 |
| *41 | 0.60 | 0.40 | 1.45 | 80 | 250 | 70 | 65 |
| 42 | 0.60 | 0.40 | 1.60 | 82 | 240 | 100 | 105 |
| 43 | 0.60 | 0.40 | 1.55 | 84 | 280 | 110 | 100 |
| 44 | 0.60 | 0.40 | 1.60 | 86 | 275 | 130 | 110 |
| 45 | 0.60 | 0.40 | 1.45 | 86 | 245 | 125 | 115 |
| *46 | 0.60 | 0.40 | 1.45 | 76 | 240 | 50 | 70 |
| *47 | 0.60 | 0.40 | 1.50 | 84 | 235 | 55 | 70 |
| 48 | 0.60 | 0.40 | 1.50 | 82 | 240 | 125 | 115 |
| 49 | 0.60 | 0.40 | 1.50 | 80 | 250 | 120 | 100 |
| 50 | 0.60 | 0.40 | 1.45 | 84 | 255 | 110 | 105 |
| 51 | 0.60 | 0.40 | 1.60 | 82 | 275 | 120 | 105 |
| *52 | 0.60 | 0.40 | 1.55 | 84 | 250 | 70 | 60 |
| *53 | 0.60 | 0.40 | 1.55 | 82 | 220 | 60 | 55 |
| *54 | 0.30 | 0.70 | 0.35 | 80 | 240 | 55 | 70 |
| 55 | 0.32 | 0.68 | 0.50 | 86 | 240 | 115 | 110 |
| 56 | 0.40 | 0.60 | 0.75 | 82 | 260 | 125 | 105 |
| 57 | 0.50 | 0.50 | 1.00 | 86 | 270 | 130 | 100 |
| 58 | 0.60 | 0.40 | 1.55 | 84 | 280 | 120 | 110 |
| 59 | 0.66 | 0.34 | 1.90 | 86 | 290 | 125 | 105 |
| *60 | 0.70 | 0.30 | 2.30 | 84 | 260 | 60 | 70 |
| 61 | 0.66 | 0.34 | 1.90 | 82 | 280 | 125 | 105 |
| 62 | 0.32 | 0.68 | 0.55 | 84 | 240 | 120 | 110 |
| 63 | 0.66 | 0.34 | 1.85 | 86 | 270 | 115 | 115 |
| 64 | 0.66 | 0.34 | 1.90 | 82 | 260 | 130 | 105 |

According to the results shown in Table 4, it was confirmed that among sample Nos. 33 to 64, laminated ceramic capacitor samples that had parameters within the scope of the present embodiment and satisfied $0.50 \leq \alpha/\beta \leq 1.90$ and $80\% \leq \alpha+\beta$ had the relative dielectric constant of 200 or more at 250° C.; the DC withstand voltage of 100V/μm at 250° C.; and the high-temperature load lifetimes were 100 hours or more when direct voltage was applied continuously so as to be 20 V/μm with respect to the thickness of the dielectric layer.

According to the results shown in Tables 2 and 4, it was confirmed that the DC withstand voltage was less than 100 V/μm at 250° C. in the laminated ceramic capacitor, in which the relationship between α and β did not satisfy $0.50 \leq \alpha/\beta \leq 1.90$ and $80\% \leq \alpha+\beta$ when α was the area ratio of crystal grains constituted of $K(Ba_{1-x}Sr_x)_2Nb_5O_{15}$ in percentage; and β was the area ratio of crystal grains constituted of $(Ca_{1-y}Sr_y)(Zr_{1-z}Ti_z)O_3$ in percentage.

It was confirmed that high high-temperature load lifetime and high DC withstand voltage were achieved at the same time at 250° C., which had been difficult to achieve so far, by not only controlling the material composition of the dielectric composition but also controlling the composition of the crystal grains constituting the dielectric composition at the same time.

Example 1-3

By using the same methods as in the example 1-2, the raw material powders of the dielectric composition shown in Table 5 were produced.

TABLE 5

| | Substitution | $(Ca_{1-y}Sr_y)(Zr_{1-z}Ti_z)O_3$ | | Mixing ratio of calcined powders | |
|---|---|---|---|---|---|
| Sample No. | amount x in $K(Ba_{1-x}Sr_x)_2Nb_5O_{15}$ | Substitution amount y | Substitution amount z | $K(Ba_{1-x}Sr_x)_2Nb_5O_{15}$ [mol %] | $(Ca_{1-y}Sr_y)(Zr_{1-z}Ti_z)O_3$ [mol %] |
| 65 | 0.35 | 0.01 | 0.01 | 45 | 55 |
| 66 | 0.35 | 0.02 | 0.10 | 45 | 55 |
| 67 | 0.35 | 0.05 | 0.02 | 37 | 63 |
| 68 | 0.35 | 0.10 | 0.10 | 52 | 48 |
| 69 | 0.35 | 0.15 | 0.01 | 45 | 55 |
| 70 | 0.45 | 0.01 | 0.05 | 45 | 55 |
| 71 | 0.45 | 0.02 | 0.02 | 37 | 63 |
| 72 | 0.45 | 0.05 | 0.10 | 52 | 48 |
| 73 | 0.45 | 0.10 | 0.02 | 45 | 55 |
| 74 | 0.45 | 0.15 | 0.05 | 45 | 55 |
| 75 | 0.50 | 0.01 | 0.15 | 45 | 55 |
| 76 | 0.50 | 0.02 | 0.05 | 45 | 55 |

TABLE 5-continued

| Sample No. | Substitution amount x in $K(Ba_{1-x}Sr_x)_2Nb_5O_{15}$ | $(Ca_{1-y}Sr_y)(Zr_{1-z}Ti_z)O_3$ Substitution amount y | Substitution amount z | Mixing ratio of calcined powders $K(Ba_{1-x}Sr_x)_2Nb_5O_{15}$ [mol %] | $(Ca_{1-y}Sr_y)(Zr_{1-z}Ti_z)O_3$ [mol %] |
|---|---|---|---|---|---|
| 77 | 0.50 | 0.05 | 0.05 | 37 | 63 |
| 78 | 0.50 | 0.10 | 0.10 | 52 | 48 |
| 79 | 0.50 | 0.15 | 0.15 | 45 | 55 |
| 80 | 0.60 | 0.05 | 0.05 | 45 | 55 |
| 81 | 0.70 | 0.05 | 0.05 | 45 | 55 |
| 82 | 0.45 | 0.10 | 0.10 | 37 | 63 |
| 83 | 0.45 | 0.10 | 0.10 | 37 | 63 |
| 84 | 0.45 | 0.10 | 0.10 | 52 | 48 |
| 85 | 0.45 | 0.10 | 0.10 | 60 | 40 |

A multilayer ceramic capacitor sample was prepared using the obtained dielectric composition raw material powder in the same manner as in Example 1-2, and measurement and evaluation were carried out in the same manner as in Example 1-1 and Example 1-2. Results are shown in Table 6.

TABLE 6

| Sample No. | a [—] | b [—] | α/β [—] | α + β [%] | Relative dielectric constant [—] | DC withstand voltage [V/μm] | High-temperature load lifetime [hour] |
|---|---|---|---|---|---|---|---|
| 65 | 0.45 | 0.55 | 0.80 | 94 | 300 | 115 | 110 |
| 66 | 0.45 | 0.55 | 0.85 | 92 | 280 | 165 | 125 |
| 67 | 0.37 | 0.63 | 0.60 | 96 | 270 | 175 | 135 |
| 68 | 0.52 | 0.48 | 1.10 | 94 | 300 | 170 | 135 |
| 69 | 0.45 | 0.55 | 0.75 | 86 | 290 | 120 | 110 |
| 70 | 0.45 | 0.55 | 0.80 | 94 | 310 | 115 | 105 |
| 71 | 0.37 | 0.63 | 0.60 | 92 | 320 | 160 | 145 |
| 72 | 0.52 | 0.48 | 1.05 | 90 | 270 | 175 | 140 |
| 73 | 0.45 | 0.55 | 0.75 | 92 | 270 | 165 | 125 |
| 74 | 0.45 | 0.55 | 0.75 | 88 | 290 | 130 | 105 |
| 75 | 0.45 | 0.55 | 0.85 | 84 | 280 | 120 | 115 |
| 76 | 0.45 | 0.55 | 0.85 | 90 | 300 | 175 | 135 |
| 77 | 0.37 | 0.63 | 0.65 | 92 | 285 | 180 | 140 |
| 78 | 0.52 | 0.48 | 1.10 | 94 | 290 | 165 | 125 |
| 79 | 0.45 | 0.55 | 0.85 | 94 | 310 | 115 | 105 |
| 80 | 0.45 | 0.55 | 0.85 | 92 | 280 | 135 | 100 |
| 81 | 0.45 | 0.55 | 0.80 | 82 | 270 | 125 | 105 |
| 82 | 0.37 | 0.63 | 0.60 | 96 | 300 | 120 | 100 |
| 83 | 0.37 | 0.63 | 0.60 | 94 | 320 | 165 | 135 |
| 84 | 0.52 | 0.48 | 1.10 | 96 | 295 | 175 | 140 |
| 85 | 0.60 | 0.40 | 1.55 | 94 | 305 | 130 | 110 |

According to the results shown in Table 6, it was confirmed that among the sample Nos. 65 to 85 which had parameters within the ranges of the present embodiment, the laminated ceramic capacitors, in which x, y, z, α and β satisfied 0.35≤x≤0.50, 0.02≤y≤0.10, 0.02≤z≤0.10, 0.60≤α/β≤1.50, and 90%≤α+β, showed even more excellent properties such as: the relative dielectric constant of 200 or more at 250° C.; the DC withstand voltage of 150V/μm at 250° C.; and the high-temperature load lifetime of 120 hours or more when continuous DC voltage was continuously applied so as to be 20 V/μm with respect to the thickness of the dielectric layer.

Second Example

Example 2-1

In Example 2-1, the case where a calcined powder of a dielectric composition was produced according to the above-mentioned method 1 for manufacturing a dielectric composition was described.

First, $K_2CO_3$, $BaCO_3$, $SrCO_3$, $Nb_2O_5$, $TiO_2$ and $ZrO_2$ powders having the average particle size of 1.0 μm or less were prepared as starting materials; and these powders were weighted so as to satisfy x, u, a, b described in each sample number in Table 7 in the chemical formula $a\{K(Ba_{1-x}Sr_x)_2Nb_5O_{15}\}+b\{Ba(Ti_{1-u}Zr_u)O_3\}$. Thereafter, wet mixing was carried out for 17 hours by a ball mill using ethanol as a dispersion medium. Thereafter, the obtained mixture was dried to obtain a mixed raw material powder. Thereafter, heat treatment was performed in air at a holding temperature of 1050° C. and a holding time of 24 hours to obtain raw material powder of the dielectric composition.

TABLE 7

| Sample No. | Substitution amount x in $K(Ba_{1-x}Sr_x)_2Nb_5O_{15}$ | Substitution amount u in $Ba(Ti_{1-u}Zr_u)O_3$ | a [—] | b [—] |
|---|---|---|---|---|
| *A1 | 0.30 | 0.20 | 0.55 | 0.45 |
| A2 | 0.35 | 0.20 | 0.55 | 0.45 |
| A3 | 0.45 | 0.20 | 0.55 | 0.45 |
| A4 | 0.50 | 0.20 | 0.55 | 0.45 |
| A5 | 0.60 | 0.20 | 0.55 | 0.45 |
| A6 | 0.75 | 0.20 | 0.55 | 0.45 |
| *A7 | 0.80 | 0.20 | 0.55 | 0.45 |
| *A8 | 0.60 | 0.00 | 0.55 | 0.45 |
| A9 | 0.60 | 0.02 | 0.55 | 0.45 |

TABLE 7-continued

| Sample No. | Substitution amount x in $K(Ba_{1-x}Sr_x)_2Nb_5O_{15}$ | Substitution amount u in $Ba(Ti_{1-u}Zr_u)O_3$ | a [—] | b [—] |
|---|---|---|---|---|
| A10 | 0.60 | 0.10 | 0.55 | 0.45 |
| A11 | 0.60 | 0.15 | 0.55 | 0.45 |
| A12 | 0.60 | 0.25 | 0.55 | 0.45 |
| *A13 | 0.60 | 0.30 | 0.55 | 0.45 |
| *A14 | 0.60 | 0.20 | 0.30 | 0.70 |
| A15 | 0.60 | 0.20 | 0.35 | 0.65 |
| A16 | 0.60 | 0.20 | 0.40 | 0.60 |
| A17 | 0.60 | 0.20 | 0.50 | 0.50 |
| A18 | 0.60 | 0.20 | 0.60 | 0.40 |
| A19 | 0.60 | 0.20 | 0.65 | 0.35 |
| *A20 | 0.60 | 0.20 | 0.70 | 0.30 |
| A21 | 0.35 | 0.02 | 0.65 | 0.35 |
| A22 | 0.35 | 0.25 | 0.35 | 0.65 |
| A23 | 0.75 | 0.02 | 0.65 | 0.35 |
| A24 | 0.75 | 0.25 | 0.65 | 0.35 |

By using 1000 g of the raw material powder of the dielectric composition obtained as described above, the paste for the dielectric layer; the paste for the inner electrode layer; the green sheet; the green chip; and the laminated ceramic sintered body were obtained as in Example 1-1.

Composition analysis of each sample was conducted using ICP emission spectroscopy for each of the obtained laminated ceramic sintered body. As a result, it was confirmed that the obtained laminated ceramic sintered body had almost the same value as the dielectric composition described in Table 7.

After grinding the end face of the obtained laminated ceramic sintered body by sandblasting, an In—Ga eutectic alloy was applied as an external electrode, and sample Nos. A1 to A24 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 µm. The thickness of the inner electrode layer was 2 µm. The number of the dielectric layers sandwiched between the inner electrode layers was 50.

The relative dielectric constant; the DC withstand voltage; the high-temperature load lifetime; and the area ratio of crystal grains consisted of $K(Ba_{1-x}Sr_x)_2Nb_5O_{15}$ and crystal grains consisted of $Ba(Ti_{1-u}Zr_u)O_3$ based on the image analysis were measured and evaluated in the laminated ceramic capacitor sample Nos. A1 to A24 by the methods described below. Results are shown in Table 8.

[Relative Dielectric Constant]

The capacitance of the laminated ceramic capacitor was measured by inputting a signal having frequency of 1 kHz and 1 Vrm of the signal level (measured voltage) at 250° C. by using the digital LCR meter (4284A manufactured by YHP Co., Ltd.). The relative dielectric constant (no unit) was calculated based on the thickness of the dielectric layer, the effective electrode area, and the electrostatic capacitance C obtained as a result of the measurement. It is preferable that the relative dielectric constant is high, and 1000 or more is regarded as excellent.

[DC Withstand Voltage]

The DC withstand voltage was measured and evaluated in the same manner as in Example 1-1.

[High-Temperature Load Life]

The high temperature load lifetime was measured and evaluated by the same method as in Example 1-1.

[Evaluation of α and β by Image Analysis]

TEM samples of the dielectric layers were prepared and STEM-EDS mapping was carried out in the same manner as in Example 1-1. By using the elemental mapping obtained by the above-described method, area of K, Ba, Sr, and Nb, which were the elements of $K(Ba_{1-x}Sr_x)_2Nb_5O_{15}$, and Ba, Ti and Zr, which were elements of $Ba(Ti_{1-u}Zr_u)O_3$, were identified. Then, the area ratio α (%) of crystal grains constituted of $K(Ba_{1-x}Sr_x)_2Nb_5O_{15}$; and the area ratio β (%) of crystal grains constituted of $Ba(Ti_{1-u}Zr_u)O_3$ were calculated by using the average area from results over 10 fields of view. In the present embodiment, in order to obtain a high DC withstand voltage and an excellent high-temperature load lifetime, preferably, α and β were set to satisfy $0.55 \leq \alpha/\beta \leq 1.85$ and $80\% \leq \alpha+\beta$.

TABLE 8

| Sample No. | α/β [—] | α + β [%] | Relative dielectric constant [—] | DC withstand voltage [V/µm] | High-temperature load lifetime [hour] |
|---|---|---|---|---|---|
| *A1 | 1.10 | 30 | 1150 | 45 | 55 |
| A2 | 1.20 | 40 | 1240 | 70 | 85 |
| A3 | 1.25 | 35 | 1220 | 65 | 95 |
| A4 | 1.30 | 40 | 1360 | 70 | 90 |
| A5 | 1.20 | 45 | 1330 | 85 | 100 |
| A6 | 1.25 | 35 | 1170 | 80 | 90 |
| *A7 | 1.20 | 30 | 1060 | 35 | 55 |
| *A8 | 1.25 | 35 | 1120 | 45 | 65 |
| A9 | 1.20 | 25 | 1200 | 60 | 85 |
| A10 | 1.10 | 35 | 1380 | 55 | 95 |
| A11 | 1.20 | 40 | 1470 | 70 | 95 |
| A12 | 1.10 | 40 | 1290 | 55 | 90 |
| *A13 | 1.20 | 35 | 1410 | 35 | 40 |
| *A14 | 0.45 | 30 | 1260 | 45 | 65 |
| A15 | 0.55 | 30 | 1170 | 65 | 95 |
| A16 | 0.70 | 35 | 1190 | 55 | 100 |
| A17 | 1.00 | 30 | 1360 | 60 | 95 |
| A18 | 1.50 | 35 | 1430 | 75 | 95 |
| A19 | 1.85 | 40 | 1170 | 50 | 90 |
| *A20 | 2.30 | 35 | 1150 | 40 | 55 |
| A21 | 1.80 | 40 | 1400 | 60 | 100 |
| A22 | 0.50 | 35 | 1310 | 70 | 100 |
| A23 | 1.80 | 30 | 1260 | 75 | 95 |
| A24 | 1.85 | 30 | 1380 | 80 | 90 |

According to the results shown in Table 8, it was confirmed that among sample Nos. A1 to A24, laminated ceramic capacitor samples that had parameters within the ranges of the present embodiment had the relative dielectric constant of 1000 or more at 250° C.; and the high-temperature load lifetimes were 80 hours or more when direct voltage was applied continuously so as to be 20 V/µm with respect to the thickness of the dielectric layer.

Contrary to that, a sufficient insulation property was difficult to obtain in the sample No. A1 since x in the chemical formula $(Ba_{1-x}Sr_x)_2Nb_5O_{15}$ was less than 0.35 being out of the range of the present embodiment. Accordingly, the sample No. A1 had a low high-temperature load lifetime of 55 hours. In addition, x exceeded 0.75 in the sample No. A7 being out of the range of the present embodiment. Accordingly, it was confirmed that the sample No. A7 had a low high-temperature load lifetime of 55 hours.

In the sample No. A8, u in the chemical formula $Ba(Ti_{1-u}Zr_u)O_3$ was less than 0.02 being out of the range of the present embodiment. Thus, the effect of suppressing the migration of oxygen defects, which were believed to be the reason of deterioration of the high-temperature load lifetime, could not be obtained. Accordingly, the sample No. A8 had a low high-temperature load lifetime of 65 hours. On the other hand, in the sample No. A13, u exceeded 0.25 being out of the range of the present embodiment. Thus, it was confirmed that excessive Zr tends to form the hetero-phase at the grain boundary and dispersion of crystal grain size of the crystal grains in the dielectric composition tends to be large. Accordingly, the sample No. A13 had a low high-temperature load lifetime of 40 hours.

In addition, since a was less than 0.35 in the sample No. A14 and exceeded 0.65 in the sample No. A20 being out of the range of the present embodiment, they had a low high-temperature load lifetimes of 65 hours and 55 hours, respectively.

Example 2-2

The area ratio of the crystal grains constituted of the $K(Ba_{1-x}Sr_x)_2Nb_5O_{15}$ or $Ba(Ti_{1-u}Zr_u)O_3$ is calculated by using the dielectric composition manufacturing method 2 described above The results with the increased area ratios are shown.

First, for $K(Ba_{1-x}Sr_x)_2Nb_5O_{15}$, $K_2CO_3$, $BaCO_3$, $SrCO_3$, and $Nb_2O_5$ powders having the average particle size of 1.0 µm or less were prepared as starting materials. The above starting materials were weighed so as to be x shown in Table 9 and wet-mixed for 17 hours with a ball mill using ethanol as a dispersion medium. Thereafter, the obtained mixture was dried to obtain a mixed raw material powder. Thereafter, the first heat treatment is performed at a holding temperature of 900° C. to 1000° C. for a holding time of 10 hours to 24 hours. Then the second heat treatment at a holding temperature of 750° C. to 850° C. and a holding time of 10 hours to 24 hours was performed to obtain the calcined powder of $K(Ba_{1-x}Sr_x)_2Nb_5O_{15}$.

Next, for $Ba(Ti_{1-u}Zr_u)O_3$, $BaCO_3$, $TiO_2$, and $ZrO_2$ powders having the average grain diameter of 1.0 µm or less were prepared as starting materials. These starting materials were weighed so that u shown in Table 9 were obtained and wet mixed using a ball mill for 17 hours with ethanol as a dispersion medium. Thereafter, the obtained mixture was dried to obtain a mixed raw material powder. Thereafter, the first heat treatment was performed at a holding temperature of 950° C. to 1100° C. for a holding time of 10 hours to 24 hours. Then, the second heat treatment at a holding temperature of 750° C. to 850° C. and a holding time of 10 hours to 24 hours was performed to obtain the calcined powder of $Ba(Ti_{1-u}Zr_u)O_3$.

After weighing the obtained calcined powder of $K(Ba_{1-x}Sr_x)_2Nb_5O_{15}$ and the calcined powder of $Ba(Ti_{1-u}Zr_u)O_3$ so as to have the compounding ratio shown in Table 9, the material was wet mixed for 17 to 36 hours with a ball mill using ethanol as dispersion medium. Thereafter, the obtained mixture was dried to obtain raw material powder of the dielectric composition shown in Table 9.

TABLE 9

| Sample No. | Substitution amount x in $K(Ba_{1-x}Sr_x)_2Nb_5O_{15}$ | $Ba(Ti_{1-u}Zr_u)O_3$ Substitution amount u | Mixing ratio of calcined powders $K(Ba_{1-x}Sr_x)_2Nb_5O_{15}$ [mol %] | $Ba(Ti_{1-u}Zr_u)O_3$ [mol %] |
|---|---|---|---|---|
| *A25 | 0.30 | 0.20 | 55 | 45 |
| A26 | 0.35 | 0.20 | 55 | 45 |
| A27 | 0.45 | 0.20 | 55 | 45 |
| A28 | 0.50 | 0.20 | 55 | 45 |
| A29 | 0.60 | 0.20 | 55 | 45 |
| A30 | 0.75 | 0.20 | 55 | 45 |
| *A31 | 0.80 | 0.20 | 55 | 45 |
| *A32 | 0.60 | 0.00 | 55 | 45 |
| A33 | 0.60 | 0.02 | 55 | 45 |
| A34 | 0.60 | 0.10 | 55 | 45 |
| A35 | 0.60 | 0.15 | 55 | 45 |
| A36 | 0.60 | 0.25 | 55 | 45 |
| *A37 | 0.60 | 0.30 | 55 | 45 |
| *A38 | 0.60 | 0.20 | 30 | 70 |
| A39 | 0.60 | 0.20 | 35 | 65 |
| A40 | 0.60 | 0.20 | 40 | 60 |
| A41 | 0.60 | 0.20 | 50 | 50 |
| A42 | 0.60 | 0.20 | 60 | 40 |
| A43 | 0.60 | 0.20 | 65 | 35 |
| *A44 | 0.60 | 0.20 | 70 | 30 |
| A45 | 0.35 | 0.02 | 65 | 35 |
| A46 | 0.35 | 0.25 | 35 | 65 |
| A47 | 0.75 | 0.02 | 65 | 35 |
| A48 | 0.75 | 0.25 | 65 | 35 |

Thereafter, in the same manner as in Example 2-1, the dielectric layer paste and the inner electrode layer paste were prepared.

Then, the green chip was produced in the same manner as in Example 2-1.

Next, the obtained green chip was subjected to de-binder treatment, calcining, and annealing treatment to obtain a laminated ceramic sintered body as in the same method as in Example 1-2. Conditions for the de-binder treatment, calcining and annealing are as described in Example 1-2.

The crystal structure of the dielectric layer was measured by X-ray diffraction (XRD) in the obtained laminated ceramic sintered body. As a result, it was confirmed that each of $K(Ba_{1-x}Sr_x)_2Nb_5O_{15}$ and $Ba(Ti_{1-u}Zr_u)O_3$ existed independently in the laminated ceramic sintered body of the present embodiment.

In addition, composition analysis of each sample was conducted using ICP emission spectroscopy for each of the obtained laminated ceramic sintered body. As a result, it was confirmed that the obtained laminated ceramic sintered body had almost the same value as the dielectric composition described in Tables 9 and 10.

After grinding the end face of the obtained laminated ceramic sintered body by sandblasting, an In—Ga eutectic alloy was applied as an external electrode, and sample Nos. A25 to A48 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 μm. The thickness of the inner electrode layer was 2 μm. The number of the dielectric layers sandwiched between the inner electrode layers was 50.

The relative dielectric constant; the DC withstand voltage; the high-temperature load lifetime; and the area ratio of crystal grains consisted of $K(Ba_{1-x}Sr_x)_2Nb_5O_{15}$ and crystal grains consisted of $Ba(Ti_{1-u}Zr_u)O_3$ based on the image analysis were measured and evaluated in the laminated ceramic capacitor sample Nos. A25 to A48 by using the same measurement methods as in the example 2-1. Results are shown in Table 10.

1000 or more at 250° C.; the DC withstand voltage of 100V/μm at 250° C.; and the high-temperature load lifetimes were 100 hours or more when direct voltage was applied continuously so as to be 20 V/μm with respect to the thickness of the dielectric layer.

According to the results shown in Tables 8 and 10, it was confirmed that the DC withstand voltage was less than 100 V/μm at 250° C. in the laminated ceramic capacitor, in which the relationship between α and β did not satisfy 0.55≤α/β≤1.85 and 80%≤α+β when α was the area ratio of crystal grains constituted of $K(Ba_{1-x}Sr_x)_2Nb_5O_{15}$ in percentage; and β was the area ratio of crystal grains constituted of $Ba(Ti_{1-u}Zr_u)O_3$ in percentage.

It was confirmed that high high-temperature load lifetime and high DC withstand voltage were achieved at the same time at 250° C., which had been difficult to achieve so far, by not only controlling the material composition of the dielectric composition but also controlling the composition of the crystal grains constituting the dielectric composition at the same time.

TABLE 10

| Sample No. | a [—] | b [—] | α/β [—] | α + β [%] | Relative dielectric constant [—] | DC withstand voltage [V/μm] | High-temperature load lifetime [hour] |
|---|---|---|---|---|---|---|---|
| *A25 | 0.55 | 0.45 | 1.25 | 84 | 1050 | 80 | 60 |
| A26 | 0.55 | 0.45 | 1.20 | 86 | 1100 | 125 | 105 |
| A27 | 0.55 | 0.45 | 1.15 | 88 | 1080 | 120 | 115 |
| A28 | 0.55 | 0.45 | 1.20 | 86 | 1220 | 130 | 105 |
| A29 | 0.55 | 0.45 | 1.25 | 88 | 1190 | 140 | 115 |
| A30 | 0.55 | 0.45 | 1.20 | 80 | 1060 | 135 | 105 |
| *A31 | 0.55 | 0.45 | 1.20 | 76 | 1020 | 65 | 65 |
| *A32 | 0.55 | 0.45 | 1.20 | 74 | 1000 | 85 | 75 |
| A33 | 0.55 | 0.45 | 1.25 | 86 | 1080 | 110 | 105 |
| A34 | 0.55 | 0.45 | 1.20 | 82 | 1250 | 105 | 110 |
| A35 | 0.55 | 0.45 | 1.15 | 84 | 1300 | 125 | 110 |
| A36 | 0.55 | 0.45 | 1.20 | 84 | 1160 | 110 | 105 |
| *A37 | 0.55 | 0.45 | 1.25 | 86 | 1260 | 80 | 50 |
| *A38 | 0.30 | 0.70 | 0.45 | 86 | 1130 | 90 | 80 |
| A39 | 0.35 | 0.65 | 0.55 | 84 | 1060 | 120 | 110 |
| A40 | 0.40 | 0.60 | 0.70 | 86 | 1070 | 110 | 115 |
| A41 | 0.50 | 0.50 | 1.05 | 88 | 1220 | 120 | 110 |
| A42 | 0.60 | 0.40 | 1.50 | 82 | 1290 | 135 | 110 |
| A43 | 0.65 | 0.35 | 1.85 | 80 | 1080 | 110 | 105 |
| *A44 | 0.70 | 0.30 | 2.30 | 88 | 1060 | 75 | 65 |
| A45 | 0.65 | 0.35 | 1.80 | 86 | 1230 | 115 | 115 |
| A46 | 0.35 | 0.65 | 0.55 | 82 | 1190 | 130 | 115 |
| A47 | 0.65 | 0.35 | 1.85 | 86 | 1140 | 140 | 110 |
| A48 | 0.65 | 0.35 | 1.85 | 84 | 1250 | 140 | 105 |

According to the results shown in Table 10, it was confirmed that among sample Nos. A25 to A48, laminated ceramic capacitor samples that had parameters within the scope of the present embodiment and satisfied 0.55≤α/β≤1.85 and 80%≤α+β had the relative dielectric constant of Example 2-3

By using the same methods as in the example 2-2, the raw material powders of the dielectric composition shown in Table 11 were produced.

TABLE 11

| | Substitution amount | Substitution | Mixing ratio of calcined powders | |
|---|---|---|---|---|
| Sample No. | x in $K(Ba_{1-x}Sr_x)_2Nb_5O_{15}$ | amount u in $Ba(Ti_{1-u}Zr_u)O_3$ | $K(Ba_{1-x}Sr_x)_2Nb_5O_{15}$ [mol %] | $Ba(Ti_{1-u}Zr_u)O_3$ [mol %] |
| A49 | 0.35 | 0.03 | 50 | 50 |
| A50 | 0.35 | 0.04 | 60 | 40 |
| A51 | 0.35 | 0.10 | 42 | 58 |
| A52 | 0.35 | 0.15 | 54 | 46 |
| A53 | 0.35 | 0.20 | 65 | 35 |
| A54 | 0.45 | 0.03 | 35 | 65 |

TABLE 11-continued

| Sample No. | Substitution amount x in $K(Ba_{1-x}Sr_x)_2Nb_5O_{15}$ | Substitution amount u in $Ba(Ti_{1-u}Zr_u)O_3$ | Mixing ratio of calcined powders $K(Ba_{1-x}Sr_x)_2Nb_5O_{15}$ [mol %] | $Ba(Ti_{1-u}Zr_u)O_3$ [mol %] |
|---|---|---|---|---|
| A55 | 0.45 | 0.04 | 54 | 46 |
| A56 | 0.45 | 0.10 | 50 | 50 |
| A57 | 0.45 | 0.15 | 60 | 40 |
| A58 | 0.45 | 0.20 | 50 | 50 |
| A59 | 0.50 | 0.03 | 50 | 50 |
| A60 | 0.50 | 0.04 | 50 | 50 |
| A61 | 0.50 | 0.10 | 50 | 50 |
| A62 | 0.50 | 0.15 | 50 | 50 |
| A63 | 0.50 | 0.20 | 50 | 50 |
| A64 | 0.60 | 0.10 | 50 | 50 |
| A65 | 0.70 | 0.10 | 60 | 40 |
| A66 | 0.45 | 0.10 | 35 | 65 |
| A67 | 0.45 | 0.10 | 42 | 58 |
| A68 | 0.45 | 0.10 | 60 | 40 |
| A69 | 0.45 | 0.10 | 65 | 35 |

A multilayer ceramic capacitor sample was prepared using the obtained dielectric composition raw material powder in the same manner as in Example 2-2, and measurement and evaluation were carried out in the same manner as in Example 2-1 and Example 2-2. Results are shown in Table 12.

TABLE 12

| Sample No. | a [—] | b [—] | α/β [—] | α + β [%] | Relative dielectric constant [—] | DC withstand voltage [V/μm] | High-temperature load lifetime [hour] |
|---|---|---|---|---|---|---|---|
| A49 | 0.50 | 0.50 | 1.00 | 94 | 1100 | 130 | 110 |
| A50 | 0.60 | 0.40 | 1.50 | 93 | 1140 | 160 | 125 |
| A51 | 0.42 | 0.58 | 0.70 | 95 | 1170 | 175 | 130 |
| A52 | 0.54 | 0.46 | 1.20 | 95 | 1200 | 165 | 140 |
| A53 | 0.65 | 0.35 | 1.85 | 97 | 1170 | 140 | 115 |
| A54 | 0.35 | 0.65 | 0.55 | 94 | 1230 | 125 | 110 |
| A55 | 0.54 | 0.46 | 1.20 | 95 | 1270 | 175 | 135 |
| A56 | 0.50 | 0.50 | 1.00 | 91 | 1190 | 185 | 130 |
| A57 | 0.60 | 0.40 | 1.50 | 90 | 1200 | 170 | 140 |
| A58 | 0.50 | 0.50 | 1.00 | 86 | 1150 | 135 | 105 |
| A59 | 0.50 | 0.50 | 1.00 | 90 | 1170 | 125 | 110 |
| A60 | 0.50 | 0.50 | 1.00 | 92 | 1190 | 170 | 130 |
| A61 | 0.50 | 0.50 | 1.00 | 93 | 1110 | 175 | 135 |
| A62 | 0.50 | 0.50 | 1.00 | 95 | 1090 | 180 | 140 |
| A63 | 0.50 | 0.50 | 1.00 | 92 | 1110 | 140 | 110 |
| A64 | 0.50 | 0.50 | 1.00 | 94 | 1080 | 135 | 105 |
| A65 | 0.60 | 0.40 | 1.50 | 88 | 1090 | 130 | 110 |
| A66 | 0.35 | 0.65 | 0.55 | 93 | 1150 | 130 | 105 |
| A67 | 0.42 | 0.58 | 0.70 | 96 | 1120 | 170 | 125 |
| A68 | 0.60 | 0.40 | 1.50 | 94 | 1130 | 180 | 135 |
| A69 | 0.65 | 0.35 | 1.85 | 92 | 1160 | 135 | 115 |

According to the results shown in Table 12, it was confirmed that among the sample Nos. A49 to A69 which had parameters within the ranges of the present embodiment, the laminated ceramic capacitors, in which x, u, α and β satisfied $0.35 \leq x \leq 0.50$, $0.04 \leq u \leq 0.15$, $0.70 \leq \alpha/\beta \leq 1.50$, and $90\% \leq \alpha+\beta$, showed even more excellent properties such as: the relative dielectric constant of 1000 or more at 250° C.; the DC withstand voltage of 150V/μm at 250° C.; and high-temperature load lifetime of 120 hours or more when continuous DC voltage was continuously applied so as to be 20 V/μm with respect to the thickness of the dielectric layer.

Third Example

Example 3-1

In Example 3-1, the case where a calcined powder of a dielectric composition was produced according to the above-mentioned method 1 for manufacturing a dielectric composition was described.

First, $K_2CO_3$, $BaCO_3$, $SrCO_3$, $CaCO_3$, $Nb_2O_5$, $TiO_2$ and $SiO_2$ powders having the average particle size of 1.0 μm or less were prepared as starting materials; and these powders were weighted so as to satisfy x, v, a, b described in each sample number in Table 13 in the chemical formula $a\{K(Ba_{1-x}Sr_x)_2Nb_5O_{15}\}+b\{(Ca_{1-v}Sr_v)TiSiO_5\}$. Thereafter, wet mixing was carried out for 17 hours by a ball mill using ethanol as a dispersion medium. Thereafter, the obtained mixture was dried to obtain a mixed raw material powder. Thereafter, heat treatment was performed in air at a holding temperature of 950° C. and a holding time of 24 hours to obtain raw material powder of the dielectric composition.

TABLE 13

| Sample No. | Substitution amount x in $K(Ba_{1-x}Sr_x)_2Nb_5O_{15}$ | Substitution amount v in $(Ca_{1-v}Sr_v)TiSiO_5$ | a [—] | b [—] |
|---|---|---|---|---|
| *B1 | 0.30 | 0.50 | 0.45 | 0.55 |
| B2 | 0.35 | 0.50 | 0.45 | 0.55 |
| B3 | 0.45 | 0.50 | 0.45 | 0.55 |
| B4 | 0.50 | 0.50 | 0.45 | 0.55 |
| B5 | 0.60 | 0.50 | 0.45 | 0.55 |
| B6 | 0.75 | 0.50 | 0.45 | 0.55 |
| *B7 | 0.80 | 0.50 | 0.45 | 0.55 |
| *B8 | 0.60 | 0.30 | 0.45 | 0.55 |
| B9 | 0.60 | 0.40 | 0.45 | 0.55 |
| B10 | 0.60 | 0.60 | 0.45 | 0.55 |
| B11 | 0.60 | 0.75 | 0.45 | 0.55 |
| B12 | 0.60 | 0.85 | 0.45 | 0.55 |
| *B13 | 0.60 | 0.90 | 0.45 | 0.55 |
| *B14 | 0.60 | 0.50 | 0.30 | 0.70 |
| B15 | 0.60 | 0.50 | 0.37 | 0.63 |
| B16 | 0.60 | 0.50 | 0.40 | 0.60 |
| B17 | 0.60 | 0.50 | 0.55 | 0.45 |
| B18 | 0.60 | 0.50 | 0.60 | 0.40 |
| B19 | 0.60 | 0.50 | 0.62 | 0.38 |
| *B20 | 0.60 | 0.50 | 0.65 | 0.35 |
| B21 | 0.35 | 0.40 | 0.62 | 0.38 |
| B22 | 0.35 | 0.75 | 0.37 | 0.63 |
| B23 | 0.75 | 0.40 | 0.62 | 0.38 |
| B24 | 0.75 | 0.75 | 0.62 | 0.38 |

By using 1000 g of the raw material powder of the dielectric composition obtained as described above, the paste for the dielectric layer; the paste for the inner electrode layer; the green sheet; the green chip; and the laminated ceramic sintered body were obtained as in Example 1-1.

Composition analysis of each sample was conducted using ICP emission spectroscopy for each of the obtained laminated ceramic sintered body. As a result, it was confirmed that the obtained laminated ceramic sintered body had almost the same value as the dielectric composition described in Table 13.

After grinding the end face of the obtained laminated ceramic sintered body by sandblasting, an In—Ga eutectic alloy was applied as an external electrode, and sample Nos. B1 to B24 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 μm. The thickness of the inner electrode layer was 2 μm. The number of the dielectric layers sandwiched between the inner electrode layers was 50.

The relative dielectric constant; the DC withstand voltage; the high-temperature load lifetime; and the area ratio of crystal grains consisted of $K(Ba_{1-x}Sr_x)_2Nb_5O_{15}$ and crystal grains consisted of $(Ca_{1-v}Sr_v)TiSiO_5$ based on the image analysis were measured and evaluated in the laminated ceramic capacitor sample Nos. B1 to B24 by the methods described below. Results are shown in Table 14.

[Relative Dielectric Constant]

The capacitance of the laminated ceramic capacitor was measured by inputting a signal having frequency of 1 kHz and 1 Vrm of the signal level (measured voltage) at 250° C. by using the digital LCR meter (4284A manufactured by YHP Co., Ltd.). The relative dielectric constant (no unit) was calculated based on the thickness of the dielectric layer, the effective electrode area, and the electrostatic capacitance C obtained as a result of the measurement. It is preferable that the relative dielectric constant is high, and 300 or more is regarded as excellent.

[DC Withstand Voltage]

The DC withstand voltage was measured and evaluated in the same manner as in Example 1-1.

[High-Temperature Load Life]

The high temperature load lifetime was measured and evaluated by the same method as in Example 1-1.

[Evaluation of α and β by Image Analysis]

TEM samples of the dielectric layers were prepared and STEM-EDS mapping was carried out in the same manner as in Example 1-1. The field of view of the mapping was 7 μm×7 μm, and mapping was performed over 10 fields or more for each sample. By using the elemental mapping obtained by the above-described method, area of K, Ba, Sr, and Nb, which were the elements of $K(Ba_{1-x}Sr_x)_2Nb_5O_{15}$, and Ca, Sr, Ti and Si, which were elements of $(Ca_{1-v}Sr_v)TiSiO_5$, were identified. Then, the area ratio α (%) of crystal grains constituted of $K(Ba_{1-x}Sr_x)_2Nb_5O_{15}$; and the area ratio β (%) of crystal grains constituted of $(Ca_{1-v}Sr_v)TiSiO_5$ were calculated by using the average area from results over 10 fields of view. In the present embodiment, in order to obtain a high DC withstand voltage and an excellent high-temperature load lifetime, preferably, α and β were set to satisfy 0.60≤α/β≤1.60 and 80%≤α+β.

TABLE 14

| Sample No. | α/β [—] | α + β [%] | Relative dielectric constant [—] | DC withstand voltage [V/μm] | High-temperature load lifetime [hour] |
|---|---|---|---|---|---|
| *B1 | 0.75 | 25 | 390 | 35 | 65 |
| B2 | 0.80 | 35 | 410 | 60 | 85 |
| B3 | 0.85 | 40 | 405 | 65 | 90 |
| B4 | 0.80 | 40 | 455 | 75 | 95 |
| B5 | 0.75 | 35 | 445 | 80 | 100 |
| B6 | 0.80 | 30 | 390 | 65 | 85 |
| *B7 | 0.85 | 30 | 355 | 45 | 60 |
| *B8 | 0.70 | 40 | 375 | 30 | 75 |
| B9 | 0.75 | 35 | 400 | 55 | 85 |
| B10 | 0.80 | 40 | 460 | 60 | 90 |
| B11 | 0.85 | 40 | 490 | 75 | 95 |
| B12 | 0.70 | 35 | 430 | 60 | 95 |
| *B13 | 0.80 | 30 | 470 | 40 | 55 |
| *B14 | 0.45 | 35 | 420 | 35 | 70 |
| B15 | 0.60 | 30 | 390 | 55 | 90 |
| B16 | 0.65 | 35 | 395 | 75 | 95 |
| B17 | 1.20 | 40 | 455 | 70 | 90 |
| B18 | 1.50 | 30 | 475 | 75 | 95 |
| B19 | 1.60 | 35 | 390 | 55 | 85 |
| *B20 | 1.85 | 25 | 380 | 35 | 70 |
| B21 | 1.55 | 35 | 465 | 55 | 90 |
| B22 | 0.65 | 40 | 435 | 70 | 95 |
| B23 | 1.60 | 35 | 420 | 75 | 85 |
| B24 | 1.55 | 30 | 460 | 70 | 90 |

According to the results shown in Table 14, it was confirmed that among sample Nos. B1 to B24, laminated ceramic capacitor samples that had parameters within the ranges of the present embodiment had the relative dielectric constant of 300 or more at 250° C.; and the high-temperature load lifetimes were 80 hours or more when direct voltage was applied continuously so as to be 20 V/μm with respect to the thickness of the dielectric layer.

Contrary to that, a sufficient insulation property was difficult to obtain in the sample No. B1 since x in the chemical formula $(Ba_{1-x}Sr_x)_2Nb_5O_{15}$ was less than 0.35 being out of the range of the present embodiment. Accordingly, the sample No. B1 had as low high-temperature load lifetime of 65 hours. In addition, x exceeded 0.75 in the sample No. B7 being out of the range of the present embodiment. Accordingly, it was confirmed that the sample No. B7 had a low high-temperature load lifetime of 45 hours.

In the sample No. B8, v in the chemical formula $(Ca_{1-v}Sr_v)TiSiO_5$ was less than 0.40 being out of the range of the present embodiment. Thus, the effect of suppressing the migration of oxygen defects, which were believed to be the reason of deterioration of the high-temperature load lifetime, could not be obtained. Accordingly, the sample No. B8 had a low high-temperature load lifetime of 75 hours. On the other hand, in the sample No. B13, v exceeded 0.85 being out of the range of the present embodiment. Thus, it was confirmed that the sample No. B13 had a low high-temperature load lifetime of 55 hours since the insulation property in a high temperature was low.

In addition, since a was less than 0.37 in the sample No. B14 and exceeded 0.62 in the sample No. B20 being out of the range of the present embodiment, they had a low high-temperature load lifetime of 70 hours.

Example 3-2

The area ratio of the crystal grains constituted of the $K(Ba_{1-x}Sr_x)_2Nb_5O_{15}$ or $(Ca_{1-v}Sr_v)TiSiO_5$ is calculated by using the dielectric composition manufacturing method 2 described above The results with the increased area ratios are shown.

First, for $K(Ba_{1-x}Sr_x)_2Nb_5O_{15}$, $K_2CO_3$, $BaCO_3$, $SrCO_3$, and $Nb_2O_5$ powders having the average particle size of 1.0 μm or less were prepared as starting materials. The above starting materials were weighed so as to be x shown in Table 15 and wet-mixed for 17 hours with a ball mill using ethanol as a dispersion medium. Thereafter, the obtained mixture was dried to obtain a mixed raw material powder. Thereafter, the first heat treatment is performed at a holding temperature of 900° C. to 1000° C. for a holding time of 10 hours to 24 hours. Then the second heat treatment at a holding temperature of 750° C. to 850° C. and a holding time of 10 hours to 24 hours was performed to obtain the calcined powder of $K(Ba_{1-x}Sr_x)_2Nb_5O_{15}$.

Next, for $(Ca_{1-v}Sr_v)TiSiO_5$, $CaCO_3$, $SrCO_3$, $TiO_2$ and $SiO_2$ powders having the average grain diameter of 1.0 μm or less were prepared as starting materials. These starting materials were weighed so that v shown in Table 15 were obtained and wet mixed using a ball mill for 17 hours with ethanol as a dispersion medium. Thereafter, the obtained mixture was dried to obtain a mixed raw material powder. Thereafter, the first heat treatment was performed at a holding temperature of 950° C. to 1100° C. for a holding time of 10 hours to 24 hours. Then, the second heat treatment at a holding temperature of 750° C. to 850° C. and a holding time of 10 hours to 24 hours was performed to obtain the calcined powder of $(Ca_{1-v}Sr_v)TiSiO_5$.

After weighing the obtained calcined powder of $K(Ba_{1-x}Sr_x)_2Nb_5O_{15}$ and the calcined powder of $(Ca_{1-v}Sr_v)TiSiO_5$ so as to have the compounding ratio shown in Table 15, the material was wet mixed for 17 to 36 hours with a ball mill using ethanol as dispersion medium. Thereafter, the obtained mixture was dried to obtain raw material powder of the dielectric composition shown in Table 15.

TABLE 15

| Sample No. | Substitution amount x in $K(Ba_{1-x}Sr_x)_2Nb_5O_{15}$ | $(Ca_{1-v}Sr_v)TiSiO_5$ Substitution amount v | Mixing ratio of calcined powders | |
|---|---|---|---|---|
| | | | $K(Ba_{1-x}Sr_x)_2Nb_5O_{15}$ [mol %] | $(Ca_{1-v}Sr_v)TiSiO_5$ [mol %] |
| *B25 | 0.30 | 0.50 | 45 | 55 |
| B26 | 0.35 | 0.50 | 45 | 55 |
| B27 | 0.45 | 0.50 | 45 | 55 |
| B28 | 0.50 | 0.50 | 45 | 55 |
| B29 | 0.60 | 0.50 | 45 | 55 |
| B30 | 0.75 | 0.50 | 45 | 55 |
| *B31 | 0.80 | 0.50 | 45 | 55 |
| *B32 | 0.60 | 0.30 | 45 | 55 |
| B33 | 0.60 | 0.40 | 45 | 55 |
| B34 | 0.60 | 0.60 | 45 | 55 |
| B35 | 0.60 | 0.75 | 45 | 55 |
| B36 | 0.60 | 0.85 | 45 | 55 |
| *B37 | 0.60 | 0.90 | 45 | 55 |
| *B38 | 0.60 | 0.50 | 30 | 70 |
| B39 | 0.60 | 0.50 | 37 | 63 |
| B40 | 0.60 | 0.50 | 40 | 60 |
| B41 | 0.60 | 0.50 | 55 | 45 |
| B42 | 0.60 | 0.50 | 60 | 40 |
| B43 | 0.60 | 0.50 | 62 | 38 |
| *B44 | 0.60 | 0.50 | 65 | 35 |
| B45 | 0.35 | 0.40 | 62 | 38 |
| B46 | 0.35 | 0.75 | 37 | 63 |
| B47 | 0.75 | 0.40 | 62 | 38 |
| B48 | 0.75 | 0.75 | 62 | 38 |

Thereafter, in the same manner as in Example 3-1, the dielectric layer paste and the inner electrode layer paste were prepared.

Then, the green chip was produced in the same manner as in Example 3-1.

Next, the obtained green chip was subjected to de-binder treatment, calcining, and annealing treatment to obtain a laminated ceramic sintered body as in the same method as in Example 1-2. Conditions for the de-binder treatment, calcining and annealing are as described in Example 1-2.

The crystal structure of the dielectric layer was measured by X-ray diffraction (XRD) in the obtained laminated ceramic sintered body. As a result, it was confirmed that each of $K(Ba_{1-x}Sr_x)_2Nb_5O_{15}$ and $(Ca_{1-y}Sr_y)TiSiO_5$ existed independently in the laminated ceramic sintered body of the present embodiment.

In addition, composition analysis of each sample was conducted using ICP emission spectroscopy for each of the obtained laminated ceramic sintered body. As a result, it was confirmed that the obtained laminated ceramic sintered body had almost the same value as the dielectric composition described in Tables 15 and 16.

After grinding the end face of the obtained laminated ceramic sintered body by sandblasting, an In—Ga eutectic alloy was applied as an external electrode, and sample Nos. B25 to B48 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 μm. The thickness of the inner electrode layer was 2 μm. The number of the dielectric layers sandwiched between the inner electrode layers was 50.

The relative dielectric constant; the DC withstand voltage; the high-temperature load lifetime; and the area ratio of crystal grains consisted of $K(Ba_{1-x}Sr_x)_2Nb_5O_{15}$ and crystal grains consisted of $(Ca_{1-y}Sr_y)TiSiO_5$ based on the image analysis were measured and evaluated in the laminated ceramic capacitor sample Nos. B25 to B48 by using the same measurement methods as in the example 3-1. Results are shown in Table 16.

According to the results shown in Table 16, it was confirmed that among sample Nos. B25 to B48, laminated ceramic capacitor samples that had parameters within the scope of the present embodiment and satisfied $0.60 \leq \alpha/\beta \leq 1.60$ and $80\% \leq \alpha+\beta$ had the relative dielectric constant of 300 or more at 250° C.; the DC withstand voltage of 100V/μm at 250° C.; and the high-temperature load lifetimes were 100 hours or more when direct voltage was applied continuously so as to be 20 V/μm with respect to the thickness of the dielectric layer.

According to the results shown in Tables 14 and 16, it was confirmed that the DC withstand voltage was less than 100 V/μm at 250° C. in the laminated ceramic capacitor, in which the relationship between α and β did not satisfy $0.60 \leq \alpha/\beta \leq 1.60$ and $80\% \leq \alpha+\beta$ when α was the area ratio of crystal grains constituted of $K(Ba_{1-x}Sr_x)_2Nb_5O_{15}$ in percentage; and β was the area ratio of crystal grains constituted of $(Ca_{1-y}Sr_y)TiSiO_5$ in percentage.

It was confirmed that high high-temperature load lifetime and high DC withstand voltage were achieved at the same time at 250° C., which had been difficult to achieve so far, by not only controlling the material composition of the dielectric composition but also controlling the composition of the crystal grains constituting the dielectric composition at the same time.

Example 3-3

By using the same methods as in the example 3-2, the raw material powders of the dielectric composition shown in Table 17 were produced.

TABLE 16

| Sample No. | a [—] | b [—] | α/β [—] | α + β [%] | Relative dielectric constant [—] | DC withstand voltage [V/μm] | High-temperature load lifetime [hour] |
|---|---|---|---|---|---|---|---|
| *B25 | 0.45 | 0.55 | 0.85 | 82 | 330 | 85 | 70 |
| B26 | 0.45 | 0.55 | 0.80 | 80 | 350 | 115 | 105 |
| B27 | 0.45 | 0.55 | 0.75 | 88 | 370 | 125 | 100 |
| B28 | 0.45 | 0.55 | 0.80 | 86 | 435 | 125 | 110 |
| B29 | 0.45 | 0.55 | 0.80 | 82 | 450 | 135 | 115 |
| B30 | 0.45 | 0.55 | 0.85 | 86 | 395 | 130 | 100 |
| *B31 | 0.45 | 0.55 | 0.80 | 72 | 435 | 75 | 65 |
| *B32 | 0.45 | 0.55 | 0.75 | 70 | 385 | 65 | 70 |
| B33 | 0.45 | 0.55 | 0.80 | 84 | 360 | 120 | 105 |
| B34 | 0.45 | 0.55 | 0.80 | 80 | 380 | 115 | 110 |
| B35 | 0.45 | 0.55 | 0.75 | 88 | 375 | 135 | 105 |
| B36 | 0.45 | 0.55 | 0.85 | 86 | 420 | 130 | 115 |
| *B37 | 0.45 | 0.55 | 0.85 | 84 | 410 | 75 | 60 |
| *B38 | 0.30 | 0.70 | 0.45 | 78 | 360 | 85 | 65 |
| B39 | 0.37 | 0.63 | 0.60 | 88 | 330 | 110 | 105 |
| B40 | 0.40 | 0.60 | 0.65 | 86 | 345 | 115 | 110 |
| B41 | 0.55 | 0.45 | 1.25 | 86 | 370 | 120 | 110 |
| B42 | 0.60 | 0.40 | 1.55 | 88 | 430 | 130 | 110 |
| B43 | 0.62 | 0.38 | 1.60 | 82 | 390 | 135 | 100 |
| *B44 | 0.65 | 0.35 | 1.80 | 84 | 360 | 85 | 65 |
| B45 | 0.62 | 0.38 | 1.55 | 84 | 365 | 105 | 105 |
| B46 | 0.37 | 0.63 | 0.65 | 80 | 420 | 110 | 100 |
| B47 | 0.62 | 0.38 | 1.60 | 88 | 440 | 135 | 100 |
| B48 | 0.62 | 0.38 | 1.55 | 84 | 430 | 130 | 110 |

TABLE 17

| Sample No. | Substitution amount x in $K(Ba_{1-x}Sr_x)_2Nb_5O_{15}$ | Substitution amount v in $(Ca_{1-v}Sr_v)TiSiO_5$ | Mixing ratio of calcined powders $K(Ba_{1-x}Sr_x)_2Nb_5O_{15}$ [mol %] | $(Ca_{1-v}Sr_v)TiSiO_5$ [mol %] |
|---|---|---|---|---|
| B49 | 0.35 | 0.50 | 50 | 50 |
| B50 | 0.35 | 0.55 | 37 | 63 |
| B51 | 0.35 | 0.65 | 50 | 50 |
| B52 | 0.35 | 0.75 | 52 | 48 |
| B53 | 0.35 | 0.80 | 60 | 40 |
| B54 | 0.45 | 0.50 | 37 | 63 |
| B55 | 0.45 | 0.55 | 37 | 63 |
| B56 | 0.45 | 0.65 | 50 | 50 |
| B57 | 0.45 | 0.75 | 52 | 48 |
| B58 | 0.45 | 0.80 | 50 | 50 |
| B59 | 0.50 | 0.50 | 50 | 50 |
| B60 | 0.50 | 0.55 | 37 | 63 |
| B61 | 0.50 | 0.65 | 50 | 50 |
| B62 | 0.50 | 0.75 | 52 | 48 |
| B63 | 0.50 | 0.80 | 50 | 50 |
| B64 | 0.60 | 0.65 | 50 | 50 |
| B65 | 0.70 | 0.65 | 50 | 50 |
| B66 | 0.45 | 0.65 | 37 | 63 |
| B67 | 0.45 | 0.65 | 37 | 63 |
| B68 | 0.45 | 0.65 | 52 | 48 |
| B69 | 0.45 | 0.65 | 60 | 40 |

A multilayer ceramic capacitor sample was prepared using the obtained dielectric composition raw material powder in the same manner as in Example 3-2, and measurement and evaluation were carried out in the same manner as in Example 3-1 and Example 3-2. Results are shown in Table 18.

TABLE 18

| Sample No. | a [—] | b [—] | $\alpha/\beta$ [—] | $\alpha + \beta$ [%] | Relative dielectric constant [—] | DC withstand voltage [V/μm] | High-temperature load lifetime [hour] |
|---|---|---|---|---|---|---|---|
| B49 | 0.50 | 0.50 | 1.00 | 92 | 420 | 125 | 115 |
| B50 | 0.37 | 0.63 | 0.60 | 94 | 390 | 165 | 135 |
| B51 | 0.50 | 0.50 | 1.05 | 96 | 400 | 175 | 145 |
| B52 | 0.52 | 0.48 | 1.10 | 90 | 380 | 170 | 140 |
| B53 | 0.60 | 0.40 | 1.50 | 88 | 390 | 130 | 105 |
| B54 | 0.37 | 0.63 | 0.60 | 92 | 400 | 110 | 110 |
| B55 | 0.37 | 0.63 | 0.60 | 90 | 370 | 170 | 130 |
| B56 | 0.50 | 0.50 | 1.00 | 92 | 360 | 180 | 125 |
| B57 | 0.52 | 0.48 | 1.10 | 94 | 400 | 175 | 140 |
| B58 | 0.50 | 0.50 | 1.00 | 84 | 390 | 125 | 105 |
| B59 | 0.50 | 0.50 | 0.95 | 88 | 410 | 115 | 110 |
| B60 | 0.37 | 0.63 | 0.65 | 92 | 425 | 160 | 135 |
| B61 | 0.50 | 0.50 | 1.05 | 94 | 395 | 175 | 140 |
| B62 | 0.52 | 0.48 | 1.10 | 90 | 400 | 165 | 125 |
| B63 | 0.50 | 0.50 | 1.00 | 94 | 380 | 130 | 110 |
| B64 | 0.50 | 0.50 | 0.95 | 94 | 365 | 125 | 105 |
| B65 | 0.50 | 0.50 | 1.00 | 86 | 370 | 125 | 110 |
| B66 | 0.37 | 0.63 | 0.60 | 92 | 360 | 120 | 105 |
| B67 | 0.37 | 0.63 | 0.65 | 95 | 365 | 175 | 125 |
| B68 | 0.52 | 0.48 | 1.10 | 94 | 385 | 180 | 145 |
| B69 | 0.60 | 0.40 | 1.55 | 90 | 375 | 125 | 115 |

According to the results shown in Table 18, it was confirmed that among the sample Nos. B49 to B69 which had parameters within the ranges of the present embodiment, the laminated ceramic capacitors, in which x, v, α and β satisfied 0.35≤x≤0.50, 0.55≤v≤0.75, 0.60≤α/β≤1.10, and 90%≤α+β, showed even more excellent properties such as: the relative dielectric constant of 300 or more at 250° C.; the DC withstand voltage of 150V/μm at 250° C.; and the high-temperature load lifetime of 120 hours or more when continuous DC voltage was continuously applied so as to be 20 V/μm with respect to the thickness of the dielectric layer.

Fourth Example

Example 4-1

In Example 4-1, the case where a calcined powder of a dielectric composition was produced according to the above-mentioned method 1 for manufacturing a dielectric composition was described.

First, $K_2CO_3$, $BaCO_3$, $SrCO_3$, $Nb_2O_5$ powders; and oxide powders of La, Pr, Nd, Sm, Y, Gd, Yb, Dy, Er and Ho having the average particle size of 1.0 μm or less were prepared as starting materials; Re shown in each sample number in Table 19 was selected; and these powders were weighted so as to satisfy x, w, a, b described in each sample number in Table 19 in the chemical formula $a\{K(Ba_{1-x}Sr_x)_2Nb_5O_{15}\}+b\{(Ba_{1-w}Re_{2w/3})Nb_2O_6\}$. Thereafter, wet mixing was carried out for 17 hours by a ball mill using ethanol as a dispersion medium. Thereafter, the obtained mixture was dried to obtain a mixed raw material powder. Thereafter, heat treatment was performed in air at a holding temperature of 1000° C. and a holding time of 24 hours to obtain raw material powder of the dielectric composition.

alloy was applied as an external electrode, and sample Nos. C1 to C39 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 μm. The thickness of the inner electrode layer was 2 μm. The number of the dielectric layers sandwiched between the inner electrode layers was 50.

The relative dielectric constant; the DC withstand voltage; the high-temperature load lifetime; and the area ratio of crystal grains consisted of $K(Ba_{1-x}Sr_x)_2Nb_5O_{15}$ and crystal grains consisted of $(Ba_{1-w}Re_{2w/3})Nb_2O_6$ based on the image analysis were measured and evaluated in the laminated

TABLE 19

| Sample No. | Substitution amount x in $K(Ba_{1-x}Sr_x)_2Nb_5O_{15}$ | $(Ba_{1-w}Re_{2w/3})Nb_2O_6$ Re | Substitution amount w | a [—] | b [—] |
|---|---|---|---|---|---|
| *C1 | 0.30 | La | 0.30 | 0.65 | 0.35 |
| C2 | 0.35 | La | 0.30 | 0.65 | 0.35 |
| C3 | 0.45 | La | 0.30 | 0.65 | 0.35 |
| C4 | 0.50 | La | 0.30 | 0.65 | 0.35 |
| C5 | 0.60 | La | 0.30 | 0.65 | 0.35 |
| C6 | 0.75 | La | 0.30 | 0.65 | 0.35 |
| *C7 | 0.80 | La | 0.30 | 0.65 | 0.35 |
| *C8 | 0.60 | La | 0.10 | 0.65 | 0.35 |
| C9 | 0.60 | La | 0.20 | 0.65 | 0.35 |
| C10 | 0.60 | La | 0.40 | 0.65 | 0.35 |
| C11 | 0.60 | La | 0.60 | 0.65 | 0.35 |
| C12 | 0.60 | La | 0.85 | 0.65 | 0.35 |
| *C13 | 0.60 | La | 0.90 | 0.65 | 0.35 |
| *C14 | 0.60 | La | 0.30 | 0.10 | 0.90 |
| C15 | 0.60 | La | 0.30 | 0.25 | 0.75 |
| C16 | 0.60 | La | 0.30 | 0.35 | 0.65 |
| C17 | 0.60 | La | 0.30 | 0.50 | 0.50 |
| C18 | 0.60 | La | 0.30 | 0.60 | 0.40 |
| C19 | 0.60 | La | 0.30 | 0.70 | 0.30 |
| C20 | 0.60 | La | 0.30 | 0.75 | 0.25 |
| *C21 | 0.60 | La | 0.30 | 0.80 | 0.20 |
| C22 | 0.60 | Pr | 0.30 | 0.65 | 0.35 |
| C23 | 0.60 | Nd | 0.30 | 0.65 | 0.35 |
| C24 | 0.60 | Sm | 0.30 | 0.65 | 0.35 |
| C25 | 0.60 | Y | 0.30 | 0.65 | 0.35 |
| C26 | 0.60 | Gd | 0.30 | 0.65 | 0.35 |
| C27 | 0.60 | Yb | 0.30 | 0.65 | 0.35 |
| C28 | 0.60 | Dy | 0.30 | 0.65 | 0.35 |
| C29 | 0.60 | La/Pr | 0.15/0.15 | 0.65 | 0.35 |
| C30 | 0.60 | La/Pr/Nd | 0.10/0.10/0.10 | 0.65 | 0.35 |
| C31 | 0.60 | Sm/Pr/Gd | 0.05/0.20/0.05 | 0.65 | 0.35 |
| C32 | 0.60 | Dy/Yb/La | 0.15/0.05/0.10 | 0.65 | 0.35 |
| C33 | 0.60 | La/Gd/Yb/Dy | 0.10/0.10/0.05/0.05 | 0.65 | 0.35 |
| *C34 | 0.60 | Ho | 0.30 | 0.65 | 0.35 |
| *C35 | 0.60 | Er | 0.30 | 0.65 | 0.35 |
| C36 | 0.35 | La | 0.20 | 0.75 | 0.25 |
| C37 | 0.35 | La | 0.85 | 0.25 | 0.75 |
| C38 | 0.75 | La | 0.20 | 0.75 | 0.25 |
| C39 | 0.75 | La | 0.85 | 0.75 | 0.25 |

By using 1000 g of the raw material powder of the dielectric composition obtained as described above, the paste for the dielectric layer; the paste for the inner electrode layer; the green sheet; the green chip; and the laminated ceramic sintered body were obtained as in Example 1-1.

Composition analysis of each sample was conducted using ICP emission spectroscopy for each of the obtained laminated ceramic sintered body. As a result, it was confirmed that the obtained laminated ceramic sintered body had almost the same value as the dielectric composition described in Table 9.

After grinding the end face of the obtained laminated ceramic sintered body by sandblasting, an In—Ga eutectic ceramic capacitor sample Nos. C1 to C39 by the methods described below. Results are shown in Table 20.

[Relative Dielectric Constant]

The capacitance of the laminated ceramic capacitor was measured by inputting a signal having frequency of 1 kHz and 1 Vrm of the signal level (measured voltage) at 250° C. by using the digital LCR meter (4284A manufactured by YHP Co., Ltd.). The relative dielectric constant (no unit) was calculated based on the thickness of the dielectric layer, the effective electrode area, and the electrostatic capacitance C obtained as a result of the measurement. It is preferable that the relative dielectric constant is high, and 600 or more is regarded as excellent.

[DC Withstand Voltage]

The DC withstand voltage was measured in the same manner as in Example 1-1. The DC withstand voltage is preferably 60 V/μm or more, more preferably 100 V/μm or more. More preferably, the DC withstand voltage is 150 Vim or more.

[High-Temperature Load Life]

The high temperature load lifetime was measured and evaluated by the same method as in Example 1-1.

[Evaluation of α and β by Image Analysis]

TEM samples of the dielectric layers were prepared and STEM-EDS mapping was carried out in the same manner as in Example 1-1. The field of view of the mapping was 7 μm×7 μm, and mapping was performed over 10 fields or more for each sample. By using the elemental mapping obtained by the above-described method, area of K, Ba, Sr, and Nb, which were the elements of $K(Ba_{1-x}Sr_x)_2Nb_5O_{15}$, and Ba, Re and Nb, which were elements of $(Ba_{1-w}Re_{2w/3})Nb_2O_6$, were identified. Then, the area ratio α (%) of crystal grains constituted of $K(Ba_{1-x}Sr_x)_2Nb_5O_{15}$; and the area ratio β (%) of crystal grains constituted of $(Ba_{1-w}Re_{2w/3})Nb_2O_6$ were calculated by using the average area from results over 10 fields of view. In the present embodiment, in order to obtain a high DC withstand voltage and an excellent high-temperature load lifetime, preferably, α and β were set to satisfy $0.35 \leq \alpha/\beta \leq 3.00$ and $80\% \leq \alpha+\beta$.

TABLE 20

| Sample No. | α/β [—] | α + β [%] | Relative dielectric constant [—] | DC withstand voltage [V/μm] | High-temperature load lifetime [hour] |
|---|---|---|---|---|---|
| *C1 | 1.60 | 35 | 760 | 60 | 65 |
| C2 | 1.70 | 40 | 810 | 75 | 85 |
| C3 | 1.65 | 30 | 800 | 85 | 95 |
| C4 | 1.55 | 35 | 880 | 80 | 90 |
| C5 | 1.85 | 35 | 860 | 85 | 100 |
| C6 | 1.70 | 30 | 770 | 75 | 90 |
| *C7 | 1.65 | 25 | 710 | 40 | 45 |
| *C8 | 1.70 | 30 | 740 | 35 | 55 |
| C9 | 1.80 | 35 | 790 | 85 | 90 |
| C10 | 1.65 | 30 | 890 | 80 | 100 |
| C11 | 1.50 | 30 | 940 | 85 | 100 |
| C12 | 1.65 | 35 | 840 | 70 | 85 |
| *C13 | 1.70 | 35 | 910 | 35 | 50 |
| *C14 | 0.05 | 85 | 820 | 55 | 70 |
| C15 | 0.30 | 55 | 770 | 65 | 85 |
| C16 | 0.50 | 25 | 780 | 60 | 85 |
| C17 | 0.90 | 15 | 880 | 70 | 85 |
| C18 | 1.45 | 20 | 920 | 80 | 95 |
| C19 | 2.20 | 30 | 820 | 85 | 95 |
| C20 | 2.90 | 45 | 770 | 85 | 90 |
| *C21 | 4.00 | 65 | 760 | 20 | 40 |
| C22 | 1.70 | 25 | 780 | 80 | 95 |
| C23 | 1.75 | 30 | 840 | 80 | 95 |
| C24 | 1.75 | 40 | 830 | 75 | 90 |
| C25 | 1.80 | 25 | 810 | 80 | 100 |
| C26 | 1.65 | 35 | 860 | 80 | 100 |
| C27 | 1.75 | 35 | 820 | 80 | 95 |
| C28 | 1.65 | 30 | 870 | 75 | 90 |
| C29 | 1.80 | 35 | 890 | 90 | 100 |
| C30 | 1.60 | 40 | 910 | 85 | 100 |
| C31 | 1.75 | 35 | 790 | 80 | 100 |
| C32 | 1.70 | 30 | 940 | 75 | 95 |
| C33 | 1.60 | 25 | 880 | 80 | 95 |
| *C34 | 1.75 | 35 | 780 | 35 | 55 |
| *C35 | 1.65 | 30 | 930 | 40 | 50 |
| C36 | 3.10 | 45 | 900 | 80 | 100 |
| C37 | 0.35 | 50 | 850 | 75 | 85 |
| C38 | 2.85 | 45 | 820 | 75 | 90 |
| C39 | 2.95 | 40 | 890 | 70 | 85 |

According to the results shown in Table 20, it was confirmed that among sample Nos. C1 to C39, laminated ceramic capacitor samples that had parameters within the ranges of the present embodiment had the relative dielectric constant of 600 or more at 250° C.; and the high-temperature load lifetimes were 80 hours or more when direct voltage was applied continuously so as to be 20 V/μm with respect to the thickness of the dielectric layer.

Contrary to that, a sufficient insulation property was difficult to obtain in the sample No. C1 since x in the chemical formula $(Ba_{1-x}Sr_x)_2Nb_5O_{15}$ was less than 0.35 being out of the range of the present embodiment. Accordingly, the sample No. C1 had a low high-temperature load lifetime of 65 hours. In addition, x exceeded 0.75 in the sample No. C7 being out of the range of the present embodiment. Accordingly, it was confirmed that the sample No. C7 had a low high-temperature load lifetime of 45 hours.

In the sample No. C8, w in the chemical formula $(Ba_{1-w}Re_{2w/3})Nb_2O_6$ was less than 0.20 being out of the range of the present embodiment. Thus, leakage of current was likely to occur when the DC voltage was applied. Accordingly, the sample No. C8 had a low high-temperature load lifetime of 55 hours. On the other hand, in the sample No. C13, w exceeded 0.85 being out of the range of the present embodiment. Thus, it was confirmed that excessive Re tends to form a hetero-phase, resulting in a low high-temperature load lifetime of 50 hours.

In addition, since a was less than 0.25 in the sample No. C14 and exceeded 0.75 in the sample No. C21 being out of the range of the present embodiment, they had low high-temperature load lifetimes of 70 hours and 40 hours, respectively.

In the sample Nos. C34 and C35, Re was Ho and Er, respectively, which were out of the range of the present embodiment. Thus, the sample Nos. C34 and C35 had low high-temperature load lifetimes of 70 hours and 40 hours, respectively.

In the sample Nos. C22 to C33, Re was at least one selected from the group consisting of La, Pr, Nd, Sm, Y, Gd, Yb and Dy. Thus, they showed almost equivalent characteristics. In addition, it was confirmed that even in the case where multiple elements were combined, excellent properties were obtained.

Example 4-2

The area ratio of the crystal grains constituted of the $K(Ba_{1-x}Sr_x)_2Nb_5O_{15}$ or $(Ba_{1-w}Re_{2w/3})Nb_2O_6$ is calculated by using the dielectric composition manufacturing method 2 described above The results with the increased area ratios are shown.

First, for $K(Ba_{1-x}Sr_x)_2Nb_5O_{15}$, $K_2CO_3$, $BaCO_3$, $SrCO_3$, and $Nb_2O_5$ powders having the average particle size of 1.0 μm or less were prepared as starting materials. The above starting materials were weighed so as to be x shown in Table 21 and wet-mixed for 17 hours with a ball mill using ethanol as a dispersion medium. Thereafter, the obtained mixture was dried to obtain a mixed raw material powder. Thereafter, the first heat treatment is performed at a holding temperature of 900° C. to 1000° C. for a holding time of 10 hours to 24 hours. Then the second heat treatment at a holding temperature of 750° C. to 850° C. and a holding time of 10 hours to 24 hours was performed to obtain the calcined powder of $K(Ba_{1-x}Sr_x)_2Nb_5O_{15}$.

Next, for $(Ba_{1-w}Re_{2w/3})Nb_2O_6$, BaCO3 and Nb2O5 powder; and oxide powders of La, Pr, Nd, Sm, Y, Gd, Yb, Dy, Er and Ho having the average grain diameter of 1.0 μm or less were prepared as starting materials. These starting materials were weighed so that w shown in Table 21 were obtained and wet mixed using a ball mill for 17 hours with ethanol as a dispersion medium. Thereafter, the obtained mixture was dried to obtain a mixed raw material powder. Thereafter, the first heat treatment was performed at a holding temperature of 900° C. to 1000° C. for a holding time of 10 hours to 24 hours. Then, the second heat treatment at a holding temperature of 750° C. to 850° C. and a holding time of 10 hours to 24 hours was performed to obtain the calcined powder of $(Ba_{1-w}Re_{2w/3})Nb_2O_6$.

After weighing the obtained calcined powder of $K(Ba_{1-x}Sr_x)_2Nb_5O_{15}$ and the calcined powder of $(Ba_{1-w}Re_{2w/3})Nb_2O_6$ so as to have the compounding ratio shown in Table 21, the material was wet mixed for 17 to 36 hours with a ball mill using ethanol as dispersion medium. Thereafter, the obtained mixture was dried to obtain raw material powder of the dielectric composition shown in Table 21.

Example 1-2. Conditions for the de-binder treatment, calcining and annealing are as described in Example 1-2.

The crystal structure of the dielectric layer was measured by X-ray diffraction (XRD) in the obtained laminated ceramic sintered body. As a result, it was confirmed that each of $K(Ba_{1-x}Sr_x)_2Nb_5O_{15}$ and $(Ba_{1-w}Re_{2w/3})Nb_2O_6$ existed independently in the laminated ceramic sintered body of the present embodiment.

In addition, composition analysis of each sample was conducted using ICP emission spectroscopy for each of the obtained laminated ceramic sintered body. As a result, it was confirmed that the obtained laminated ceramic sintered body had almost the same value as the dielectric composition described in Tables 21 and 22.

After grinding the end face of the obtained laminated ceramic sintered body by sandblasting, an In—Ga eutectic alloy was applied as an external electrode, and sample Nos. C40 to C78 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 μm. The thickness of the inner electrode layer was 2 μm. The number of the dielectric layers sandwiched between the inner electrode layers was 50.

The relative dielectric constant; the DC withstand voltage; the high-temperature load lifetime; and the area ratio of

TABLE 21

| Sample No. | Substitution amount x in $K(Ba_{1-x}Sr_x)_2Nb_5O_{15}$ | $(Ba_{1-w}Re_{2w/3})Nb_2O_6$ Re | Substitution amount w | Mixing ratio of calcined powders $K(Ba_{1-x}Sr_x)_2Nb_5O_{15}$ [mol %] | (Ba1−wRe2w/3)Nb2O6 [mol %] |
|---|---|---|---|---|---|
| *C40 | 0.30 | La | 0.30 | 67 | 33 |
| C41 | 0.35 | La | 0.30 | 67 | 33 |
| C42 | 0.45 | La | 0.30 | 67 | 33 |
| C43 | 0.50 | La | 0.30 | 67 | 33 |
| C44 | 0.60 | La | 0.30 | 67 | 33 |
| C45 | 0.75 | La | 0.30 | 67 | 33 |
| *C46 | 0.80 | La | 0.30 | 67 | 33 |
| *C47 | 0.60 | La | 0.10 | 67 | 33 |
| C48 | 0.60 | La | 0.20 | 67 | 33 |
| C49 | 0.60 | La | 0.40 | 67 | 33 |
| C50 | 0.60 | La | 0.60 | 67 | 33 |
| C51 | 0.60 | La | 0.85 | 67 | 33 |
| *C52 | 0.60 | La | 0.90 | 67 | 33 |
| *C53 | 0.60 | La | 0.30 | 10 | 90 |
| C54 | 0.60 | La | 0.30 | 25 | 75 |
| C55 | 0.60 | La | 0.30 | 33 | 67 |
| C56 | 0.60 | La | 0.30 | 50 | 50 |
| C57 | 0.60 | La | 0.30 | 60 | 40 |
| C58 | 0.60 | La | 0.30 | 72 | 28 |
| C59 | 0.60 | La | 0.30 | 75 | 25 |
| *C60 | 0.60 | La | 0.30 | 78 | 22 |
| C61 | 0.60 | Pr | 0.30 | 67 | 33 |
| C62 | 0.60 | Nd | 0.30 | 67 | 33 |
| C63 | 0.60 | Sm | 0.30 | 67 | 33 |
| C64 | 0.60 | Y | 0.30 | 67 | 33 |
| C65 | 0.60 | Gd | 0.30 | 67 | 33 |
| C66 | 0.60 | Yb | 0.30 | 67 | 33 |
| C67 | 0.60 | Dy | 0.30 | 67 | 33 |
| C68 | 0.60 | La/Pr | 0.15/0.15 | 67 | 33 |
| C69 | 0.60 | La/Pr/Nd | 0.10/0.10/0.10 | 67 | 33 |
| C70 | 0.60 | Sm/Pr/Gd | 0.05/0.20/0.05 | 67 | 33 |
| C71 | 0.60 | Dy/Yb/La | 0.15/0.05/0.10 | 67 | 33 |
| C72 | 0.60 | La/Gd/Yb/Dy | 0.10/0.10/0.05/0.05 | 67 | 33 |
| *C73 | 0.60 | Ho | 0.30 | 67 | 33 |
| *C74 | 0.60 | Er | 0.30 | 67 | 33 |
| C75 | 0.35 | La | 0.20 | 75 | 25 |
| C76 | 0.35 | La | 0.85 | 25 | 75 |
| C77 | 0.75 | La | 0.20 | 75 | 25 |
| C78 | 0.75 | La | 0.85 | 75 | 25 |

Thereafter, in the same manner as in Example 4-1, the dielectric layer paste and the inner electrode layer paste were prepared.

Then, the green chip was produced in the same manner as in Example 4-1.

Next, the obtained green chip was subjected to de-binder treatment, calcining, and annealing treatment to obtain a laminated ceramic sintered body as in the same method as in crystal grains consisted of $K(Ba_{1-x}Sr_x)_2Nb_5O_{15}$ and crystal grains consisted of $(Ba_{1-w}Re_{2w/3})Nb_2O_6$ based on the image analysis were measured and evaluated in the laminated ceramic capacitor sample Nos. C40 to C78 by using the same measurement methods as in the example 4-1. Results are shown in Table 22.

$0.35 \leq \alpha/\beta \leq 3.00$ and $80\% \leq \alpha+\beta$ when $\alpha$ was the area ratio of crystal grains constituted of $K(Ba_{1-x}Sr_x)_2Nb_5O_{15}$ in percentage; and $\beta$ was the area ratio of crystal grains constituted of $(Ba_{1-w}Re_{2w/3})Nb_2O_6$ in percentage.

It was confirmed that high high-temperature load lifetime and high DC withstand voltage were achieved at the same

TABLE 22

| Sample No. | a [—] | b [—] | $\alpha/\beta$ [—] | $\alpha + \beta$ [%] | Relative dielectric constant [—] | DC withstand voltage [V/μm] | High-temperature load lifetime [hour] |
|---|---|---|---|---|---|---|---|
| *C40 | 0.65 | 0.35 | 1.90 | 82 | 710 | 90 | 100 |
| C41 | 0.65 | 0.35 | 1.85 | 90 | 760 | 110 | 105 |
| C42 | 0.65 | 0.35 | 1.90 | 86 | 750 | 120 | 115 |
| C43 | 0.65 | 0.35 | 2.05 | 88 | 830 | 120 | 110 |
| C44 | 0.65 | 0.35 | 2.00 | 92 | 810 | 140 | 120 |
| C45 | 0.65 | 0.35 | 1.95 | 90 | 720 | 130 | 100 |
| *C46 | 0.65 | 0.35 | 1.90 | 78 | 660 | 90 | 65 |
| *C47 | 0.65 | 0.35 | 1.85 | 76 | 690 | 90 | 75 |
| C48 | 0.65 | 0.35 | 1.90 | 86 | 740 | 120 | 110 |
| C49 | 0.65 | 0.35 | 2.00 | 84 | 840 | 130 | 120 |
| C50 | 0.65 | 0.35 | 1.95 | 82 | 890 | 125 | 120 |
| C51 | 0.65 | 0.35 | 1.90 | 88 | 790 | 110 | 100 |
| *C52 | 0.65 | 0.35 | 2.00 | 92 | 860 | 90 | 70 |
| *C53 | 0.10 | 0.90 | 0.15 | 86 | 770 | 70 | 90 |
| C54 | 0.25 | 0.75 | 0.35 | 88 | 720 | 110 | 100 |
| C55 | 0.35 | 0.65 | 0.55 | 90 | 730 | 125 | 115 |
| C56 | 0.50 | 0.50 | 0.95 | 90 | 830 | 115 | 105 |
| C57 | 0.60 | 0.40 | 1.60 | 86 | 870 | 125 | 110 |
| C58 | 0.70 | 0.30 | 2.60 | 90 | 770 | 140 | 110 |
| C59 | 0.75 | 0.25 | 3.00 | 88 | 720 | 135 | 100 |
| *C60 | 0.80 | 0.20 | 3.60 | 82 | 710 | 100 | 60 |
| C61 | 0.65 | 0.35 | 1.85 | 86 | 730 | 130 | 115 |
| C62 | 0.65 | 0.35 | 1.95 | 88 | 790 | 135 | 115 |
| C63 | 0.65 | 0.35 | 2.00 | 88 | 780 | 130 | 110 |
| C64 | 0.65 | 0.35 | 1.95 | 84 | 760 | 140 | 120 |
| C65 | 0.65 | 0.35 | 1.90 | 86 | 810 | 140 | 120 |
| C66 | 0.65 | 0.35 | 1.95 | 90 | 770 | 130 | 115 |
| C67 | 0.65 | 0.35 | 2.00 | 88 | 820 | 135 | 110 |
| C68 | 0.65 | 0.35 | 1.85 | 86 | 840 | 125 | 120 |
| C69 | 0.65 | 0.35 | 1.90 | 90 | 860 | 135 | 120 |
| C70 | 0.65 | 0.35 | 1.95 | 88 | 740 | 140 | 120 |
| C71 | 0.65 | 0.35 | 2.00 | 86 | 890 | 140 | 115 |
| C72 | 0.65 | 0.35 | 1.80 | 90 | 830 | 145 | 115 |
| *C73 | 0.65 | 0.35 | 1.85 | 84 | 730 | 125 | 75 |
| *C74 | 0.65 | 0.35 | 1.90 | 78 | 880 | 135 | 70 |
| C75 | 0.75 | 0.25 | 3.00 | 88 | 850 | 110 | 120 |
| C76 | 0.25 | 0.75 | 0.35 | 90 | 800 | 120 | 100 |
| C77 | 0.75 | 0.25 | 2.90 | 88 | 770 | 110 | 110 |
| C78 | 0.75 | 0.25 | 2.95 | 90 | 840 | 135 | 105 |

According to the results shown in Table 22, it was confirmed that among sample Nos. C40 to C78, laminated ceramic capacitor samples that had parameters within the scope of the present embodiment had the relative dielectric constant of 600 or more at 250° C.; the DC withstand voltage of 100V/μm at 250° C.; and the high-temperature load lifetimes were 80 hours or more when direct voltage was applied continuously so as to be 20 V/μm with respect to the thickness of the dielectric layer.

According to the results shown in Tables 20 and 22, it was confirmed that the DC withstand voltage was less than 100 V/μm at 250° C. in the laminated ceramic capacitor, in which the relationship between $\alpha$ and $\beta$ did not satisfy time at 250° C., which had been difficult to achieve so far, by not only controlling the material composition of the dielectric composition but also controlling the composition of the crystal grains constituting the dielectric composition at the same time.

Example 4-3

By using the same methods as in the example 4-2, the raw material powders of the dielectric composition shown in Table 23 were produced.

TABLE 23

| Sample No. | Substitution amount x in $K(Ba_{1-x}Sr_x)_2Nb_5O_{15}$ | $(Ba_{1-v}Re_{2w/3})Nb_2O_6$ | | Mixing ratio of calcined powders | |
|---|---|---|---|---|---|
| | | Re | Substitution amount w | $K(Ba_{1-x}Sr_x)_2Nb_5O_{15}$ [mol %] | $(Ba_{1-v}Re_{2w/3})Nb_2O_6$ [mol %] |
| C79 | 0.35 | La | 0.35 | 33 | 67 |
| C80 | 0.35 | La | 0.40 | 33 | 67 |
| C81 | 0.35 | La | 0.35 | 37 | 63 |
| C82 | 0.35 | La | 0.40 | 37 | 63 |
| C83 | 0.35 | La | 0.60 | 60 | 40 |
| C84 | 0.50 | La | 0.50 | 50 | 50 |
| C85 | 0.50 | La | 0.40 | 37 | 63 |
| C86 | 0.50 | La | 0.60 | 60 | 40 |
| C87 | 0.35 | La | 0.60 | 37 | 63 |
| C88 | 0.40 | La | 0.60 | 50 | 50 |
| C89 | 0.35 | La | 0.40 | 60 | 40 |
| C90 | 0.45 | La | 0.50 | 50 | 50 |
| C91 | 0.45 | Pr | 0.40 | 37 | 63 |
| C92 | 0.40 | Nd | 0.55 | 50 | 50 |
| C93 | 0.50 | La/Pr/Nd | 0.20/0.10/0.15 | 50 | 50 |
| C94 | 0.60 | La | 0.60 | 60 | 40 |
| C95 | 0.60 | La | 0.70 | 60 | 40 |
| C96 | 0.60 | La | 0.70 | 65 | 35 |
| C97 | 0.50 | La | 0.60 | 65 | 35 |
| C98 | 0.60 | La | 0.60 | 65 | 35 |
| C99 | 0.50 | La | 0.70 | 60 | 40 |
| C100 | 0.50 | La | 0.70 | 65 | 35 |
| C101 | 0.45 | Y | 0.50 | 50 | 50 |
| C102 | 0.45 | Gd | 0.50 | 50 | 50 |

A multilayer ceramic capacitor sample was prepared using the obtained dielectric composition raw material powder in the same manner as in Example 4-2, and measurement and evaluation were carried out in the same manner as in Example 4-1 and Example 4-2. Results are shown in Table 24.

TABLE 24

| Sample No. | a [—] | b [—] | $\alpha/\beta$ [—] | $\alpha + \beta$ [%] | Relative dielectric constant [—] | DC withstand voltage [V/μm] | High-temperature load lifetime [hour] |
|---|---|---|---|---|---|---|---|
| C79 | 0.35 | 0.65 | 0.55 | 92 | 750 | 120 | 110 |
| C80 | 0.35 | 0.65 | 0.50 | 90 | 790 | 130 | 115 |
| C81 | 0.35 | 0.65 | 0.60 | 94 | 810 | 135 | 100 |
| C82 | 0.35 | 0.65 | 0.65 | 96 | 830 | 165 | 140 |
| C83 | 0.60 | 0.60 | 1.50 | 98 | 810 | 170 | 130 |
| C84 | 0.50 | 0.50 | 1.05 | 96 | 850 | 180 | 150 |
| C85 | 0.40 | 0.60 | 0.60 | 96 | 880 | 175 | 135 |
| C86 | 0.60 | 0.40 | 1.45 | 94 | 820 | 170 | 130 |
| C87 | 0.35 | 0.65 | 0.65 | 92 | 830 | 165 | 145 |
| C88 | 0.50 | 0.50 | 0.95 | 94 | 790 | 180 | 150 |
| C89 | 0.60 | 0.40 | 1.45 | 96 | 810 | 165 | 135 |
| C90 | 0.50 | 0.50 | 1.05 | 92 | 820 | 160 | 140 |
| C91 | 0.40 | 0.60 | 0.60 | 94 | 830 | 170 | 145 |
| C92 | 0.50 | 0.50 | 0.95 | 96 | 770 | 165 | 140 |
| C93 | 0.50 | 0.50 | 1.00 | 98 | 790 | 170 | 135 |
| C94 | 0.60 | 0.40 | 1.55 | 88 | 760 | 135 | 100 |
| C95 | 0.60 | 0.40 | 1.60 | 92 | 750 | 130 | 105 |
| C96 | 0.65 | 0.35 | 1.75 | 94 | 770 | 140 | 110 |
| C97 | 0.65 | 0.35 | 1.80 | 90 | 740 | 135 | 105 |
| C98 | 0.65 | 0.35 | 1.85 | 90 | 790 | 125 | 120 |
| C99 | 0.60 | 0.40 | 1.55 | 94 | 760 | 140 | 115 |
| C100 | 0.65 | 0.35 | 1.85 | 92 | 770 | 130 | 110 |
| C101 | 0.50 | 0.50 | 0.95 | 90 | 790 | 125 | 115 |
| C102 | 0.50 | 0.50 | 1.05 | 92 | 760 | 135 | 110 |

According to the results shown in Table 24, it was confirmed that among the sample Nos. C79 to C102 which had parameters within the ranges of the present embodiment, the laminated ceramic capacitors of the sample Nos. C82 to C93, in which Re was at least one selected from the group consisting of La, Pr and Nd; x, w, α and β satisfied 0.35≤x≤0.50, 0.40≤w≤0.60, 0.60≤α/β≤1.50, and 90%≤α+β, showed even more excellent properties such as: the relative dielectric constant of 600 or more at 250° C.; the DC withstand voltage of 150 V/μm at 250° C.; and the high-temperature load lifetime of 120 hours or more when continuous DC voltage was continuously applied so as to be 20 V/μm with respect to the thickness of the dielectric layer.

It should be considered that the embodiment and the example disclosed this time are examples in all respects and are not restrictive. The scope of the present invention is not limited to the above-described embodiments and examples but is intended to be indicated by the claims, and includes meanings equivalent to the claims and all modifications and variations within the scope.

INDUSTRIAL APPLICABILITY

Since it has high DC withstand voltage and high-temperature load lifetime in a high temperature range of 250° C., the present invention can be applied to uses: under the environment adjacent to the engine room as automotive use; and as an electronic component mounted in the vicinity of the power devices using the SiC-based or the GaN-based semiconductor.

REFERENCE SIGNS LIST 1, 101, 201, 301: Laminated ceramic capacitor
2, 102, 202, 302: Dielectric layer
3, 103, 203, 303: Inner electrode layer
4, 104, 204, 304: Outer electrode
10, 110, 210, 310: Capacitor element main body

What is claimed is:

1. A dielectric composition comprising a main component made of:
a first complex oxide expressed by a chemical formula $\{K(Ba_{1-x}Sr_x)_2Nb_5O_{15}\}$; and
a second complex oxide expressed by a chemical formula that differs from the chemical formula of the first complex oxide, wherein
the second complex oxide is a complex oxide expressed by one of a chemical formulae: formula $\{(Ca_{1-y}Sr_y)(Zr_{1-z}Ti_z)O_3\}$,
x satisfies $0.35 \leq x \leq 0.75$,
a satisfies $0.32 \leq a \leq 0.66$ when a molar ratio between the first and second complex oxides is defined by a:b in an order and a+b=1.00, and
y and z satisfy $0.01 \leq y \leq 0.25$ and $0.01 \leq z \leq 0.25$, respectively.

2. The dielectric composition according to claim 1, wherein
a relationship between $\alpha$ and $\beta$ satisfies $0.50 \leq \alpha/\beta \leq 1.90$ and $80\% \leq \alpha+\beta$ when $\alpha$ is an area ratio of crystal grains of $K(Ba_{1-x}Sr_x)_2Nb_5O_{15}$ in percentage; and $\beta$ is an area ratio of crystal grains of $(Ca_{1-y}Sr_y)(Zr_{1-z}Ti_z)O_3$ in percentage, in a case where the dielectric composition is made of plurality of crystal grains and a total area ratio of all of the plurality of crystal grains constituting the dielectric composition is defined as 100%.

3. The dielectric composition according to claim 2, wherein
x, y, $\alpha$, and $\beta$ satisfy: $0.35 \leq x \leq 0.50$; $0.02 \leq y \leq 0.10$; $0.02 \leq z \leq 0.10$; $0.60 \leq \alpha/\beta \leq 1.50$; and $90\% \leq \alpha+\beta$.

4. A dielectric composition comprising a main component made of:
a first complex oxide expressed by a chemical formula $\{K(Ba_{1-x}Sr_x)_2Nb_5O_{15}\}$; and
a second complex oxide expressed by a chemical formula that differs from the chemical formula of the first complex oxide, wherein
the second complex oxide is a complex oxide expressed by a chemical formula $\{Ba(Ti_{1-u}Zr_u)O_3\}$,
x satisfies $0.35 \leq x \leq 0.75$,
a satisfies $0.35 \leq a \leq 0.65$ when a molar ratio between the first and second complex oxides is defined by a:b in an order and a+b=1.00, and
u satisfies $0.02 \leq u \leq 0.25$.

5. The dielectric composition according to claim 4, wherein
a relationship between $\alpha$ and $\beta$ satisfies $0.55 \leq \alpha/\beta \leq 1.85$ and $80\% \leq \alpha+\beta$ when $\alpha$ is an area ratio of crystal grains of $K(Ba_{1-x}Sr_x)_2Nb_5O_{15}$ in percentage; and $\beta$ is an area ratio of crystal grains of $Ba(Ti_{1-u}Zr_u)O_3$ in percentage, in a case where the dielectric composition is made of plurality of crystal grains and a total area ratio of all of the plurality of crystal grains constituting the dielectric composition is defined as 100%.

6. The dielectric composition according to claim 5, wherein
x, u, $\alpha$, and $\beta$ satisfy: $0.35 \leq x \leq 0.50$; $0.04 \leq u \leq 0.15$; $0.70 \leq \alpha/\beta \leq 1.50$; and $90\% \leq \alpha+\beta$.

7. A dielectric composition comprising a main component made of:
a first complex oxide expressed by a chemical formula $\{K(Ba_{1-x}Sr_x)_2Nb_5O_{15}\}$; and
a second complex oxide expressed by a chemical formula that differs from the chemical formula of the first complex oxide, wherein
the second complex oxide is a complex oxide expressed by a chemical formula $\{(Ca_{1-v}Sr_v)TiSiO_5\}$,
x satisfies $0.35 \leq x \leq 0.75$,
a satisfies $0.37 \leq a \leq 0.62$ when a molar ratio between the first and second complex oxides is defined by a:b in an order and a+b=1.00, and
v satisfies $0.40 \leq v \leq 0.85$.

8. The dielectric composition according to claim 7, wherein
a relationship between $\alpha$ and $\beta$ satisfies $0.60 \leq \alpha/\beta \leq 1.60$ and $80\% \leq \alpha+\beta$ when $\alpha$ is an area ratio of crystal grains of $K(Ba_{1-x}Sr_x)_2Nb_5O_{15}$ in percentage; and $\beta$ is an area ratio of crystal grains of $(Ca_{1-v}Sr_v)TiSiO_5$ in percentage, in a case where the dielectric composition is made of plurality of crystal grains and a total area ratio of all of the plurality of crystal grains constituting the dielectric composition is defined as 100%.

9. The dielectric composition according to claim 8, wherein
x, v, $\alpha$, and $\beta$ satisfy: $0.35 \leq x \leq 0.50$; $0.55 \leq v \leq 0.75$; $0.60 \leq \alpha/\beta \leq 1.10$; and $90\% \leq \alpha+\beta$.

10. A dielectric composition comprising a main component made of:
a first complex oxide expressed by a chemical formula $\{K(Ba_{1-x}Sr_x)_2Nb_5O_{15}\}$; and
a second complex oxide expressed by a chemical formula that differs from the chemical formula of the first complex oxide, wherein
the second complex oxide is a complex oxide expressed by a chemical formula $\{(Ba_{1-w}Re_{2w/3})Nb_2O_6\}$,
x satisfies $0.35 \leq x \leq 0.75$,
a satisfies $0.25 \leq a \leq 0.75$ when a molar ratio between the first and second complex oxides is defined by a:b in an order and a+b=1.00,
Re is at least one selected from a group consisting of: La; Pr; Nd; Sm; Y; Gd; Yb; and Dy, and
w satisfies $0.20 \leq w \leq 0.85$.

11. The dielectric composition according to claim 10, wherein
a relationship between $\alpha$ and $\beta$ satisfies $0.35 \leq \alpha/\beta \leq 3.00$ and $80\% \leq \alpha+\beta$ when $\alpha$ is an area ratio of crystal grains of $K(Ba_{1-x}Sr_x)_2Nb_5O_{15}$ in percentage; and $\beta$ is an area ratio of crystal grains of $(Ba_{1-w}Re_{2w/3})Nb_2O_6$ in percentage, in a case where the dielectric composition is made of plurality of crystal grains and a total area ratio of all of the plurality of crystal grains constituting the dielectric composition is defined as 100%.

12. The dielectric composition according to claim 11, wherein

Re is La, Pr, and Nd, and x, w, α, and β satisfy: $0.35 \leq x \leq 0.50$; $0.40 \leq w \leq 0.60$; $0.60 \leq \alpha/\beta \leq 1.50$; and $90\% \leq \alpha+\beta$.

13. An electronic component comprising a dielectric layer and an inner electrode layer, wherein the dielectric layer is made of the dielectric composition according to claim 1.

14. An electronic component comprising a dielectric layer and an inner electrode layer, wherein the dielectric layer is made of the dielectric composition according to claim 4.

15. An electronic component comprising a dielectric layer and an inner electrode layer, wherein the dielectric layer is made of the dielectric composition according to claim 7.

16. An electronic component comprising a dielectric layer and an inner electrode layer, wherein the dielectric layer is made of the dielectric composition according to claim 10.

* * * * *